United States Patent
Winzer

(10) Patent No.: US 12,250,027 B2
(45) Date of Patent: Mar. 11, 2025

(54) POLARIZATION-DIVERSITY OPTICAL POWER SUPPLY

(71) Applicant: Nubis Communications, Inc., Aberdeen, NJ (US)

(72) Inventor: Peter Johannes Winzer, Aberdeen, NJ (US)

(73) Assignee: Nubis Communications, Inc., New Providence, NJ (US)

( * ) Notice: Subject to any disclaimer, the term of this patent is extended or adjusted under 35 U.S.C. 154(b) by 0 days.

(21) Appl. No.: 17/946,985

(22) Filed: Sep. 16, 2022

(65) Prior Publication Data

US 2023/0083467 A1    Mar. 16, 2023

Related U.S. Application Data

(63) Continuation-in-part of application No. PCT/US2021/035179, filed on Jun. 1, 2021, and a
(Continued)

(51) Int. Cl.
    *H04B 10/80*    (2013.01)
    *H04B 10/071*   (2013.01)
    *H04J 14/02*    (2006.01)

(52) U.S. Cl.
    CPC ......... *H04B 10/807* (2013.01); *H04B 10/071* (2013.01); *H04J 14/02216* (2023.08)

(58) Field of Classification Search
    CPC .................................................. H04B 10/032
    See application file for complete search history.

(56) References Cited

U.S. PATENT DOCUMENTS

| 4,346,478 A | 8/1982 | Sichling |
| 4,449,043 A | 5/1984 | Husbands |

(Continued)

FOREIGN PATENT DOCUMENTS

| EP | 0075699 | 4/1983 |
| JP | 2004-135700 | 5/2004 |

(Continued)

OTHER PUBLICATIONS

International Preliminary Report on Patentability in International Appln. No. PCT/US2021/035179, mailed on Dec. 15, 2022, 14 pages.

(Continued)

*Primary Examiner* — Jai M Lee
(74) *Attorney, Agent, or Firm* — Fish & Richardson P.C.

(57) ABSTRACT

An apparatus includes an optical power supply including: a power supply light source configured to generate power supply light; at least one optical input/output port; at least one photodetector; and a coupling module. The coupling module is configured to receive the power supply light from the power supply light source and output the power supply light through the optical input/output port, receive reflected light through the optical input/output port, and transmit the reflected light to the photodetector. The photodetector is configured to detect the reflected light and generate a signal representing a level of the reflected light. The optical power supply includes a controller that is configured to compare the level of the detected reflected light with a threshold value, and upon determining that the level of the detected reflected light is less than the threshold value, reduce or turn off the power supply light that is provided to the optical input/output port.

53 Claims, 41 Drawing Sheets

Related U.S. Application Data continuation-in-part of application No. 16/888,890, filed on Jun. 1, 2020, now Pat. No. 11,621,795.

(60) Provisional application No. 63/245,011, filed on Sep. 16, 2021.

(56) References Cited

U.S. PATENT DOCUMENTS

| | | | |
|---|---|---|---|
| 4,525,873 | A | 6/1985 | Baues |
| 5,107,358 | A | 4/1992 | Hodgkinson et al. |
| 5,111,322 | A | 5/1992 | Bergano et al. |
| 5,136,410 | A | 8/1992 | Heiling et al. |
| 5,491,576 | A | 2/1996 | Bergano |
| 5,654,818 | A | 8/1997 | Yao |
| 5,790,287 | A | 8/1998 | Darcie et al. |
| 6,284,975 | B1 | 9/2001 | McCord et al. |
| 6,321,013 | B1 | 11/2001 | Hardwick, III et al. |
| 6,646,774 | B1 | 11/2003 | Willner |
| 6,839,516 | B2 | 1/2005 | Lee et al. |
| 6,959,152 | B2 | 10/2005 | Fujiwara |
| 7,106,970 | B2 | 9/2006 | Fujiwara |
| 7,289,728 | B2* | 10/2007 | Wang ............... H04B 10/032 398/19 |
| 7,445,389 | B2 | 11/2008 | Aronson |
| 7,646,990 | B2 | 1/2010 | Weber et al. |
| 7,831,049 | B1 | 11/2010 | Kanter |
| 8,032,021 | B2 | 10/2011 | Cole et al. |
| 8,032,025 | B2 | 10/2011 | Ibragimov et al. |
| 8,073,326 | B2 | 12/2011 | Yan et al. |
| 8,135,287 | B2 | 3/2012 | Yu et al. |
| 8,705,955 | B2* | 4/2014 | Grobe ............... H04J 14/0282 398/16 |
| 8,761,560 | B1* | 6/2014 | Sanderson ............ G02B 6/4415 385/100 |
| 8,913,899 | B2 | 12/2014 | Neilson et al. |
| 8,929,729 | B2 | 1/2015 | Nguyen |
| 9,059,798 | B2* | 6/2015 | Figueria ............... G01M 11/00 |
| 9,781,546 | B2 | 10/2017 | Barrett et al. |
| 9,794,195 | B1 | 10/2017 | Wilson et al. |
| 9,832,055 | B2 | 11/2017 | Kuschnerov et al. |
| 10,014,943 | B2 | 7/2018 | Testa et al. |
| 10,054,749 | B1 | 8/2018 | Wang et al. |
| 10,222,676 | B2 | 3/2019 | Wen |
| 10,330,875 | B2 | 6/2019 | Fini |
| 10,404,400 | B2 | 9/2019 | Chen |
| 10,461,863 | B2 | 10/2019 | Testa et al. |
| 10,951,344 | B2 | 3/2021 | Matsuda et al. |
| 11,051,422 | B2 | 6/2021 | Norton et al. |
| 11,137,561 | B2* | 10/2021 | Tamate ............... G02B 6/4286 |
| 11,153,670 | B1 | 10/2021 | Winzer |
| 11,194,109 | B2 | 12/2021 | Winzer et al. |
| 11,287,585 | B2 | 3/2022 | Winzer |
| 11,621,795 | B2 | 4/2023 | Winzer |
| 12,066,653 | B2 | 8/2024 | Winzer et al. |
| 2001/0046074 | A1* | 11/2001 | Kakizaki ............ H04B 10/0795 398/5 |
| 2002/0003641 | A1 | 1/2002 | Hall et al. |
| 2003/0007216 | A1 | 1/2003 | Chraplyvy et al. |
| 2003/0081287 | A1 | 5/2003 | Jannson et al. |
| 2003/0090760 | A1 | 5/2003 | Glingener |
| 2003/0175033 | A1 | 9/2003 | Taga et al. |
| 2004/0016874 | A1 | 1/2004 | Rao et al. |
| 2004/0027462 | A1 | 2/2004 | Hing |
| 2004/0208600 | A1 | 10/2004 | Guenter et al. |
| 2004/0213512 | A1 | 10/2004 | Wu et al. |
| 2006/0029395 | A1 | 2/2006 | Kim et al. |
| 2007/0077072 | A1* | 4/2007 | Kunimatsu ......... H04J 14/0227 398/135 |
| 2007/0166046 | A1 | 7/2007 | Hecker et al. |
| 2008/0056731 | A1* | 3/2008 | Weber ............... H04B 10/07955 398/197 |
| 2008/0166133 | A1 | 7/2008 | Hsiao |
| 2008/0259566 | A1 | 10/2008 | Fried |
| 2008/0267620 | A1 | 10/2008 | Cole et al. |
| 2009/0067843 | A1 | 3/2009 | Winston et al. |
| 2009/0234936 | A1 | 9/2009 | Bandholz et al. |
| 2010/0150559 | A1 | 6/2010 | Essiambre et al. |
| 2010/0209114 | A1 | 8/2010 | Gloeckner et al. |
| 2010/0265658 | A1 | 10/2010 | Sawai et al. |
| 2011/0044702 | A1 | 2/2011 | Mizuguchi et al. |
| 2011/0150486 | A1 | 6/2011 | Davidson et al. |
| 2011/0157688 | A1 | 6/2011 | Wang |
| 2011/0188815 | A1 | 8/2011 | Blackwell et al. |
| 2011/0261427 | A1 | 10/2011 | Hart et al. |
| 2012/0106978 | A1 | 5/2012 | Jenson |
| 2013/0102237 | A1 | 4/2013 | Zhou et al. |
| 2013/0279916 | A1 | 10/2013 | Cho et al. |
| 2013/0342993 | A1 | 12/2013 | Singleton |
| 2014/0327902 | A1 | 11/2014 | Giger et al. |
| 2015/0079832 | A1 | 3/2015 | Gordon |
| 2015/0247980 | A1 | 9/2015 | Bradley et al. |
| 2015/0261269 | A1 | 9/2015 | Bruscoe |
| 2016/0216445 | A1 | 7/2016 | Thacker et al. |
| 2016/0269114 | A1 | 9/2016 | Beck |
| 2017/0131469 | A1 | 5/2017 | Kobrinsky et al. |
| 2018/0217468 | A1* | 8/2018 | Wen ............... H04B 10/5561 |
| 2018/0278332 | A1 | 9/2018 | Leigh et al. |
| 2018/0306990 | A1 | 10/2018 | Badihi |
| 2019/0098788 | A1 | 3/2019 | Leigh et al. |
| 2019/0173577 | A1 | 6/2019 | Coffey et al. |
| 2019/0379952 | A1 | 12/2019 | Iannone et al. |
| 2020/0015386 | A1 | 1/2020 | Gupta |
| 2020/0021899 | A1 | 1/2020 | Stojanovic et al. |
| 2020/0033544 | A1 | 1/2020 | Costello |
| 2020/0067626 | A1 | 2/2020 | Dupuis |
| 2020/0301084 | A1 | 9/2020 | Champion et al. |
| 2020/0343990 | A1 | 10/2020 | Nagarajan |
| 2021/0211785 | A1 | 7/2021 | Rose et al. |
| 2021/0286140 | A1 | 9/2021 | Winzer |
| 2021/0294052 | A1 | 9/2021 | Winzer |
| 2021/0345025 | A1 | 11/2021 | Winzer |
| 2021/0376950 | A1 | 12/2021 | Winzer |
| 2022/0094449 | A1* | 3/2022 | Suyama ............... H01S 5/042 |
| 2022/0114125 | A1 | 4/2022 | Thakur et al. |
| 2022/0141949 | A1 | 5/2022 | Devalla et al. |
| 2022/0159860 | A1 | 5/2022 | Winzer et al. |
| 2022/0244465 | A1 | 8/2022 | Winzer et al. |
| 2022/0263586 | A1 | 8/2022 | Winzer et al. |
| 2022/0264759 | A1 | 8/2022 | Sawyer et al. |
| 2022/0279256 | A1 | 9/2022 | Chaouch et al. |
| 2023/0018654 | A1 | 1/2023 | Winzer et al. |
| 2023/0043794 | A1 | 2/2023 | Winzer |
| 2023/0077979 | A1 | 3/2023 | Winzer |
| 2023/0161109 | A1 | 5/2023 | Pupalaikis et al. |
| 2023/0176304 | A1 | 6/2023 | Winzer et al. |
| 2023/0188208 | A1* | 6/2023 | Igarashi ............... H04B 10/071 398/21 |
| 2023/0254046 | A1 | 8/2023 | Winzer |
| 2023/0354541 | A1 | 11/2023 | Cole et al. |
| 2023/0375793 | A1 | 11/2023 | Winzer et al. |
| 2024/0036254 | A1 | 2/2024 | Winzer et al. |
| 2024/0056213 | A1 | 2/2024 | Winzer |
| 2024/0118484 | A1 | 4/2024 | Winzer et al. |

FOREIGN PATENT DOCUMENTS

| | | |
|---|---|---|
| WO | WO 2012/003856 | 1/2012 |
| WO | WO 2020/246375 | 12/2020 |
| WO | WO 2021/183792 | 9/2021 |
| WO | WO 2021/188648 | 9/2021 |
| WO | WO 2021/211725 | 10/2021 |
| WO | WO 2021/247521 | 12/2021 |

OTHER PUBLICATIONS

International Preliminary Report on Patentability in International Appln. No. PCT/US2022/015110, mailed Aug. 17, 2023, 14 pages.
International Preliminary Report on Patentability in International Appln. No. PCT/US2022/071857, mailed on Nov. 2, 2023, 23 pages.
Lach et al., Modulation formats for 100G and beyond, Elsevier Inc., Aug. 26, 2011, pp. 377-386.

(56) References Cited

OTHER PUBLICATIONS

Pan et al., "Intra-Bit Polarization Diversity Modulation for PMD Mitigation," Proceedings of the European Conference on Optical Communications (ECOC), Amsterdam, The Netherlands, Sep. 30-Oct. 4, 2001, paper We.P37, pp. 450-451.
PCT International Invitation to Pay Additional Fees in International Appln. No. PCT/US2021/035179, dated Jul. 30, 2021, 2 pages.
PCT International Search Report and Written Opinion in International Appln. No. PCT/US2021/035179, dated Oct. 20, 2021, 17 pages.
Acacia-inc.com [online], "Coherent Optical Solutions for Data Center Interconnections," Optinet 2019, Jun. 13, 2019, retrieved on Aug. 15, 2022, retrieved from URL<https://acacia-inc.com/wp-content/uploads/2019/06/Optinet-China-2019_Acacia_Fenghai-Liu_UpLoad_v1.pdf>, 13 pages.
Amazon.com [online], "IBM Midplane Board-8852Refurbished, 25R5780Refurbished)," Jun. 30, 2014, retrieved on Nov. 22, 2022, retrieved from URL< https://www.amazon.com/IBM-MIDPLANE-BOARD-8852-Refurbished-25R5780/dp/B00LEQ2URK>, 2 pages.
Ayar Labs "Optical I/O Chiplets Eliminate Bottlenecks to Unleash Innovation," Ayar Labs Resources, Technical Paper, 2019, 9 pages.
Ayarlabs.com [online], "In-Package Optical I/O: Unleashing Innovation," May 19, 2021, retrieved on Jun. 14, 2022, retrieved from URL<https://ayarlabs.com/in-package-optical-i-o-unleashing-innovation/>, 3 pages.
Copackageoptics.com [online], "Co-Packaged Optical Module Discussion Document," 2019, retrieved on Jun. 14, 2022, retrieved from URL<http://www.copackagedoptics.com/wp-content/uploads/2019/11/CPO-Module-Discussion-Doc-V1.0Final.pdf>, 18 pages.
Epic-assoc.com [online], "Co-Packaged Optics Integration," EPIC Online Technology Meeting on Co-Packaged Optics, Jun. 8, 2020, retrieved on Aug. 15, 2022, retrieved from <https://epic-assoc.com/wp-content/uploads/2021/06/Brian-Welch_Cisco.pdf>, 4 pages.
Eps.ieee.org [online], "Chapter 9: Integrated Photonics," Heterogeneous Integration Roadmap, 2019 Edition, Oct. 2019, retrieved on Aug. 15, 2022, retrieved from <https://eps.ieee.org/images/files/HIR_2021/ch09_photonics.pdf>, 16 pages.
Extended European Search Report in European Appln. No. 22195959, dated Feb. 10, 2023, 13 pages.
Fs.com [online], "1m (3ft) MTP® Female to 4 LC UPC Duplex 8 Fibers Type B Plenum (OFNP) OM4 50/125 Multimode Elite Breakout Cable, Magenta," Nov. 2020, retrieved on Jun. 14, 2022, retrieved from URL<https://www.fs.com/products/68047.html>, 5 pages.
International Search Report and Written Opinion in International Appln. No. PCT/US2022/071857, mailed Jun. 29, 2022, 25 pages.
International Search Report and Written Opinion in International Appln. No. PCT/US2022/15110, mailed Jul. 8, 2022, 31 pages.
Invitation to Pay Additional Fees in International Appln. No. PCT/US2022/015110, dated May 3, 2022, 3 pages.
Mapyourtech.com [online], "Understanding Optical Return Loss (ORL) in Optical Fiber system," Apr. 29, 2020, retrieved on Jan. 27, 2023, retrieved from URL<https://mapyourtech.com/2020/04/understanding-optical-return-loss-orl-in-optical-fiber-system/>, 9 pages.
Raj et al., "50Gb/s Hybrid Integrated Si-Photonic Optical Link in 16nm FinFET," 2020 European Conference on Optical Communications (ECOC), Dec. 6-10, 2020, 4 pages.
Raj et al., "Design of a 50-Gb/s Hybrid Integrated Si-Photonic Optical Link in 16-nm FinFET," IEEE Journal of Solid-State Circuits, Apr. 2020, 55:1086-1095.
Techpowerup.com [online], "Ayar Labs Raises $130 Million for Light-based Chip-to-Chip Communication," Apr. 27, 2022, retrieved on Jun. 14, 2022, retrieved from URL<https://www.techpowerup.com/294262/ayar-labs-raises-usd-130-million-for-light-based-chip-to-chip-communication>, 4 pages.
Vimeo.com [online], "In-Package Optical I/O: Unleashing Innovation," Ayar Labs, May 17, 2021, retrieved Aug. 15, 2022, retrieved from <https://vimeo.com/551707515?embedded=true&source=video_title&owner=82726955>, Video Frames from 0:18 to 1:42, 16 pages.
Burns et al., "Depolarized source for fiber-optic applications," Optics Letters, Mar. 15, 1991, 16(6):381-383.
Burns et al., "Depolarized source for fiber-optic applications: erratum," Optics Letters, Dec. 1, 1991, 16(23):1905.
Extended European Search Report in European Appln. No. 21817095.9, dated Jul. 24, 2024, 10 pages.
Testa et al., "Experimental evaluation of silicon photonics transceiver operating at 120° C. for 5G antenna array systems," Electronic Letters, Nov. 29, 2018, 54(24):1391-1393.

\* cited by examiner

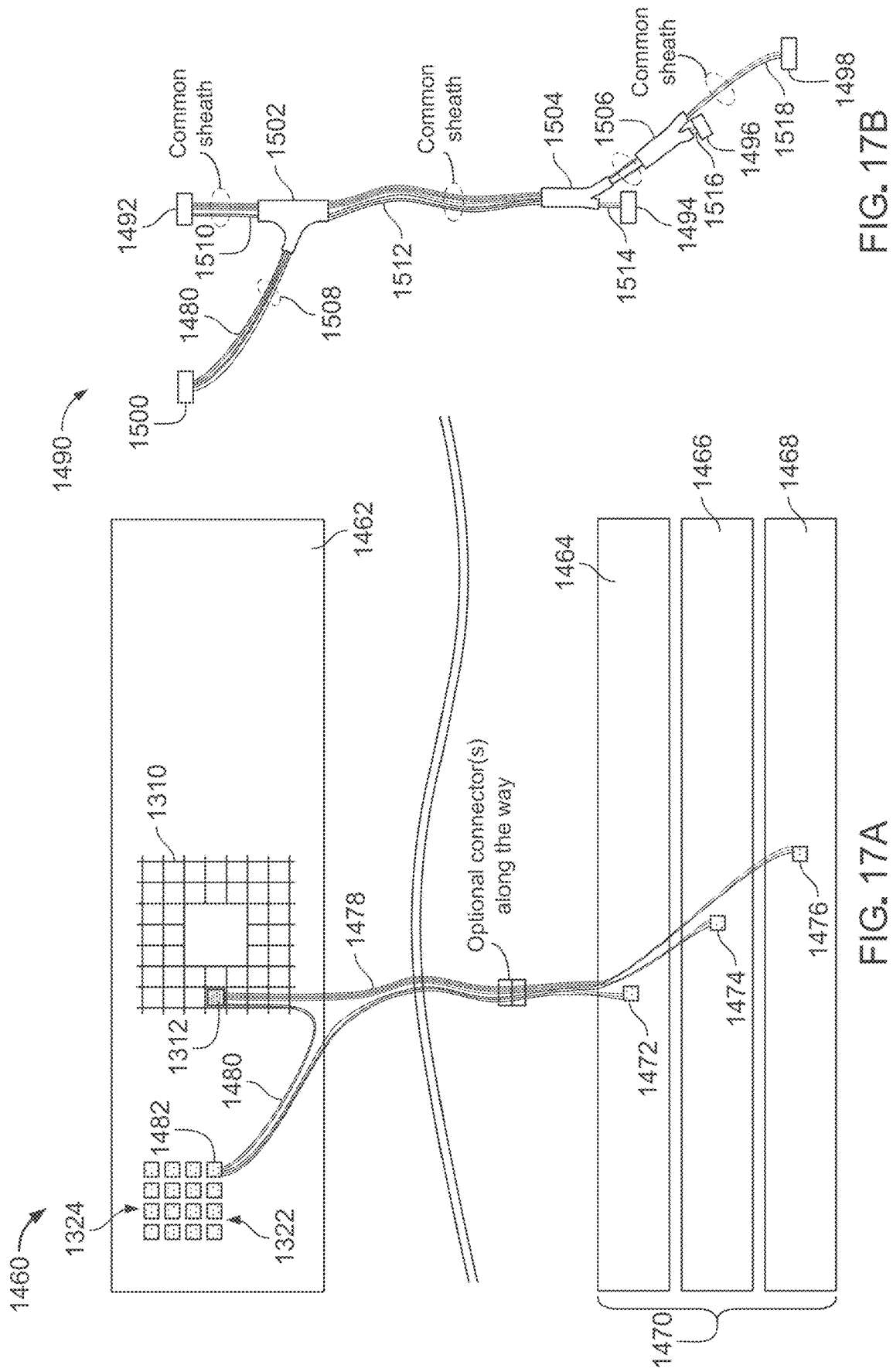

Various Example Embodiments A (Optical Power Supply side):
(for Directional and/or selective splitters)

Various Example Embodiments B (Optical Power Supply side):
(for Directional and/or selective splitters)

Data Modulators
Example 1: Mach-Zehnder

Example 2: Reflective Mach-Zehnder

POLARIZATION-DIVERSITY OPTICAL POWER SUPPLY

CROSS-REFERENCE TO RELATED APPLICATION

This application is a continuation-in-part of and claims priority to U.S. patent application Ser. No. 16/888,890, filed on Jun. 1, 2020, and PCT application PCT/US2021/035179, filed on Jun. 1, 2021. The entire contents of the above applications are herein incorporated by reference. This application claims priority to U.S. provisional patent application 63/245,011, filed on Sep. 16, 2021, the entire content of which is herein incorporated by reference.

BACKGROUND

Field

Various example embodiments relate to optical communication equipment and, more specifically but not exclusively, to optical power supplies.

Description of the Related Art

This section introduces aspects that may help facilitate a better understanding of the disclosure. Accordingly, the statements of this section are to be read in this light and are not to be understood as admissions about what is in the prior art or what is not in the prior art.

As the input/output (I/O) capacities of electronic processing chips increase, electrical signals may not provide sufficient I/O capacity across the limited size of a practically viable electronic chip package. A feasible alternative may be to interconnect electronic chip packages using optical signals, which can typically be delivered with a much higher I/O capacity per unit area compared to electrical I/Os.

SUMMARY OF THE INVENTION

Disclosed herein are various embodiments of an optical communication system including an optical power supply that has an eye-safety feature. In some examples, the optical power supply transmits light (e.g., laser light) to one or more transponder modules through one or more optical fibers. Each of the transponder modules reflect or redirect a portion of the light back to the optical power supply through the corresponding optical fiber. The optical power supply measures the reflected or redirected light from the optical fiber to evaluate a condition of the optical fiber, such as whether the optical fiber is intact or broken. The optical power supply reduces the power level of, or shuts off, the light transmitted to the optical fiber in response to a determination that the optical fiber is likely broken. This prevents high power light from emitting out of a broken end of the optical fiber, thereby reducing the risk to a human operator of the optical communication system.

In an apparatus that includes an optical power supply, a power supply light source configured to generate power supply light, at least one optical input/output port, at least one photodetector, and a coupling module configured to receive the power supply light from the power supply light source and output the power supply light through the optical input/output port, receive reflected light through the optical input/output port, and transmit the reflected light to the photodetector. The apparatus includes the photodetector that is configured to detect the reflected light and generate a signal representing a level of the reflected light, and a controller that is configured to compare the level of the detected reflected light with a threshold value, and upon determining that the level of the detected reflected light is less than the threshold value, reduce or turn off the power supply light that is provided to the optical input/output port.

In some implementations, the apparatus includes the reflected light that includes a portion of the power supply light that is output from the optical input/output port and reflected back to the optical input/output port. The controller of the apparatus is configured to control the light source to reduce or turn off the power supply light generated by the light source upon determining that the level of the detected reflected light is less than the threshold value. In some implementations, the controller is configured to control an optical shutter or attenuator to reduce or block the power supply light that is provided to the optical input/output port.

In some implementations, the apparatus includes a transponder module that that includes a reflector and a data modulator, in which the reflector is configured to receive the power supply light, transmit a first portion of the power supply light to the data modulator, and reflect a second portion of the power supply light back to the optical power supply. The data modulator is configured to modulate the first portion of the power supply light according to electrical data and generate a modulated optical signal.

In some implementations, the apparatus includes an optical fiber optically coupled between the optical power supply and the transponder module, in which the reflector is configured to receive the power supply light from the optical fiber and reflect the second portion of the power supply light back to the optical power supply through the optical fiber. In some implementations, the optical fiber that includes a plurality of segments of optical fibers that are optically coupled by connectors, slices, and optical elements, and the threshold value is selected to be higher than a sum of all reflected light that is reflected back to the optical power supply by the connectors, splices, and optical elements and reflected light due to the Fresnel reflection from a broken optical fiber, when the power supply light source outputs the power supply light at a normal operation level. In some implementations, the normal operational level is inferred from a measurement of a portion of the power supply light that is output from the optical input/output port using a second photodetector.

In some implementations, the apparatus includes the optical shutter or attenuator positioned between the power supply light source and the coupling module, wherein the controller is configured to control the optical shutter or attenuator to selectively operate in a first state that allows the power supply light to pass to the coupling module, or in a second state that blocks or reduces the power supply light that is provided to the coupling module.

In some implementations, the apparatus includes a monitor light source that is configured to generate monitor light, in which the coupling module is configured to combine the power supply light and the monitor light to generate combined light, and provide the combined light to the optical input/output port. The reflected light includes reflected monitor light, and the coupling module is configured to direct the reflected monitor light to the photodetector. The coupling module includes a wavelength multiplexer/demultiplexer that is configured to receive the power supply light and the monitor light, combine the power supply light and the monitor light to generate the combined light, and provide the combined light to the optical input/output port.

In some implementations, the power supply light of the apparatus has a first set of one or more discrete wavelengths or wavelength ranges, the monitor light has a second set of one or more discrete wavelengths or wavelength ranges, and at least 10% of optical power in the power supply light and at least 10% of optical power in the monitor light are contained in disjoint frequency bands. In some implementations, at least 50% of optical power in the power supply light and at least 50% of optical power in the monitor light are contained in disjoint frequency bands. In some implementations, at least 90% of optical power in the power supply light and at least 90% of optical power in the monitor light are contained in disjoint frequency bands.

In some implementations, the coupling module of the apparatus includes an optical circulator that is positioned between the monitor light source and the wavelength multiplexer/demultiplexer, The optical circulator includes a first port, a second port, and a third port. The first port is optically coupled to the monitor light source, the second port is optically coupled to the wavelength multiplexer/demultiplexer, and the third port is optically coupled to the photodetector. The optical circulator is configured to receive the monitor light at the first port and output the monitor light at the second port. The optical circulator is configured to receive the reflected light at the second port and output the reflected light at the third port.

In some implementations, the coupling module of the apparatus includes an optical circulator that is positioned between the monitor light source and the wavelength multiplexer/demultiplexer. The optical circulator is configured to direct the monitor light from the monitor light source to the wavelength multiplexer/demultiplexer, and the optical circulator is configured to direct the reflected light to the photodetector. In some implementations, the coupling module includes an optical circulator that is positioned between the wavelength multiplexer/demultiplexer and the optical input/output port. The optical circulator that includes a first port, a second port, and a third port. The first port is optically coupled to the wavelength multiplexer/demultiplexer, the second port is optically coupled to the optical input/output port, and the third port is optically coupled to the photodetector. The optical circulator is configured to receive the combined light at the first port and output the combined light at the second port. The optical circulator is configured to receive the reflected light at the second port and output the reflected light at the third port.

In some implementations, the coupling module of the apparatus includes an optical circulator that is positioned between the wavelength multiplexer/demultiplexer and the optical input/output port. The optical circulator is configured to direct the light from the wavelength multiplexer/demultiplexer to the optical input/output port. The optical circulator is configured to direct the reflected light to the photodetector.

In some implementations, the coupling module of the apparatus includes an optical splitter and an optical circulator. The optical circulator is positioned between the monitor light source and the optical splitter. The optical circulator is configured to direct the monitor light from the monitor light source to the optical splitter. The optical splitter includes a first port and a second port. The optical splitter is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter.

In some implementations, the optical splitter of the apparatus is configured to split first reflected light from the first port of the optical splitter into a first portion and a second portion, split second reflected light from the second port of the optical splitter into a first portion and a second portion, send the first portion of the first reflected light and the first portion of the second reflected light to the optical circulator. The optical circulator is configured to send the reflected light from the optical splitter to the photodetector.

In some implementations, the coupling module of the apparatus includes an optical splitter and an optical circulator. The optical splitter includes a first port and a second port. The optical splitter and the optical circulator are configured to provide a first portion of power supply light and a first portion of monitor light to the first port of the optical splitter, and provide a second portion of power supply light and a second portion of monitor light to the second port of the optical splitter. The optical splitter and the optical circulator are configured to provide at least a portion of reflected light received at the first port of the optical splitter and at least a portion of reflected light received at the second port of the optical splitter to the photodetector.

In some implementations, the optical power supply of the apparatus is configured to monitor conditions of a first optical fiber optically coupled to the first port of the optical splitter and a second optical fiber optically coupled to the second port of the optical splitter. In some implementations, the optical power supply is configured to reduce or shut off the power supply light provided to the first and second optical fibers upon determining that the level of the reflected light detected by the photodetector is less than the threshold value.

In some implementations, the coupling module of the apparatus includes a narrow band optical filter positioned between the optical circulator and the photodetector, the narrow band optical filter is configured to allow a larger percentage of the monitor light to pass and a smaller percentage of the power supply light to pass.

In some implementations, the apparatus includes at least one optical input/output port includes a first optical input/output port and a second optical input/output port. The at least one photodetector includes a first photodetector and a second photodetector. The coupling module includes an optical splitter, a first optical circulator, and a second optical circulator. The optical splitter includes a first output and a second output. The first optical circulator is configured to direct light from the first output of the optical splitter to the first optical input/output port, and direct reflected light from the first optical input/output port to the first photodetector. The second optical circulator is configured to direct light from the second output of the optical splitter to the second optical input/output port, and direct reflected light from the second optical input/output port to the second photodetector.

In some implementations, the apparatus includes the first optical circulator is positioned between the first output of the optical splitter and the first optical input/output port. The second optical circulator is positioned between the second output of the optical splitter and the second optical input/output port. The first optical circulator includes a first port, a second port, and a third port, the first port is optically coupled to the first output of the optical splitter, the second port is optically coupled to the first optical input/output port, and the third port is optically coupled to the first photodetector. The second optical circulator includes a first port, a second port, and a third port, the first port is optically coupled to the second output of the optical splitter, the second port is optically coupled to the second optical input/output port, and the third port is optically coupled to the second photodetector.

In some implementations, the optical splitter of the apparatus is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter. The first optical circulator is configured to receive the first portion of the power supply light and the first portion of the monitor light at the first port, and output the first portion of the power supply light and the first portion of the monitor light at the second port. The second optical circulator is configured to receive the second portion of the power supply light and the second portion of the monitor light at the first port, and output the second portion of the power supply light and the second portion of the monitor light at the second port. The first optical circulator is configured to receive, at the second port, reflected light from the first input/output port, and output the reflected light at the third port, and the second optical circulator is configured to receive, at the second port, reflected light from the second input/output port, and output the reflected light at the third port.

In some implementations, the coupling module of the apparatus is configured to provide the combined light to two or more optical fibers, receive reflected monitor light from the two or more optical fibers, and transmit the reflected monitor light from each optical fiber to a corresponding photodetector. The reflected monitor light from different optical fibers are detected by different photodetectors to enable each optical fiber to be monitored individually.

In an aspect, the apparatus includes a transponder module that includes a selective reflector and a data modulator, in which the selective reflector is configured to receive the combined light, transmit the power supply light to the data modulator, and reflect the monitor light back to the optical power supply. The data modulator is configured to modulate the power supply light according to electrical data and generate a modulated optical signal.

In some implementations, the apparatus includes an optical fiber optically coupled between the optical power supply and the transponder module, in which the selective reflector is configured to receive the combined light from the optical fiber and reflect the monitor light back to the optical power supply through the optical fiber.

In some implementations, the coupling module of the apparatus includes an optical circulator having a first port, a second port, and a third port. The optical circulator is configured to receive the power supply light at the first port and transmit the power supply light from the second port to the optical input/output port. The optical circulator is configured to receive reflected power supply light at the second port and transmit the reflected power supply light from the third port to the photodetector.

In some implementations, the coupling module of the apparatus includes an optical splitter having a first port, a second port, a third port, and a fourth port. The optical splitter is configured to receive the power supply light at the first port, transmit a first portion of the power supply light out of the third port, transmit a second portion of the power supply light out of the fourth port, receive first reflected power supply light at the third port, receive second reflected power supply light at the fourth port, and transmit a portion of the first reflected power supply light and a portion of the second reflected power supply light out of the second port to the photodetector.

In some implementations, the optical splitter of the apparatus includes an optical 50/50 splitter. The coupling module includes an optical splitter having a first port, a second port, and a third port. The optical splitter is configured to receive the power supply light at the first port, transmit a first portion of the power supply light out of the third port, receive first reflected power supply light at the third port, and transmit a portion of the first reflected power supply light out of the second port to the photodetector.

In some implementations, the optical splitter of the apparatus includes an optical a/(1−a) splitter, 0<a<1, and a≠0.5. The optical splitter of the apparatus transmits power supply light having a power a·P out of the third port, receives reflected power supply light having a power $P_R$ at the third port, and transmits a portion of the reflected power supply light having a power (1−a)·$P_R$ out of the second port to the photodetector.

In some implementations, the apparatus includes a transponder module configured to receive the power supply light, with or without monitor light, from the optical power supply through a first optical fiber, in which the transponder module includes a data modulator and mechanism for reflecting a portion of the power supply light or the monitor light received from the first optical fiber, either modulated or not modulated, back to the first optical fiber. The data modulator is configured to modulate at least a portion of the power supply light based on electrical data to generate a modulated optical signal.

In some implementations, the power supply light of the apparatus includes continuous-wave light. The power supply light includes one or more trains of periodic optical pulses. In some implementations, the power supply light includes one or more trains of non-periodic optical pulses. The power supply light includes a sequence of optical frame templates.

In an aspect, an apparatus includes a transponder module configured to receive combined light includes power supply light and monitor light from a first optical fiber, at least 10% of optical power in the power supply light and at least 10% of optical power in the monitor light are contained in disjoint frequency bands. The transponder module includes a selective reflector and a data modulator. The selective reflector is configured to receive the combined light from the first optical fiber, transmit the power supply light to the data modulator, and reflect the monitor light back to the first optical fiber. The data modulator is configured to modulate the power supply light based on electrical data to generate a modulated optical signal. The selective reflector includes a wavelength selective multiplexer/demultiplexer and a mirror. The wavelength selective multiplexer/demultiplexer includes a first port, a second port, and a third port, the first port is configured to receive the combined light from the first optical fiber, the second port is configured to output the power supply light to the data modulator, and the third port is configured to output the monitor light to the mirror and receive reflected monitor light from the mirror. The wavelength selective multiplexer/demultiplexer is configured to transmit the reflected monitor light back to the first optical fiber. The selective reflector includes a thin film filter configured to receive the combined light from the first optical fiber, transmit the power supply light to the data modulator, and reflect the monitor light back to reflected monitor light back to the first optical fiber.

In an aspect, an apparatus includes a transponder module configured to receive power supply light, with or without additional monitor light, from a first optical fiber, in which the transponder module includes a data modulator and a reflecting/redirecting module. The reflecting/redirecting module is configured to reflect or redirect a first portion of the light received from the first optical fiber, either with or without modulation, back to the first optical fiber, the first portion of the light having a power level greater than a power level of reflected light caused by a breakage in the first optical fiber. The data modulator is configured to modulate at least a portion of the power supply light based on electrical data to generate a modulated optical signal. In some implementations, the transponder module is configured to receive the power supply light without the additional monitor light, and the reflecting/redirecting module is configured to reflect or redirect a portion of the power supply light back to the first optical fiber. The transponder module includes an optical circulator and a data modulator. The data modulator includes an input port, a first output port, and a second output port. The optical circulator is configured to receive the power supply light from the first optical fiber, transmit the power supply light to the data modulator. In some implementations, the data modulator is configured to modulate the power supply light according to electrical data and generate a first modulated optical signal and a second modulated optical signal, and send the second modulated optical signal to the optical circulator. The optical circulator is configured to send the second modulated optical signal to the first optical fiber. In some implementations, the data modulator has a Mach-Zehnder interferometer configuration.

In some implementations, the transponder module of the apparatus includes a data modulator, the data modulator includes a first port and a second port, the data modulator is configured to modulate the power supply light according to electrical data and generate a first modulated optical signal and a second modulated optical signal. The data modulator is configured to send the second modulated optical signal to the first optical fiber. In some implementations, the data modulator has a reflective Mach-Zehnder interferometer configuration. The reflecting/redirecting module is configured to receive the power supply light with the additional monitor light, and reflect or redirect at least a portion of the monitor light back to the first optical fiber.

In an aspect, an apparatus includes a transponder module configured to receive power supply light from a first optical fiber, in which the transponder module includes a partially reflective device and a data modulator. The partially reflective device is configured to receive the power supply light from the first optical fiber, transmit a first portion of the power supply light to the data modulator, and reflect a second portion of the power supply light back to the first optical fiber. The data modulator is configured to modulate the power supply light based on electrical data to generate a modulated optical signal.

In some implementations, the partially reflective device of the apparatus includes an optical splitter and a mirror. The optical splitter includes a first port, a second port, and a third port, the third port is optically coupled to the mirror. The optical splitter is configured to receive the power supply light at the first port from the first optical fiber, transmit a first portion of the power supply light out of the second port, transmit a second portion of the power supply light from the third port to the mirror, receive reflected power supply light from the mirror at the third port, and transmit a portion of the reflected power supply light out of the first port to the first optical fiber. The optical splitter includes an optical a/(1−a) splitter, $0<a<1$, and $a\neq 0.5$. the optical splitter receives power supply light having a power P at the first port, transmits power supply light having a power $a \cdot P$ out of the second port, sends power supply light having a power $(1-a) \cdot P$ from the third port to the mirror, receives at the third port reflected power supply light that is reflected by the mirror, and transmits a portion of the reflected power supply light out of the first port to the first optical fiber.

In an aspect, an apparatus includes a transponder module configured to receive power supply light from a first optical fiber, in which the transponder module includes an optical circulator and a data modulator. The data modulator includes an input port, a first output port, and a second output port. The optical circulator is configured to receive the power supply light from the first optical fiber, and transmit the power supply light to the data modulator. The data modulator is configured to modulate the power supply light according to electrical data and generate a first modulated optical signal and a second modulated optical signal, the data modulator is configured to send the second modulated optical signal to the optical circulator, and the optical circulator is configured to send the second modulated optical signal to the first optical fiber. In some implementations, the data modulator has a configuration corresponding to a Mach-Zehnder interferometer.

In another aspect, the apparatus includes a transponder module configured to receive power supply light from a first optical fiber, in which the transponder module includes a data modulator configured as a reflective Mach-Zehnder interferometer. The reflective Mach-Zehnder interferometer includes an optical splitter, a first phase modulator, a second phase modulator, a first mirror, and a second mirror. The optical splitter is configured to direct a first portion of the power supply light along a first optical path that travels the first phase modulator in a forward direction, is reflected by the first mirror, and travels the first phase modulator in a reverse direction back to the optical splitter. The optical splitter is configured to direct a second portion of the power supply light along a second optical path that travels the second phase modulator in a forward direction, is reflected by the second mirror, and travels the second phase modulator in a reverse direction back to the optical splitter. The optical splitter is configured to process the reflected first portion and the reflected second portion of the power supply light to generate a first modulated optical signal and a second modulated optical signal. The optical splitter is configured to send the second modulated optical signal to the first optical fiber.

In an aspect, an apparatus includes an optical power supply configured to generate first light, a transponder module configured to modulate a portion of the first light to generate a modulated optical signal. The apparatus includes an optical fiber configured to transmit the first light from the optical power supply to the transponder module. The transponder module is configured to redirect a portion of the first light back to the optical fiber, and the optical fiber is configured to transmit the redirected first light to the optical power supply when the optical fiber is intact. The optical power supply is configured to control a power level of the first light transmitted to the optical fiber based on measurements of the redirected first light received from the optical fiber.

In an aspect, an apparatus includes a first module configured to generate first light, a second module configured to receive the first light. a medium configured to transmit the first light from the first module to the second module. The second module is configured to redirect a portion of the first light back to the medium, and the medium is configured to transmit the redirected first light to the first module when the medium is in a first state. The second module is configured to control a power level of the first light transmitted to the medium based on measurements of the redirected first light received from the medium.

In an aspect, an apparatus includes a transponder module that includes a reflector and a data modulator, in which the reflector is configured to receive a light from an input optical fiber, transmit a first portion of the light to the data modulator, and reflect a second portion of the light back to the input optical fiber. The data modulator is configured to modulate the first portion of the light according to electrical data and generate a modulated optical signal. In some implementations, the optical power of the second portion of the light is at least 5% of the optical power of the light. In some implementations, the optical power of the second portion of the light is at least 10% of the optical power of the light. In some implementations, the optical power of the second portion of the light is at least 20% of the optical power of the light.

In some implementations, the reflector is configured to transmit a first portion of the light within a first optical frequency range and reflect a second portion of the light within a second optical frequency range. In some implementations, the power of the first portion is at least 95% of the optical power of the light. In some implementations, the power of the first portion is at least 90% of the optical power of the light In some implementations, the power of the first portion is at least 80% of the optical power of the light. In some implementations, the power of the second portion is at least 20% of the optical power of the light. In some implementations, the power of the second portion is at least 50% of the optical power of the light. In some implementations, the power of the second portion is at least 80% of the optical power of the light.

In a general aspect, an apparatus includes an optical power supply including: a power supply light source configured to generate power supply light; at least one optical input/output port; at least one photodetector; a coupling module; and a controller. The coupling module is configured to receive the power supply light from the power supply light source and output the power supply light through the optical input/output port, receive reflected light through the optical input/output port, and transmit the reflected light to the photodetector. The photodetector is configured to detect the reflected light and generate a signal representing a level of the reflected light. The controller is configured to compare the level of the detected reflected light with a threshold value, and upon determining that the level of the detected reflected light is less than the threshold value, reduce or turn off the power supply light that is provided to the optical input/output port.

Implementations can include one or more of the following features. The reflected light can include a portion of the power supply light that is output from the optical input/output port and reflected back to the optical input/output port.

The controller can be configured to control the light source to reduce or turn off the power supply light generated by the light source upon determining that the level of the detected reflected light is less than the threshold value.

The controller can be configured to control an optical shutter or attenuator to reduce or block the power supply light that is provided to the optical input/output port.

The apparatus can include a transponder module that includes a reflector and a data modulator, in which the reflector can be configured to receive the power supply light, transmit a first portion of the power supply light to the data modulator, and reflect a second portion of the power supply light back to the optical power supply. The data modulator can be configured to modulate the first portion of the power supply light according to electrical data and generate a modulated optical signal.

The apparatus can include an optical fiber optically coupled between the optical power supply and the transponder module. The reflector can be configured to receive the power supply light from the optical fiber and reflect the second portion of the power supply light back to the optical power supply through the optical fiber.

The optical fiber can include a plurality of segments of optical fibers that are optically coupled by connectors, and the threshold value can be selected to be higher than a sum of all reflected light that is reflected back to the optical power supply by the connectors, and reflected light due to the Fresnel reflection from a broken optical fiber, when the power supply light source outputs the power supply light at a normal operation level.

The apparatus can include the optical shutter or attenuator positioned between the power supply light source and the coupling module. The controller can be configured to control the optical shutter or attenuator to selectively operate in a first state that allows the power supply light to pass to the coupling module, or in a second state that blocks or reduces the power supply light that is provided to the coupling module.

The apparatus can include a monitor light source that is configured to generate monitor light. The coupling module can be configured to combine the power supply light and the monitor light to generate combined light, and provide the combined light to the optical input/output port. The reflected light can include reflected monitor light, and the coupling module can be configured to direct the reflected monitor light to the photodetector.

The coupling module can include a wavelength multiplexer/demultiplexer that is configured to receive the power supply light and the monitor light, combine the power supply light and the monitor light to generate the combined light, and provide the combined light to the optical input/output port.

The power supply light can have a first set of one or more discrete wavelengths or wavelength ranges, and the monitor light can have a second set of one or more discrete wavelengths or wavelength ranges. In some examples, at least 10% of optical power in the power supply light and at least 10% of optical power in the monitor light can be contained in disjoint frequency bands.

In some examples, at least 50% of optical power in the power supply light and at least 50% of optical power in the monitor light can be contained in disjoint frequency bands.

In some examples, at least 90% of optical power in the power supply light and at least 90% of optical power in the monitor light can be contained in disjoint frequency bands.

The coupling module can include an optical circulator that is positioned between the monitor light source and the wavelength multiplexer/demultiplexer. The optical circulator can include a first port, a second port, and a third port. The first port can be optically coupled to the monitor light source, the second port can be optically coupled to the wavelength multiplexer/demultiplexer, and the third port can be optically coupled to the photodetector. The optical circulator can be configured to receive the monitor light at the first port and output the monitor light at the second port.

The optical circulator can be configured to receive the reflected light at the second port and output the reflected light at the third port.

The coupling module can include an optical circulator that is positioned between the monitor light source and the wavelength multiplexer/demultiplexer. The optical circulator can be configured to direct the monitor light from the monitor light source to the wavelength multiplexer/demultiplexer. The optical circulator can be configured to direct the reflected light to the photodetector.

The coupling module can include an optical circulator that is positioned between the wavelength multiplexer/demultiplexer and the optical input/output port. The optical circulator can include a first port, a second port, and a third port. The first port can be optically coupled to the wavelength multiplexer/demultiplexer, the second port can be optically coupled to the optical input/output port, and the third port can be optically coupled to the photodetector. The optical circulator can be configured to receive the combined light at the first port and output the combined light at the second port. The optical circulator can be configured to receive the reflected light at the second port and output the reflected light at the third port.

The coupling module can include an optical circulator that is positioned between the wavelength multiplexer/demultiplexer and the optical input/output port. The optical circulator can be configured to direct the light from the wavelength multiplexer/demultiplexer to the optical input/output port. The optical circulator can be configured to direct the reflected light to the photodetector.

The coupling module can include an optical splitter and an optical circulator. The optical circulator can be positioned between the monitor light source and the optical splitter. The optical circulator can be configured to direct the monitor light from the monitor light source to the optical splitter. The optical splitter can include a first port and a second port. The optical splitter can be configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter. The optical splitter can be configured to split first reflected light from the first port of the optical splitter into a first portion and a second portion, split second reflected light from the second port of the optical splitter into a first portion and a second portion, send the first portion of the first reflected light and the first portion of the second reflected light to the optical circulator. The optical circulator can be configured to send the reflected light from the optical splitter to the photodetector.

The coupling module can include an optical splitter and an optical circulator. The optical splitter can include a first port and a second port. The optical splitter and the optical circulator can be configured to provide a first portion of power supply light and a first portion of monitor light to the first port of the optical splitter, and provide a second portion of power supply light and a second portion of monitor light to the second port of the optical splitter. The optical splitter and the optical circulator can be configured to provide at least a portion of reflected light received at the first port of the optical splitter and at least a portion of reflected light received at the second port of the optical splitter to the photodetector.

The optical power supply can be configured to monitor conditions of a first optical fiber optically coupled to the first port of the optical splitter and a second optical fiber optically coupled to the second port of the optical splitter, and reduce or shut off the power supply light provided to the first and second optical fibers upon determining that the level of the reflected light detected by the photodetector is less than the threshold value.

The coupling module can include a narrow band optical filter positioned between the optical circulator and the photodetector, and the narrow band optical filter can be configured to allow a larger percentage of the monitor light to pass and a smaller percentage of the power supply light to pass.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 9 to 13A are diagrams of examples of optical communications systems.

FIG. 13B is a diagram of an example of an optical cable assembly used in the optical communication system of FIG. 13A.

FIGS. 16 and 17A are diagrams of examples of optical communication systems.

FIG. 17B is a diagram of an example of an optical cable assembly.

DETAILED DESCRIPTION OF SOME EMBODIMENTS

Figure 1:
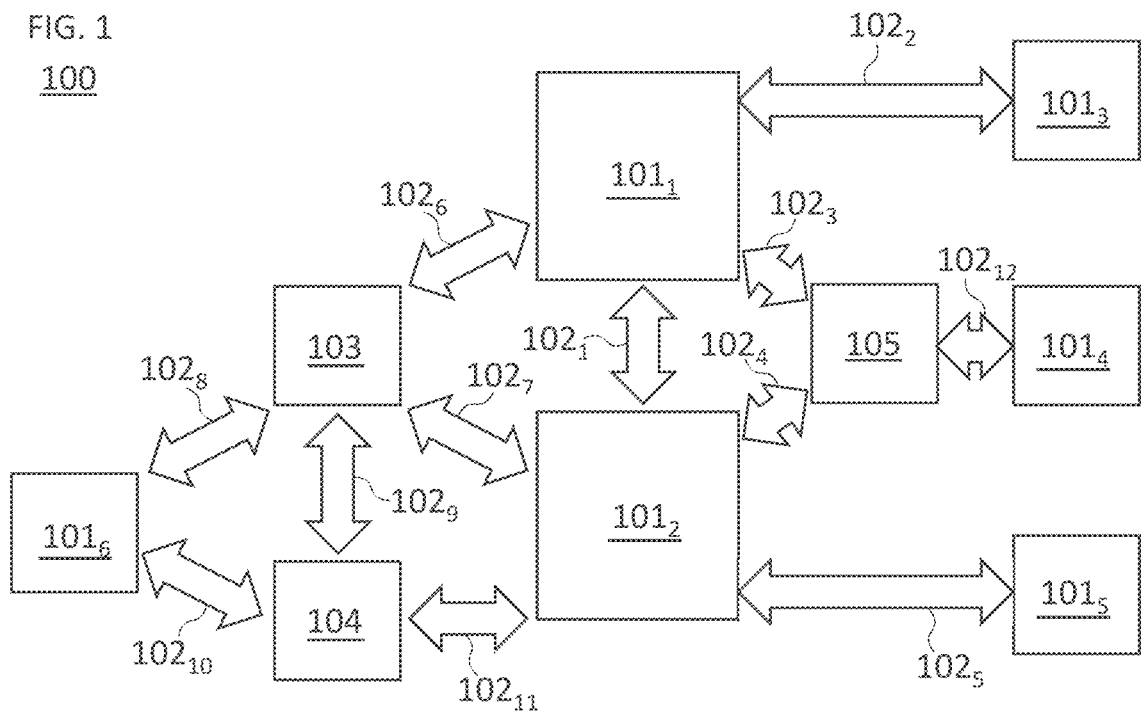
FIG. 1 shows a block diagram of an optical communication system in which at least some embodiments may be practiced.

At least some embodiments may benefit from the use of a light source configured to supply pulsed light for local optical modulation and/or as a clock reference within a corresponding island of synchronicity, e.g., as disclosed in U.S. patent application Ser. No. 16/847,705, filed on Apr. 14, 2020, which is incorporated herein by reference in its entirety.

Emerging optical interconnects aim to co-package and even co-integrate optical transponders with electronic processing chips, which necessitates transponder solutions that consume relatively low power and that are sufficiently robust against significant temperature variations as may be found within an electronic processing chip package. Of significant interest are massively spatially parallel optical interconnect solutions that multiplex information onto relatively few wavelengths and use a relatively large number of parallel spatial paths for chip-to-chip interconnection. In such systems, it may be beneficial to place the light source outside the package housing the corresponding photonic and electronic processing chips, and to connect the light source to the package via one or more optical fibers. In some such systems, the light source may be placed at a separate location optically connected to the package by, e.g., by at least one meter of optical fiber.

In some such systems, at least some photonic components within the package may be polarization sensitive, i.e., may only accept or may only properly process light of a certain polarization state. For example, a one-dimensional vertical grating coupler, which may serve as a coupling interface to the optical fiber connecting the light source to the package, may only couple light of one particular polarization from the fiber to the photonic processing chip while rejecting, deflecting, or dissipating other light. In another example, an optical modulator integrated within a package may effectively modulate only light in one particular polarization state. In such systems, it may therefore be beneficial to connect the light source with the corresponding electronic and photonic processing chips using polarization-maintaining optical fiber (PMF). However, some systems employing PMF may be more difficult and/or more expensive to manufacture than systems employing standard, non-polarization-maintaining optical fiber (SF), e.g., because PMF may be more expensive than SF, and PMF may require rotationally aligned optical fiber connections. SF, however, may not preserve the polarization state of the light upon its transmission from the light source to the package housing.

Some systems that use SF to connect the light source with a photonic chip may therefore require either an active optical polarization control mechanism or a polarization-diversity setup. In some such systems, polarization diversity may be implemented by doubling the number of data modulators within the package, e.g., as disclosed in U.S. Pat. No. 5,654,818, which is incorporated herein by reference in its entirety. In some such systems, polarization diversity may be implemented by using more-complex optical data modulator structures, e.g., a 4-port optical modulator disclosed in U.S. Pat. No. 10,222,676, which is incorporated herein by reference in its entirety.

U.S. Pat. Nos. 6,959,152 and 7,106,970, which are incorporated herein by reference in their entirety, disclose some systems configured to use temporally interleaved and orthogonally polarized trains of optical pulses at the same optical wavelength. However, such temporal interleaving may lead to a significant timing jitter and/or pulse broadening at the modulator due to random polarization rotations within the corresponding SF. U.S. patent application 63/145,368, filed on Feb. 3, 2021, is also incorporated herein by reference in its entirety.

At least some of the above-indicated problems in the state of the art can be addressed by the use of various embodiments employing a polarization-diversity optical power supply, e.g., as outlined in this specification. For example, a need for PMF may beneficially be circumvented.

FIG. 1 shows a block diagram of a communication system 100 in which at least some embodiments may be practiced. As shown, system 100 comprises nodes 101$_1$-101$_6$, which in some embodiments may each comprise one or more of: optical communication devices, electronic and/or optical switching devices, electronic and/or optical routing devices, network control devices, traffic control devices, synchronization devices, computing devices, and data storage devices. Nodes 101$_1$-101$_6$ may be suitably interconnected by optical fiber links 102$_1$-102$_{12}$ establishing communication paths between the communication devices within the nodes. System 100 may also comprise one or more optical power supply modules 103 producing one or more light supply outputs.

As used herein, a "light supply" or "supplied light" is light intended for use as a modulation carrier in one or more of the optical communication devices of the nodes $101_1$-$101_6$ whose complex optical field amplitude is "steady." Herein, light is referred to as being "steady" either if said light comprises one or more continuous-wave (CW) optical fields or if said light comprises one or more optical pulse trains of period $T_I$ (where pulse repetition rate $R_I$=1/$T_1$), each of the pulse trains having a substantially constant respective optical-pulse amplitude and a substantially constant respective optical-pulse duration over a time interval that is significantly longer (e.g., at least by a factor of 100) than the duration $T_S$ of a modulation symbol used for optical communication in system 100. (Hereafter, $R_S$=1/$T_S$ is referred to as the modulation symbol rate.)

As used herein, light is called "continuous-wave (CW)" if the complex amplitude of the optical field of said light is approximately (e.g., to within ±20%) constant over a duration $T_{CW}$ that is much longer than a minimum characteristic duration used by communication signals within system 100. In some embodiments, light may be referred to as being CW light if the complex amplitude of the optical field of said light is approximately constant over at least 100 times the duration $T_S$ of a modulation symbol, i.e., $T_{CW} \geq 100\ T_S$. In some embodiments, light may be referred to as being CW light if the complex amplitude of the optical field of said light is approximately constant over a at least $T_{CW} \geq 1000\ T_S$. In some embodiments, the term "continuous-wave" (or CW) may also be applicable to an optical field affected by random noise, random drifts, or small analog dither modulations using one or more sinewave dither tones at frequencies much lower than $R_S$, e.g., at frequencies smaller than $R_S$/1000, as long as the effect of noise, drift, or dither is not so strong as to induce optical intensity variations, e.g., exceeding ±20% of the average optical intensity within a duration $T_{CW}$.

As used herein, the phrase an "optical pulse train of period $T_I$" refers to an optical field whose optical intensity waveform $I(t)=|E_0(t)|^2$ is periodic with the time period $T_I$. In some embodiments, the complex amplitude $E_0(t)$ of the optical field of an optical pulse train may be periodic with an integer multiple of $T_I$, i.e., with a period of n $T_I$, where n=1, 2, 3, . . . .

As used herein, the term "periodic" refers to a waveform characterized by a parameter or feature (or a change of a parameter or feature) that is repeated every time period T within a duration of time $T_D$, where $T_D$ is significantly larger than T, e.g., $T_D \geq 100$ T. In some cases, the term "periodic" may also be applicable to a waveform affected by random noise, random drifts, or small analog dither modulations using one or more sinewave dither tones at frequencies much lower than 1/T, e.g., at frequencies smaller than 1/(1000 T), as long as the effect of noise, drift, or dither is not so strong as to obscure (e.g., make substantially undetectable) the waveform periodicity.

In some embodiments, a light supply may also comprise control information. Control information may be used by other network elements of system 100, e.g., as described in the above-cited U.S. patent application Ser. No. 16/847,705. As used herein, the term "control information" refers to information imprinted by optical power supply module 130 onto one or more light supplies for the purpose of controlling, managing, and/or monitoring one or more network elements of system 100, and/or for facilitating various synchronization operations within one or more network elements of system 100. In some embodiments, control information may comprise one or more of: a clock frequency, a clock phase, a synchronization time stamp, a frame delimiter, a frame counter, status information, a heartbeat signal, and a command that may be used to control the behavior of other network elements, such as a master/slave assignment or a reset command.

For illustration purposes, only one such optical power supply module 103 is shown in FIG. 1. A person of ordinary skill in the art will understand that some embodiments may have more than one optical power supply module 103 appropriately distributed over system 100 and that such multiple optical power supply modules may be synchronized, e.g., using some of the techniques disclosed in the above-cited U.S. patent application Ser. No. 16/847,705.

Some end-to-end communication paths may pass through an optical power supply module 103 (e.g., see the communication path between nodes $101_2$ and $101_6$). For example, the communication path between nodes $101_2$ and $101_6$ may be jointly established by optical fiber links $102_7$ and $102_8$, whereby light supplied by optical power supply module 103 is multiplexed onto optical fiber links $102_7$ and $102_8$.

Some end-to-end communication paths may pass through one or more optical multiplexing units 104 (e.g., see the communication path between nodes $101_2$ and $101_6$). For example, the communication path between nodes $101_2$ and $101_6$ may be jointly established by optical fiber links $102_{10}$ and $102_{11}$. Multiplexing unit 104 is also connected, through link $102_9$, to receive light supplied by optical power supply module 103 and, as such, may be operated to multiplex said received light supply onto optical fiber links $102_{10}$ and $102_{11}$.

Some end-to-end communication paths may pass through one or more optical switching units 105 (e.g., see the communication path between nodes $101_1$ and $101_4$). For example, the communication path between nodes $101_1$ and $101_4$ may be jointly established by optical fiber links $102_3$ and $102_{12}$, whereby light from optical fiber links $102_3$ and $102_4$ is either statically or dynamically directed to optical fiber link $102_{12}$.

As used herein, the term "network element" refers to any element that generates, modulates, processes, or receives light within system 100 for the purpose of communication. Example network elements include a node 101, an optical power supply module 103, an optical multiplexing unit 104, and an optical switching unit 105.

Some light supply distribution paths may pass through one or more network elements. For example, optical power supply module 103 may supply light to node $101_4$ via optical fiber links $102_7$, $102_4$, and $102_{12}$, letting the supply light pass through network elements $101_2$ and 105.

Figure 2:
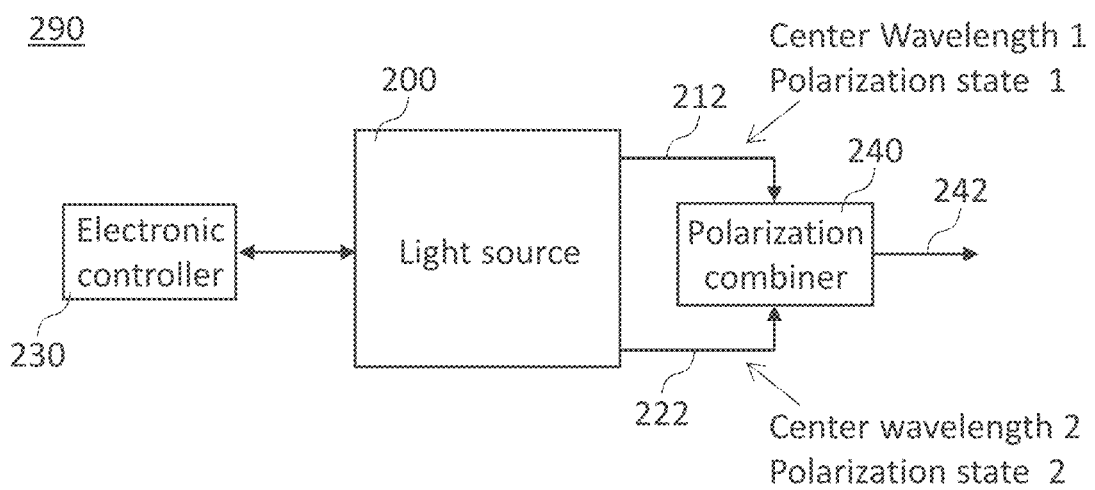
FIG. 2 shows a block diagram of an optical power supply module that can be used in the optical communication system of FIG. 1 according to an example embodiment.

FIG. 2 shows a block diagram of an optical power supply 290 that may be used as part of optical power supply module 103 to create a light supply for use in system 100 according to an example embodiment. Optical power supply 290 comprises: (i) a light source 200 possessing two light outputs 212 and 222, each in a single state of polarization; (ii) an electronic controller 230 configured to control light source 200 such as to establish time/frequency orthogonality between light output 212 and light output 222; and a polarization combiner 240 configured to multiplex light outputs 212 and 222 onto two orthogonal polarization states at its output 242.

Herein, a "polarization combiner" is an optical device having two input ports (e.g., connected to 212 and 222) and at least one output port (e.g. 242) and configured to multiplex light in a first polarization state at its first input port onto a first polarization state of light on one of its output ports, and light in a second polarization state at its second input port onto a second polarization state of light on the same output port, the second polarization state at output port 242 being approximately orthogonal to the first polarization state at output port 242. In some embodiments, the two orthogonal polarization states at output port 242 may be horizontally and vertically linearly polarized, respectively. In some other embodiments, the two orthogonal polarization states at output port 242 may be left-handed and right-handed circularly polarized, respectively. In some other embodiments, the two orthogonal polarization states at output port 242 may be relatively orthogonally, elliptically polarized states. In some embodiments, the polarization states at input ports 212 and 222 may be identical. In some other embodiments, the polarization states at input ports 212 and 222 may be orthogonal. In some embodiments, polarization combiner 240 may include polarization-sensitive optical elements, e.g., be implemented as a polarization beam combiner. In some other embodiments, polarization combiner 240 may not include any polarization-sensitive elements, e.g., be implemented as a polarization-maintaining optical power combiner or as a polarization-maintaining wavelength multiplexer.

Figure 7A:
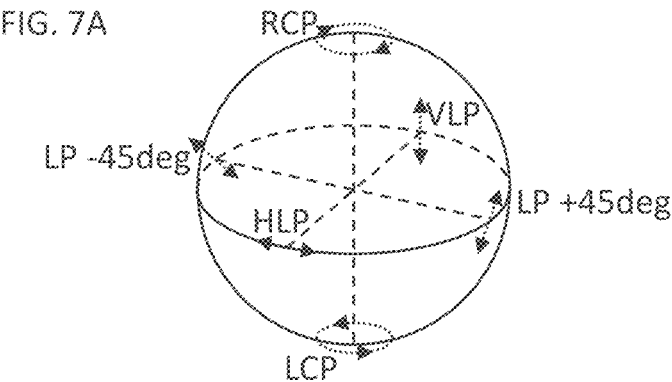
FIGS. 7A-7D graphically show some example use cases illustrating polarization-rotation independent optical-power splitting that may be implemented in the optical communication system of FIG. 1 according to some embodiments.

The concept of "polarization state" is graphically illustrated in FIG. 7A. For example, light in a linear polarization state may be represented by a complex electrical field vector $$\vec{E}(t) = E_0(t)\exp(j2\pi ft)\vec{e}_x, \quad (1)$$

wherein the unit vector $\vec{e}_x$ may maintain its direction along a linear Cartesian axis (e.g., the x-axis as defined with respect to the fixed coordinate system of light source 200) to an accuracy of, e.g., within ±20 degrees over a relatively long duration, e.g., about one hour. In some embodiments, the unit vector $\vec{e}_x$ may maintain its direction along a linear Cartesian axis to within an accuracy of, e.g., ±20 degrees for the duration of typical normal operation of optical power supply 290. In the above expression, $E_0(t)$ is the constant or time-varying complex amplitude of the complex electrical field vector, f is the optical frequency, t denotes the time variable and $j=\sqrt{-1}$. In another example, a circular polarization state may be represented by a complex electrical field vector $$\vec{E}(t) = E_0(t)/\sqrt{2}\exp(j2\pi ft)[\vec{e}_x + \exp(j\pi/2)\vec{e}_y], \quad (2)$$

wherein the unit vector $\vec{e}_y$ is orthogonal to $\vec{e}_x$ and both unit vectors maintain their directions along two orthogonal linear Cartesian axis to within an accuracy of, e.g., ±20 degrees over a relatively long duration of, e.g., about one hour. As used herein, the term "polarized light" denotes light in some well defined polarization state.

As used herein, two optical fields are said to be "time/frequency orthogonal" if the degree of orthogonality Y of the two optical fields' complex amplitudes $E_1(t)$ and $E_2(t)$, defined as $$\eta = 1 - |\int_t^{t+T} E_1(\tau)E_2^*(\tau)d\tau|^2 / (\int_t^{t+T}|E_1(\tau)|^2 d\tau \int_t^{t+T}|E_2(\tau)|^2 d\tau) \quad (3)$$

is close to 1, e.g., has a value between 0.8 and 1. Herein, the integration time interval [t, t+T] represents the time interval during which time/frequency orthogonality is to be determined. If at least one of the optical fields $E_1(t)$ and $E_2(t)$ has a non-periodic complex amplitude, the integration time interval is chosen to be long compared to a characteristic time duration within system 100, for example, duration T may be chosen to be at least 10 times a duration $T_S$ of a modulation symbol, at least 10 times a duration of an information packet, or at least 10 times a duration of an optical frame template. If both optical fields have periodic complex amplitudes $E_1(t)$ or $E_2(t)$ with period T, then the time duration T may be chosen as the duration over which the above integrals are being taken. In some embodiments, two fields may be called time/frequency orthogonal if η is greater than 0.8. In some embodiments two fields may be called time/frequency orthogonal if η is greater than 0.9. In some embodiments two fields may be called time/frequency orthogonal if η is greater than 0.99. The degree of orthogonality j may also be expressed in the frequency domain as $$\eta = 1 - |\int_{-\infty}^{\infty} E_1(f)E_2^*(f)df|^2/(\int_{-\infty}^{\infty}|E_1(f)|^2 df \int_{-\infty}^{\infty}|E_2(f)|^2 df). \quad (4)$$

From the above two definitions (see Eqs. (3) and (4)), it may be seen that two optical fields are time-frequency orthogonal, e.g., if they are: (i) spectrally disjoint, i.e., if the spectral contents of the two fields are primarily located at mutually exclusive optical frequencies; and/or (ii) temporally disjoint, i.e., the complex amplitudes of the two optical fields differ from zero primarily at mutually exclusive times. In some embodiments, two optical fields may be time/frequency orthogonal if they overlap both in time and in frequency, provided that their degree of orthogonality is close to 1, e.g., as indicated by the example values/ranges of η mentioned above.

In some embodiments, light source 200 produces light of different respective optical center frequencies for light outputs 212 and 222. As used herein, the term "optical center frequency" refers to the center of mass of the power spectral density of an optical field. In some embodiments, controller 230 may operate to control the optical frequency separation of light outputs 212 and 222 generated by light source 200, e.g., the difference between the two light sources' optical center frequencies.

In some embodiments, light source 200 may operate to generate two continuous-wave (CW) light outputs.

In some embodiments, light source 200 may be configured to let light outputs 212 and 222 comprise optical pulse trains of approximately (e.g., to within ±1%) the same period $T_f$. In some embodiments, the shape of the optical pulses of the pulse train on light output 212 may differ from the shape of the optical pulses of the pulse train on light output 222. In some embodiments, the shape of the optical pulses of the pulse train on light output 212 may be approximately the same as the shape of the optical pulses of the pulse train on light output 222. In some embodiments, controller 230 may be configured to phase-lock said optical pulse trains with respect to one another. In some embodiments, controller 230 may be configured to synchronize said optical pulse trains such that the centers of the optical pulses on light output 212 are temporally aligned with the centers of the pulses on light output 222. As used herein, the term "center of a pulse" refers to a time corresponding to the center of mass of a pulse's intensity waveform. In some embodiments, controller 230 may be configured to synchronize said optical pulse trains such that the centers of the optical pulses on light output 212 are temporally offset from the centers of the pulses on light output 222 by a fixed amount ΔT. In some embodiments, ΔT<$T_f$/2. In some embodiments, ΔT<$T_f$/4.

In some embodiments, controller 230 may invoke light outputs 212 and 222 to carry control information. Control information may be used by other network elements of system 100, e.g., as described in the above-cited U.S. patent application Ser. No. 16/847,705. As used herein, the term "control information" refers to information imprinted by optical power supply 290 onto one or both of light outputs 212 and 222 (e.g., equally or unequally) for the purpose of controlling, managing, and/or monitoring one or more network elements of system 100, and/or for facilitating various synchronization operations within one or more network elements of system 100. In some embodiments, control information may comprise one or more of: a clock frequency, a clock phase, a synchronization time stamp, a frame delimiter, a frame counter, status information, a heartbeat signal, and a command that may be used to control the behavior of other network elements, such as a master/slave assignment or a reset command. Different types of control information may be imprinted equally or unequally onto both light outputs 212 and 222 using different features thereof. For example, some types of control information may be imprinted using any suitable data modulation equally or unequally imprinted on both light outputs 212 and 222. In various embodiments, control information may be imprinted using an approximately equal change of intensity, phase, frequency, or polarization of light 212 and 222.

Figure 3A:
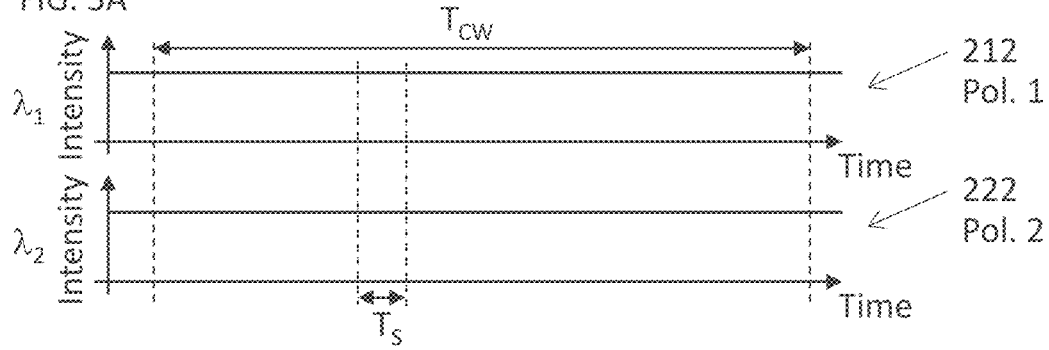
FIGS. 3A-3E illustrate some features of the light generated by an optical power supply in the optical communication system of FIG. 1 according to some embodiments.

FIGS. 3A-3E illustrate various features of light outputs 212 and 222 of optical power supply 290 according to some embodiments. FIG. 3A illustrates intensity-versus-time plots of some embodiments of light outputs 212 and 222. In these particular embodiments, light outputs 212 and 222 may be CW at different optical frequencies $f_1=c/\lambda_1$ and $f_2=c/\lambda_2$, respectively, where $\lambda_1$ and $\lambda_2$ are the wavelengths associated with optical frequencies $f_1$ and $f_2$ and c is the speed of light in the medium in which the wavelengths are being measured.

Figure 3B:
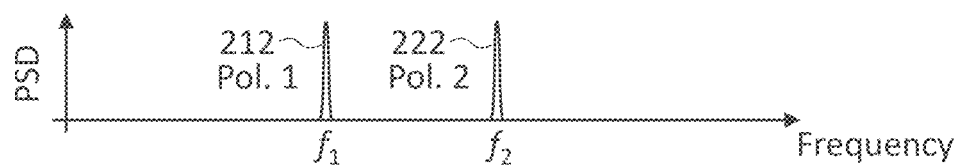

FIG. 3B illustrates the optical power-spectral densities (PSDs) of light outputs 212 and 222. In some embodiments, the optical frequency difference $\Delta f=|f_1-f_2|$ between light output 212 and light output 222 may be significantly larger than the symbol rate $R_S$ used for communication by a transmitter of node 101 that receives light for modulation from optical power supply 290, i.e., $\Delta f \gg R_S$. In some embodiments, $\Delta f > 2\ R_S$. In some other embodiments, $\Delta f > 5\ R_S$. In some other embodiments, the frequency difference $\Delta f$ may be chosen to be approximately (e.g., to within ±10%) an integer multiple of $R_S$, i.e., $\Delta f \approx n\ R_S$, with n=1, 2, 3, . . . . In some embodiments, $\Delta f \approx R_S$. In some embodiments, $\Delta f \approx 2\ R_S$.

Figure 3C:
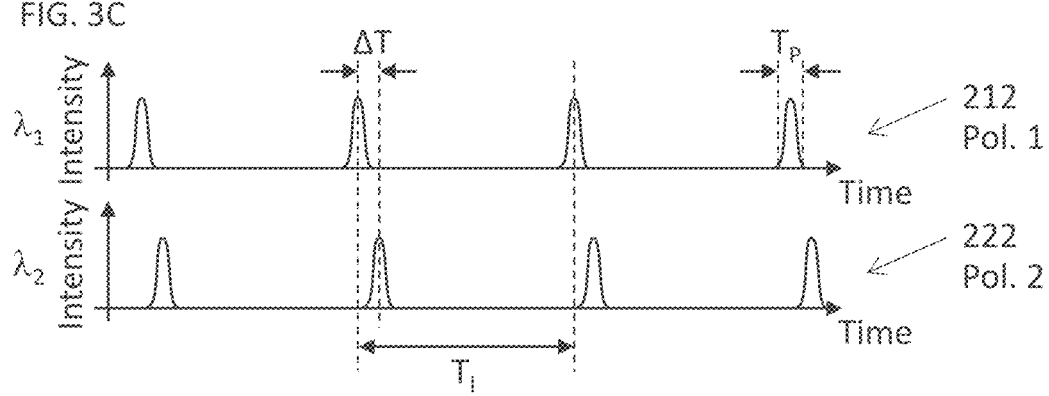

FIG. 3C shows intensity-versus-time plots of light outputs 212 and 222 for some example embodiments. In these embodiments, light outputs 212 and 222 may, each on a different respective optical center frequency $f_1 \neq f_2$, carry an optical pulse train of period $T_I$ and pulse duration $T_P$. In some embodiments, $T_P$ may be defined as the full-width-at-half height of a pulse's optical intensity waveform. In other embodiments, $T_P$ may be defined as the reciprocal of the 3-dB bandwidth of the optical pulse spectrum. In some embodiments, $T_P$ may be approximately equal to one half of the pulse train period $T_I$, i.e., $T_P \approx T_I/2$. In some embodiments, the pulse train of light output 212 may be temporally offset by an amount of time $\Delta T$ relative to the pulse train of light output 222. In some embodiments, the temporal offset $\Delta T$ may be larger than 1.5 times the full-width-at-half-height of the pulses constituting the pulse trains. In some other embodiments, the temporal offset $\Delta T$ may be larger than 2 times the full-width-at-half-height of the pulses constituting the pulse trains. In some embodiments, the temporal offset may be significantly smaller than $T_I/2$. In some embodiments, $\Delta T \approx 0$. In some embodiments, temporal alignment may imply $\Delta T < T_P/10$. In some embodiments, temporal alignment may imply $\Delta T < T_P/100$. In some embodiments, temporal alignment may imply $\Delta T < T_I/10$. In some embodiments, temporal alignment may imply $\Delta T < T_I/100$.

Figure 3D:
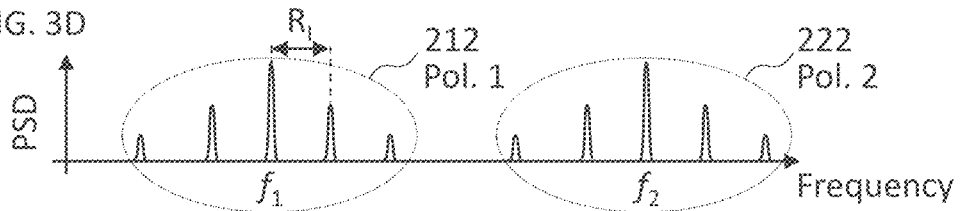
Figure 3E:
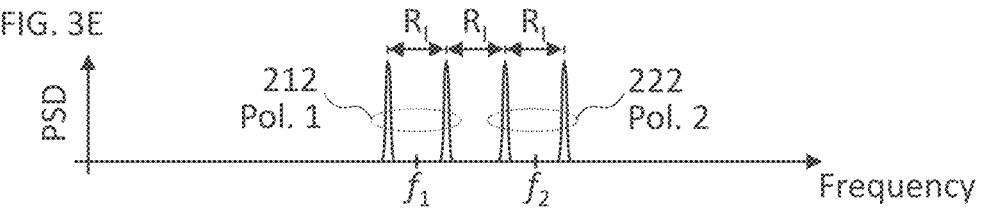

FIGS. 3D and 3E illustrate optical spectra of light outputs 212 and 222 according to some example embodiments. In some embodiments, the frequency separation $\Delta f = |f_1-f_2|$ may be significantly larger than the pulse repetition rate $R_I=1/T_I$, i.e., $\Delta f \gg R_I$. In some other embodiments, $\Delta f > 5\ R_I$. In some other embodiments, the frequency difference $\Delta f$ may be chosen to be approximately (e.g., to within ±10%) an integer multiple of $R_I$, i.e., $\Delta f \approx n\ R_1$, with n=2, 3, 4, . . . . In some embodiments, $\Delta f \approx 2\ R_I$. In some embodiments, $\Delta f \approx 3\ R_I$. In some embodiments, visualized in FIG. 3E, the complex amplitude of light output 212 and light output 222 may each have a sinusoidal time dependence of period $R_I/2$, i.e., the spectra of light output 212 and light output 222 each comprise two tones spaced by $R_I$. The resulting temporal intensity waveforms are therefore proportional to $\sin^2(\pi R_I t)$ for the corresponding pulse trains at light outputs 212 and 222. In various embodiments, the center frequencies of light outputs 212 and 222 may be spaced by $2\ R_I$, i.e., the four tones jointly making up light outputs 212 and 222 are all spaced by $R_I$. In various embodiments, the optical phase difference between spectrally adjacent tones is constant, e.g., the phase difference between the tone at frequency $f_1-R_I/2$ and the tone at frequency $f_1+R_I/2$ is the same as the phase difference between the tone at frequency $f_2-R_I/2$ and the tone at frequency $f_2+R_I/2$. Such a constant phase progression may ensure that the temporal skew between pulse trains at light outputs 212 and 222 is approximately zero, e.g., $\Delta T=0$. In some embodiments, the tone at frequency $f_1+R_I/2$ and the tone at frequency $f_2-R_I/2$ may also have the same as the phase difference as the phase difference between the tone at frequency $f_1-R_I/2$ and the tone at frequency $f_1+R_I/2$.

FIGS. 4A-4F illustrate various embodiments of optical power supply 290. Various embodiments corresponding to FIGS. 4A-4C implement some of the schemes described above in reference to FIGS. 3A-3B. In the example embodiment shown in FIG. 4A, two CW laser sources 410 and 420 operate to emit polarized light (i.e., light in respective specific polarization states) at different respective wavelengths $\lambda_1$ and $\lambda_2$ that may be optically amplified using polarization-maintaining optical amplifiers 413 and 423. The two sources of CW light may be polarization-combined using optical polarization combiner 440, configured to combine polarized light on its two input ports 412 and 422 onto two orthogonal polarization states at its output port 441. Spectral characteristics of optical polarization combiner 440 are such that light of both wavelengths $\lambda_1$ and $\lambda_2$ can be passed through with little attenuation. In some embodiments, polarization combiner 440 may be a polarization beam combiner. In some other embodiments, polarization combiner 440 may be a polarization-maintaining optical power combiner. In yet some other embodiments, polarization combiner 440 may be a polarization-maintaining wavelength multiplexer. Polarization combiner 440 may be followed by a polarization-independent optical amplifier 443. Lasers 410 and 420 may be wavelength-controlled by a wavelength controller 430.

Figure 4A:
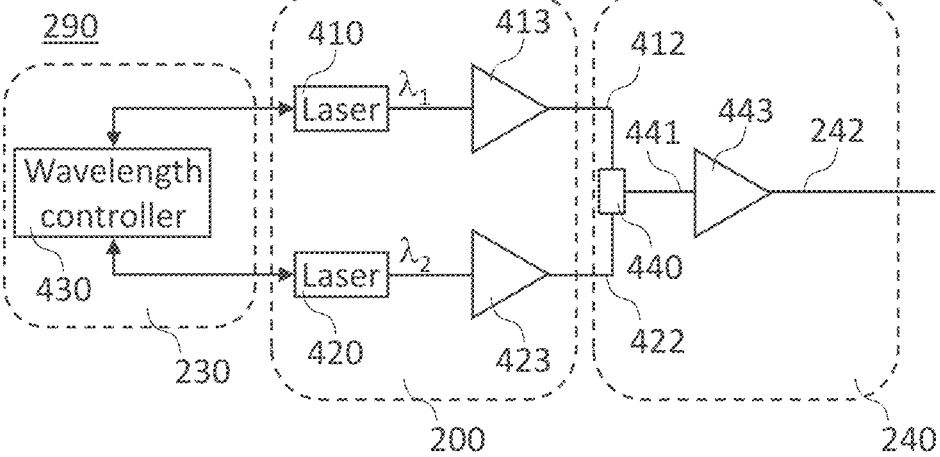
FIGS. 4A-4F illustrate optical power supplies, one or more of which may be used in the optical communication system of FIG. 1 according to some embodiments.
Figure 4B:
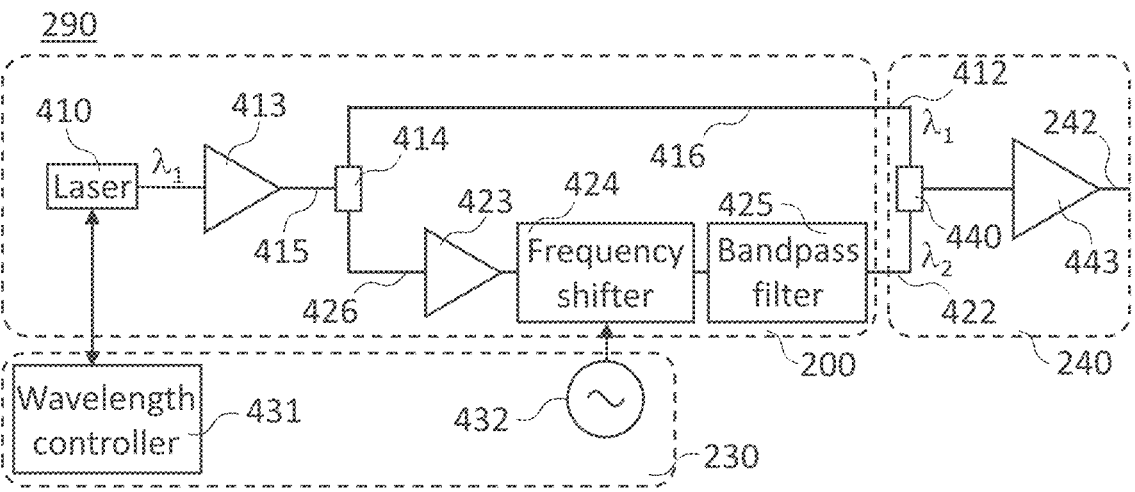

In the embodiment of optical power supply 290 shown in FIG. 4B, CW laser source 410 at wavelength $\lambda_1$ may be free-running or may be wavelength-locked by a wavelength controller 431 and configured to emit polarized light. Light generated by laser source 410 may be amplified by polarization-maintaining optical amplifier 413 before being split by an optical splitter 414. In some embodiments, optical splitter 414 may be a polarization-maintaining optical power splitter. In some other embodiments, optical splitter 414 may be a polarization beam splitter configured to split polarized light incident on its input 415 into two orthogonally polarized parts at its two outputs 416 and 426. In some embodiments, optical splitter 414 may be a linear polarization splitter oriented at 45 degrees relative to the linear polarization state of the incident laser light on its input 415. A portion 416 of the split light at wavelength $\lambda_1$ may be passed directly to combiner 440, while a portion 426 of the split light may be frequency-shifted using an optical frequency shifter 424, driven by, e.g., a sinusoidal electrical reference signal 432. In some embodiments, frequency shifter 424 includes one of: an acousto-optic modulator, a single-sideband modulator, and a Mach-Zehnder modulator. In some embodiments, frequency shifter 424 may be followed by an optional optical bandpass filter 425 that may pass only one of the several tones that may be generated by the upstream frequency shifter 424. An additional optical amplifier 423 may be used to compensate for optical losses. Frequency-shifted light at port 422 may be polarization-combined with frequency un-shifted light at port 412 in combiner 440.

Figure 4C:
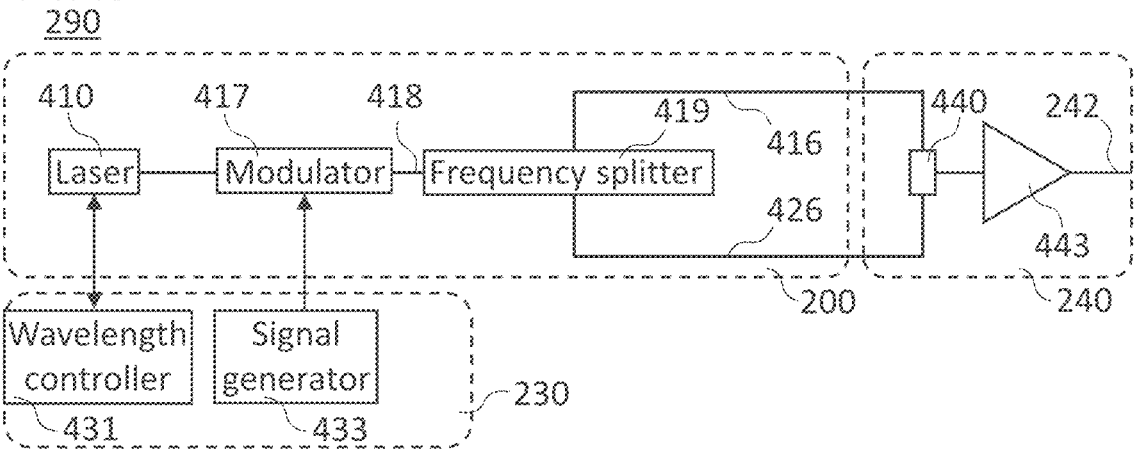

In the embodiment of optical power supply 290 shown in FIG. 4C, CW laser source 410 may be free-running or wavelength-controlled by wavelength controller 431. The output of laser source 410 may be modulated by an optical modulator 417 driven by an electrical signal generator 433. Modulator 417 may be configured to split a CW optical field at its input into two spectral tones at its output. For example, modulator 417 may be a Mach-Zehnder modulator biased at its transmission null and driven by a sinusoidal electrical signal whose amplitude is substantially smaller than the modulator's half-wave voltage and whose period is T. This mode of operation is known to suppress the incoming CW tone at optical frequency $f_0$ and to produce two spectral tones at $f_{1,2}=f_0\pm T$ at the modulator output. The two tones constituting an optical field 418 may be frequency-split by an optical frequency splitter 419 into portions 416 and 426. In some embodiments, optical frequency splitter 419 may be implemented using an optical (de)interleaver. Portions 416 and 426 may then be polarization-orthogonally combined using combiner 440. In some embodiments, modulator 417 may further be configured to imprint control information on optical field 418. For example, modulator 417 may be configured to periodically extinguish light of optical field 418 for a brief amount of time. In some embodiments, modulator 417 may be configured to extinguish light of optical field 418 for a duration of 2 $T_S$ once per period of duration 1000 $T_S$. In some embodiments, modulator 417 may be configured to modulate a time stamp onto light 418 for a duration of 10 $T_S$ once per period of duration 10000 $T_S$.

Figure 4D:
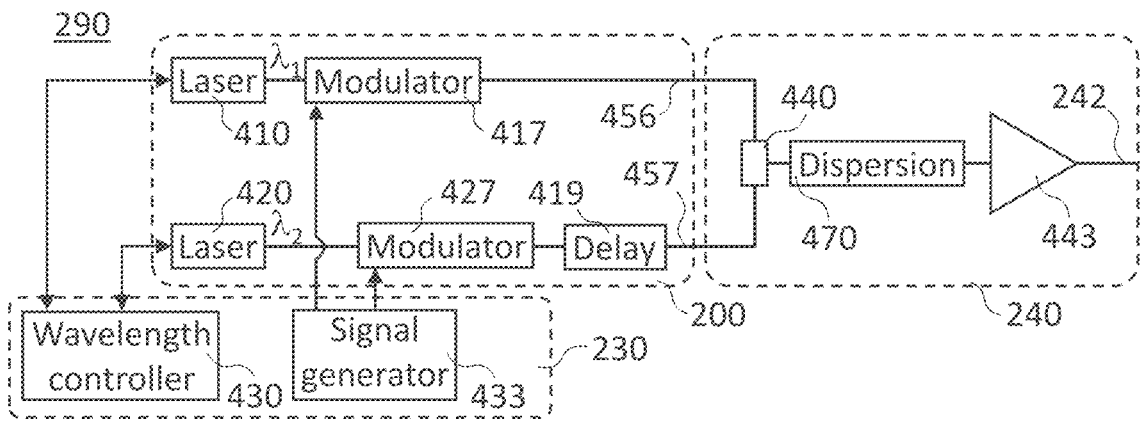
Figure 4E:
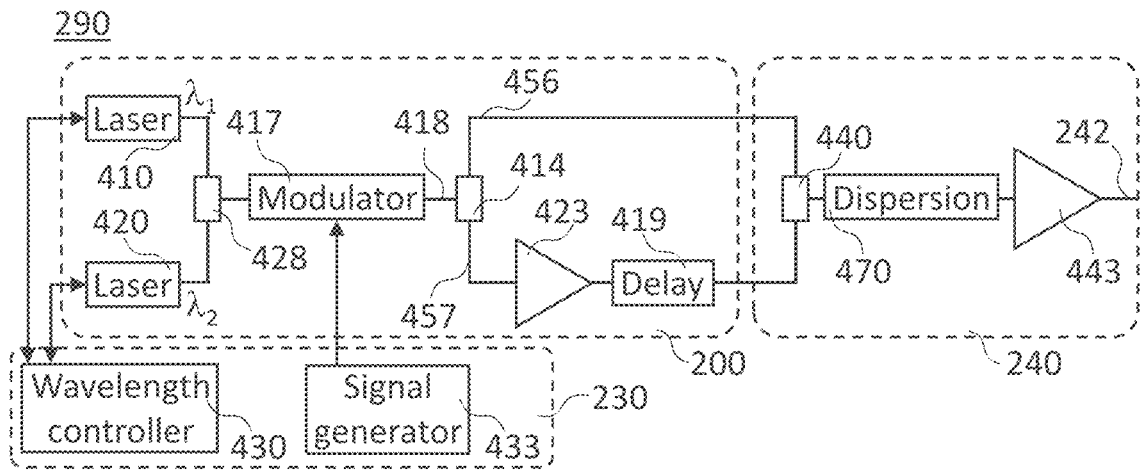
Figure 4F:
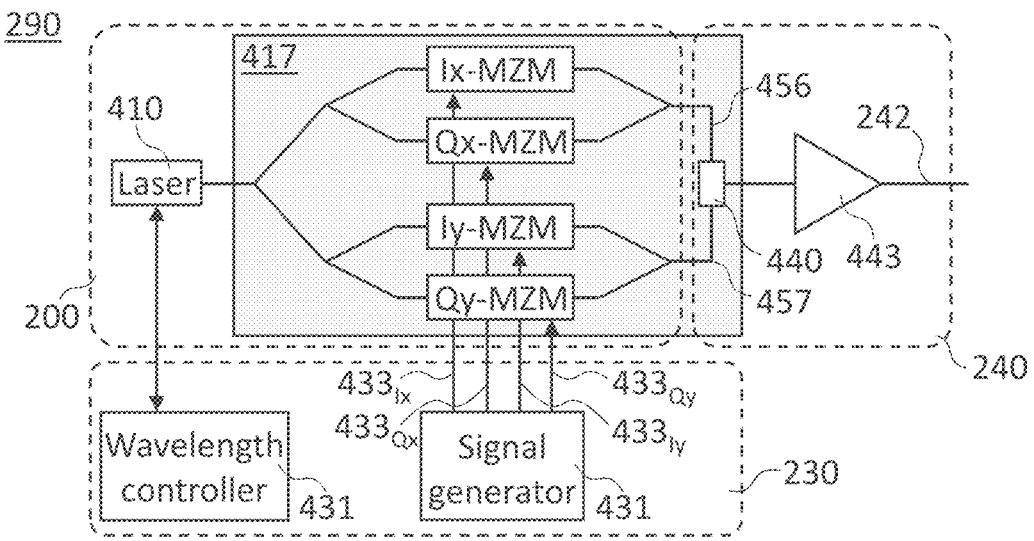

Various embodiments shown in FIGS. 4D-4F implement some of the schemes described above in reference to FIGS. 3C-3E. In the embodiment of optical power supply 290 shown in FIG. 4D, two laser sources 410 and 420 may emit polarized light at different wavelengths $\lambda_1$ and $\lambda_2$. In some embodiments, wavelengths $\lambda_1$ and $\lambda_2$ and/or their difference may be controlled by wavelength controller 430. In some embodiments, lasers 410 and 420 may emit CW light. In some other embodiments, light emitted by one or both of lasers 410 and 420 may comprise an optical pulse train. In some embodiments, light emitted by lasers 410 and 420 may be modulated using optical modulators 417 and 427, driven by respective electrical signals generated by signal generator 433. In some embodiments, laser 410 and modulator 417, as well as laser 420 and modulator 427, together with signal generator 433, may be configured such that modulated optical fields 456 and 457 each comprise an optical pulse train with period $T_r$. In various embodiments, modulators 417 and 427 may be electro-absorption modulators, ring modulators, Mach-Zehnder modulators, or in-phase/quadrature (IQ) modulators. In some embodiments, modulators 417 and 427 and signal generator 433 may be configured to generate optical fields 456 and 457 that are periodically modulated in both amplitude and phase, including chirped and arbitrarily pre-distorted optical fields, e.g., dispersion pre-distorted optical fields. In some embodiments, the functionalities of light generation and modulation provided by laser 410 and modulators 417 as well as by laser 420 and modulators 427 may each be implemented using a single direct-modulated laser or a mode-locked laser. In some embodiments, the output of modulator 427 may be delayed by an optical delay element 419. In some embodiments, delay element 419 may be implemented using a length of optical fiber. In some other embodiments, delay element 419 may be a lumped free-space optical delay element. In some embodiments, the delay $\Delta T$ imposed by delay element 419 onto optical pulse train 457 relative to optical pulse train 456 may be less than half the period of the optical pulse train, i.e., $\Delta T<T_r/2$. In some other embodiments, the delay imposed by delay element 419 onto optical pulse train 457 relative to optical pulse train 456 may be less than half the period of the optical pulse train modulo an integer multiple of $T_r$, i.e., $\Delta T+k\ T_r$, with $k=\pm 1, \pm 2, \pm 3, \ldots$ . In some embodiments, individual pulses of optical pulse trains 456 and 457 may have substantially similar intensity waveforms. In some other embodiments, individual pulses of optical pulse trains 456 and 457 may have different intensity waveforms. Optical pulse trains 456 and 457 may be polarization-combined using combiner 440, configured to combine light on its two input ports onto orthogonal polarizations at its output port. In some embodiments, a chromatic-dispersion-compensating optical element 470 may pre-disperse polarization-multiplexed optical pulse trains. In some embodiments, chromatic-dispersion-compensating optical element 470 may be a grating-based or an etalon-based optical dispersion compensator. In some other embodiments, chromatic-dispersion-compensating optical element 470 may be implemented using a length of dispersion-compensating optical fiber. In some embodiments, modulators 417 and 427 may further be configured to imprint control information on optical pulse trains 456 and 457. For example, modulators 417 and 427 may be configured to periodically extinguish light 456 and 457 for a brief amount of time. In some embodiments, modulators 417 and 427 may be configured to extinguish light 456 and 457 for a duration of 2 $T_S$ once per period of duration 1000 $T_S$. In some embodiments, modulators 417 and 427 may be configured to modulate a time stamp onto light 456 and 457 for a duration of 10 $T_S$ once per period of duration 10000 $T_S$.

In the embodiment of optical power supply 290 shown in FIG. 4E, two laser sources 410 and 420 may emit polarized light at different respective wavelengths $\lambda_1$ and $\lambda_2$. In some embodiments, wavelengths $\lambda_1$ and $\lambda_2$ and/or their difference may be controlled by wavelength controller 430. Light generated by laser 410 and laser 420 may be combined by a polarization-maintaining optical combiner 428. In some embodiments, polarization-maintaining optical combiner 428 may be a polarization-maintaining optical power combiner. In some embodiments, polarization-maintaining optical combiner 428 may be a polarization-maintaining optical wavelength multiplexer. Combined light may be modulated by optical modulator 417 driven by electrical signal generator 433 to generate at each of wavelengths $\lambda_1$ and $\lambda_2$ an optical pulse train at modulator output 418. The light outputted by modulator 417 may be split into two portions 456 and 457 using splitter 414. In some embodiments, portion 456 may be passed directly to combiner 440 while portion 457 of may be optically delayed by delay element 419. Optionally relatively delayed portions 456 and 457 may be polarization-combined using combiner 440, configured to combine light on its two input ports onto orthogonal polarizations at its output port. In some embodiments, chromatic-dispersion-compensating optical element 470 may pre-disperse polarization-multiplexed optical pulse trains. In some embodiments, modulator 417 may further be configured to imprint control information on light output 418. For example, modulator 417 may be configured to periodically extinguish light 418 for a brief amount of time. In some embodiments, modulator 417 may be configured to extinguish light 418 for a duration of 2 $T_S$ once per period of duration 1000 $T_S$. In some embodiments, modulator 417 may be configured to modulate a time stamp onto light 418 for a duration of 10 $T_S$ once per period of duration 10000 $T_S$.

In the embodiment of optical power supply 290 shown in FIG. 4F, CW laser source 410 may be free-running or wavelength-controlled by wavelength controller 431. The output of laser source 410 may be modulated by optical modulator 417 driven by electrical signal generator 433. Modulator 417 may be a polarization-diversity in-phase/quadrature (IQ) modulator (PDM-IQM), comprising a total of four Mach-Zehnder modulators (labeled Lx-MZM, Qx-MZM, Iy-MZM, and Qy-MZM, FIG. 4F) in a nested configuration, with the "Q" paths having built-in an optical phase shift of 90 degrees relative to the "I" paths. PDM-IQM 417 and signal generator 433 may be configured to produce the spectrum shown in FIG. 3E, e.g., as follows: Signals $433_{Ix}$, $433_{Qx}$, $433_{Iy}$, and $433_{Qy}$ are configured to be electrical signals with a voltage swing that is not significantly larger than the half-wave voltage of each Mach-Zehnder modulator, and with a temporal dependence of, respectively, $\cos(\pi R_f t)+\cos(3\pi R_f t)$, $-\sin(\pi R_f t)-\sin(3\pi R_f t)$, $\cos(\pi R_f t)+\cos(3\pi R_f t)$, and $\sin(\pi R_f t)+\sin(3\pi R_f t)$. In some embodiments, electrical signals $433_{Ix}$, $433_{Qx}$, $433_{Iy}$, and $433_{Qy}$ may be generated using digital-to-analog converters (not explicitly shown in FIG. 4F). In some embodiments, modulator 417 may further be configured to imprint control information on light 456 and 457. For example, modulator 417 may be configured to periodically extinguish light 456 and 457 for a brief amount of time. In some embodiments, modulator 417 may be configured to extinguish light 456 and 457 for a duration of 2 $T_S$ once per period of duration 1000 $T_S$. In some embodiments, modulator 417 may be configured to modulate a time stamp onto light 456 and 457 for a duration of 10 $T_S$ once per period of duration 10000 $T_S$.

Figure 5:
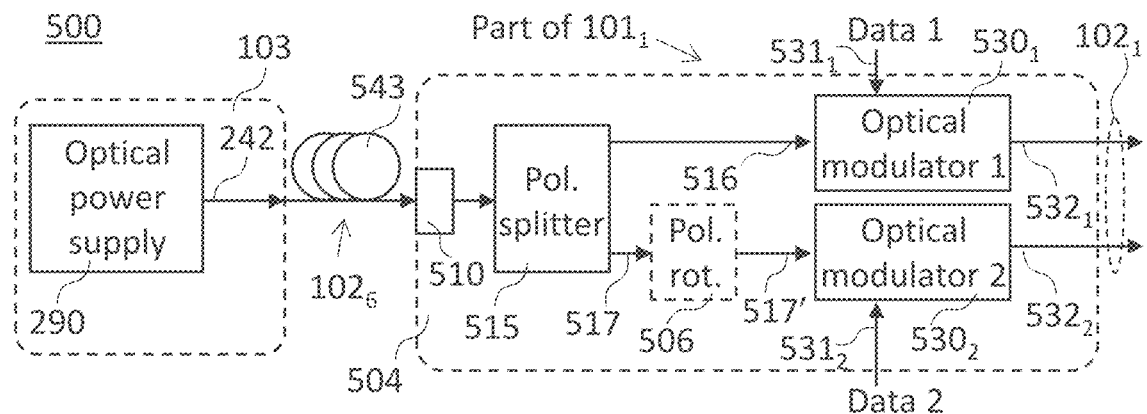
FIG. 5 shows a block diagram of an example distributed optical transmitter of the optical communication system of FIG. 1 employing an optical power supply module of FIG. 2 according to an embodiment.

FIG. 5 shows a block diagram of a distributed optical transmitter 500 that can be used in optical communication system 100 of FIG. 1 according to an embodiment. Transmitter 500 comprises optical power supply 290 and a transmit module 504. As indicated in FIG. 5, optical power supply 290 may be a part of optical power supply module 103. In operation, optical power supply 290 may generate a light supply on output 242, e.g., as described in reference to one or more of FIGS. 3A-3E. Output 242 of optical power supply 290 is optically coupled to transmit module 504 by way of an optical fiber 543, which can be a part of, e.g., fiber link 102$_6$. In different embodiments, transmit module 504 may be a part of different network elements of system 100. For illustration purposes and without any implied limitation, transmit module 504 is described herein in reference to an embodiment in which said transmit element is a part of node 101$_1$.

In some embodiments, optical fiber 543 may include one or more sections of non-polarization-maintaining optical fiber. In such embodiments, light supplied by optical power supply module 103 to node 101 may experience random polarization rotation upon propagation through optical fiber 543. Owing to this random polarization rotation, light supplied by optical fiber 543 may arrive at node 101$_1$ such that the two polarized components of light output 242 are in two random, but relatively orthogonal states of polarization when entering transmit module 504 via an optical interface 510 thereof. The relative orthogonality may be maintained, e.g., because both of the two polarized components of light output 242 are subjected to substantially the same (albeit random) polarization rotations in the one or more sections of non-polarization-maintaining optical fiber.

In some embodiments, optical interface 510 may comprise one or more optical connectors, one or more edge-coupling mechanisms to a photonic integrated circuit (PIC), one or more vertical coupling mechanisms to a PIC, etc. Optical interface 510 is connected to an optical polarization splitter 515. In some embodiments, the polarization splitting function of optical polarization splitter 515 may be integrated into optical interface 510. For example, in some embodiments, a polarization-diversity vertical grating coupler may be configured to simultaneously act as a polarization splitter 515 and as a part of optical interface 510. In some other embodiments, an optical connector comprising a polarization-diversity arrangement may simultaneously act as an optical interface 510 and as a polarization splitter 515.

Owing to the polarization-multiplexed nature as well as the time/frequency orthogonality of the light generated by optical power supply 290 on output 242, any arbitrary polarization rotation within fiber link 102$_6$ results in a substantially equal optical power split between output ports 516 and 517 of optical polarization splitter 515 (e.g., see a detailed description of FIGS. 7A-7D below). Therefore, light on ports 516 and 517 can be used as a relatively stable optical power supply for optical modulation within transmit module 504, which is independent of random polarization rotations that might be occurring within link 102$_6$.

Optical modulators 530$_1$ and 530$_2$ receive supply light on respective polarization splitter outputs 516 and 517 and modulate data onto said light using one or more electrical drive signals 531$_1$ and 531$_2$, thereby producing respective modulated optical signals on modulator outputs 532$_1$ and 531$_2$, respectively. In various embodiments, modulation may be done in any one or more of intensity, phase, polarization, and frequency. In some embodiments, modulation may be done at a modulation symbol rate $1/T_I$. In some embodiments, a polarization rotator 506 may be employed to convert orthogonal output polarization states at polarization splitter outputs 516 and 517 to equal polarization states on ports 516 and 517' for subsequent modulation. For example, polarization splitter 515 may split light incident on its input port into transversal-magnetic (TM) and transversal-electric (TE) polarizations at its two outputs 516 and 517, respectively. If modulators 530 are both designed for modulating TE-polarized light, then polarization rotator 506 may be used to rotate TM-polarized light on port 517 to TE-polarized light on port 517'. In some embodiments, polarization rotator 506 may be a part of polarization splitter 515.

Modulated light on modulator output ports 532$_1$ and 532$_2$ may be passed to different respective fibers of link 102$_1$ for communication of information to another node of system 100, which in the example case shown in FIG. 5 is node $101_2$. Some example signals that may be used and/or generated in transmitter 500 are described below in reference to FIG. 8.

Figure 6:
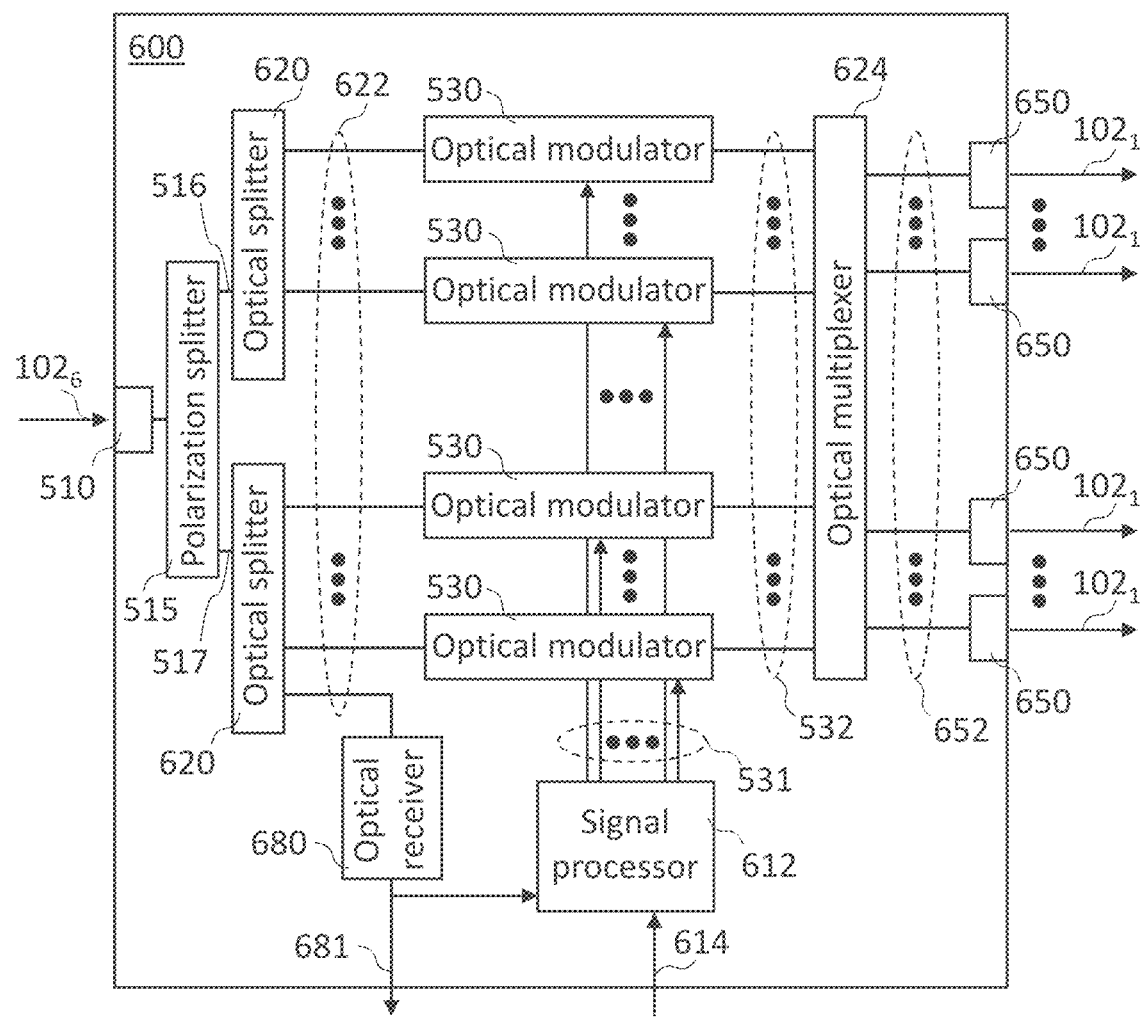
FIG. 6 shows a block diagram of an optical transmitter that can be used in the optical communication system of FIG. 1 according to an embodiment.

FIG. 6 shows a block diagram of an optical transmit module 600 that can be used in system 100 according to an embodiment. Transmit module 600 can be implemented using some of the same elements as transmit module 504, e.g., as indicated by the corresponding matching reference numerals in FIGS. 5 and 6. In different embodiments, transmit module 600 may be a part of different network elements of system 100. For illustration purposes and without any implied limitation, transmit module 600 is described below in reference to an embodiment in which said transmit module is a part of node $101_1$.

In operation, transmit module 600 may receive light from optical port 242 of optical power supply 290 contained within optical power supply module 103 via optical interface 510 and optical link $102_6$ (also see FIGS. 1 and 5). Optical interface 510 is connected to optical polarization splitter 515. In some embodiments, the polarization splitting function of optical polarization splitter 515 may be integrated into optical interface 510. In some embodiments, optical polarization splitter 515 may further be connected to one or more (e.g., cascaded) optical splitters 620, only two of which are shown in FIG. 6 for illustration purposes. In various embodiments, an optical splitter 620 may be constructed, e.g., as known in the pertinent art, using one or more of: optical power splitters, wavelength splitters, and spatial-distribution splitters, such as spatial-mode splitters or multi-core-fiber fanouts.

Optical modulators 530 of transmit module 600 receive light on respective optical-splitter outputs 622 and modulate data onto said light using one or more electrical drive signals 531, thereby producing respective modulated optical signals on modulator outputs 532. In various embodiments, modulation may be done in any one or more of intensity, phase, polarization, and frequency. In some embodiments, modulation may be done at a modulation symbol rate $R_S = R_f = 1/T_f$.

In some embodiments, one or more modulators 530 may at times not modulate information onto light of outputs 622. Alternatively or in addition, one or more of the shown modulators 530 may be omitted from (i.e., not present in) the structure of transmit module 600. In such cases, light of the corresponding output(s) 622 may be passed through transmit module 600 on to other network elements of system 100, e.g., in accordance with the above-provided functional description of certain aspects of system 100 (FIG. 1). In some embodiments, some of such passed-on light 622 may be used by other network elements of system 100 as an optical power supply. In some embodiments, some of such passed-on light 622 may be received by other network elements of system 100 to extract control information therefrom.

In some embodiments, some modulators 530 of transmit module 600 may be configured to use more than one electrical drive signal 531 to modulate light received from the corresponding output 622. Examples of such modulators 530 include but are not limited to in-phase/quadrature (IQ) modulators and segmented-electrode modulators. In various embodiments, opto-electronic modulators 530 may comprise electro-absorption modulators, ring modulators, or Mach-Zehnder modulators. In various embodiments, opto-electronic modulators 530 may be made of semiconductor materials, materials used in Silicon Photonics, polymer materials, or Lithium Niobate. In some embodiments, opto-electronic modulators 530 may at least partially be integrated in one or more PICs (not explicitly shown in FIG. 6).

In various embodiments, electrical drive signals 531 may be binary or multilevel. In some embodiments, electrical drive signals 531 may be suitably pulse-shaped or may be pre-distorted using digital or analog filters, or may be electrically amplified using electrical driver amplifiers.

In some embodiments, some of the light on optical splitter outputs 622 may be detected using one or more optical receivers 680 to extract information contained therein. Such information may include, without limitation, one or more frequency components, one or more time skew or clock phase values, and one or more pieces of control information embedded within the supply light generated by optical power supply module 103.

In some embodiments, information extracted by optical receivers 680 may be provided to devices external to transmit module 600 on an output port 681 thereof for further use within system 100, such as for network traffic synchronization/arbitration/scheduling, database time-stamping, local clock synchronization, etc. In some embodiments, information extracted by optical receiver(s) 680 may be fed into an electronic signal processor 612. In some embodiments, electronic signal processor 612 may receive one or more electrical signals 614 and may pre-process those electrical signals to generate electrical drive signals 531 for modulators 530. In some embodiments, pre-processing may comprise any form of analog, digital, or mixed-signal manipulation, including but not limited to retiming, de-skewing, buffering, bit stuffing, bit removal, forward error correction coding, line coding, framing, insertion of pilots and packet headers, time-stamping, linear and nonlinear pre-compensation, pre-equalization, pre-emphasis, and pre-distortion.

In some embodiments, modulated light on modulator outputs 532 may be multiplexed in wavelength, polarization, or spatial distribution of the optical field using one or more multiplexers 624 to generate one or more optical multiplexed signals 652. Multiplexed signals 652 may then be transmitted via one or more output interfaces 650 to one or more optical fibers $102_1$. In some embodiments, output interfaces 650 may be implemented, e.g., as one or more optical fiber connectors, one or more edge couplers from PIC to fibers, or one or more vertical couplers from PIC to fibers. In some embodiments, certain multiplexing functions of multiplexer 624 may be integrated into certain output interfaces 650. For example, in some embodiments, a polarization-diversity vertical grating coupler may simultaneously act as a polarization multiplexer of multiplexer 624 and as a part of an output interface 650. In some other embodiments, an optical connector comprising a polarization-diversity arrangement may simultaneously act as an output interface 650 and as a polarization multiplexer 624.

In some embodiments, each modulator output 532 may be passed directly to a corresponding optical fiber or to a corresponding optical fiber core of fiber link $102_1$ via a corresponding output interface 650, i.e., without undergoing any multiplexing therebetween. In other words, multiplexer 624 or some parts thereof may not be present in some embodiments.

FIGS. 7A-7D graphically show some example use cases, e.g., illustrating the polarization-rotation independent optical power splitting within transmit modules 504 and 600, that may be implemented based on embodiments of optical power supply 290 within optical power supply module 103.

FIG. 7A shows a Poincare sphere, conventionally used to visualize polarization states of light. Mutually orthogonal polarization states are found at diametrically opposed locations on the sphere. For example, linear polarization states are found on the equator of the sphere, with one orthogonal pair including horizontal linear polarization (HLP) and vertical linear polarization (VLP), and another orthogonal pair including ±45-degree (LP±45-deg) linear polarizations being indicated in FIG. 7A. The orthogonal pair of right-circular polarization (RCP) and left-circular polarization (LCP) is found on the two poles of the Poincare sphere, as is also indicated in FIG. 7A.

Figure 7B:
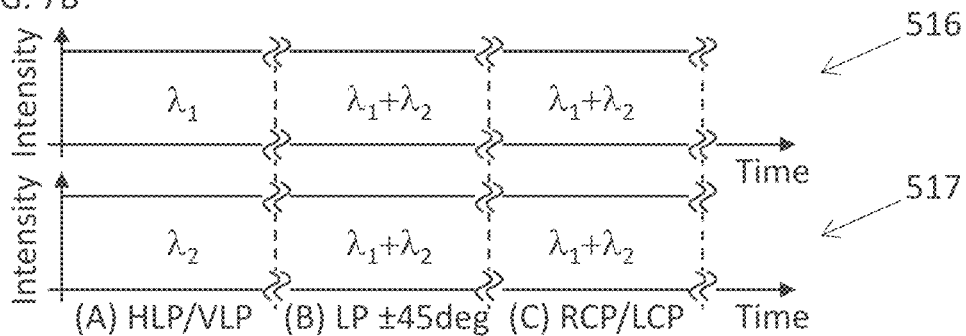

FIG. 7B shows intensity-versus-time plots of the light at the two output ports 516 and 517 of polarization splitter 515 (also see FIGS. 5 and 6) for an example case, wherein optical power supply 103 transmits CW wavelength $\lambda_1$ in HLP and CW wavelength $\lambda_2$ in VLP (also see FIGS. 3A-3B). Time intervals (A), (B), and (C), which are neither implied to occur in the shown temporal succession nor to be characterized by sharp transitions therebetween, correspond to three different example instantiations of random polarization rotations, wherein: during time interval (A), fiber link $102_6$ does not rotate the polarization; during time interval (B), fiber link $102_6$ rotates the polarizations to the LP±45-deg states; and during time interval (C), fiber link $102_6$ rotates the polarizations to the RCP/LCP states. As optical power supply 290 is configured to transmit two time/frequency-orthogonal optical fields in two orthogonal polarization states, the light intensities at output ports 516 and 517 of polarization splitter 515 will be approximately constant, irrespective of random polarization rotations at the polarization splitter input.

For the time interval (A), polarization splitter 515 operates to: (i) direct light of wavelength $\lambda_1$ substantially exclusively to output port 516; and (ii) direct light of wavelength $\lambda_2$ substantially exclusively to output port 517. For the time interval (B), polarization splitter 515 operates to cause each of output ports 516 and 517 to have an approximately equal amount of light at wavelength $\lambda_1$ and at wavelength $\lambda_2$. Likewise, for the time interval (C), polarization splitter 515 operates to cause each of output ports 516 and 517 to have an approximately equal amount of light at wavelength $\lambda_1$ and at wavelength $\lambda_2$. Not shown in FIG. 7B, for time intervals (B) and (C), are possible beat frequency oscillations at the difference frequency $\Delta f=|f_1-f_2|$ between the two CW tones at wavelengths $\lambda_1$ and $\lambda_2$. However, as long as $\Delta f$ is chosen sufficiently large compared to the symbol rate $R_S$, these oscillations may average out within each modulation symbol of transmitter 500 and, as such, may not significantly affect the performance. Choosing $\Delta f$ smaller than $R_S$ may result in slow fading of the light output at each individual port 516 and 517. More specifically, light incident at polarization splitter 515 may periodically transition between appearing entirely on output port 516 (with no light appearing on output port 517) and appearing entirely on output port 517 (with no light appearing on output port 516). This periodic transition of light between ports 516 and 517 may occur at a period $\Delta f$, and if $\Delta f$ is significantly smaller than $R_S$ may lead to some modulation time slots on each polarization splitter output port receiving no or insufficient light to modulate information onto. Choosing $\Delta f$ to be significantly larger than $R_S$ lets the light transitions between ports 516 and 517 occur multiple times per symbol period, so that every symbol time slot always receives half the light supplied by optical power supply 103. Choosing $\Delta f$ equal to $R_S$ may result in either constant power during the time interval (A) or in $\sin^2(\eta R_S t)$ shaped pulses during the time intervals (B) and (C) at ports 516 and 517. This particular configuration may be useful for some modes of operation. Similarly, choosing $\Delta f$ equal to an integer multiple of $R_S$ ($\Delta f=n R_S$, n=1, 2, 3, . . . ) may be a beneficial mode of operation.

Figure 7C:
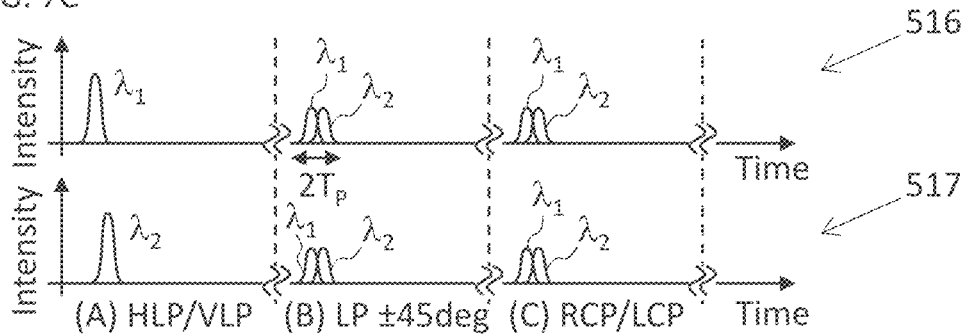

FIG. 7C shows the optical power at the two output ports 516 and 517 of polarization splitter 515 for the example use case, wherein optical power supply 103 operates to transmit temporally partially overlapping pulse trains (i.e., $\Delta T<T_P$) at wavelengths $\lambda_1$ and $\lambda_2$ in HLP and VLP (also see FIG. 3C). Time intervals (A), (B), and (C) correspond to the same three instantiations of random polarization fluctuations as in FIG. 7B. For the time interval (A), polarization splitter 515 operates to: (i) direct the pulse train at wavelength $\lambda_1$ substantially exclusively to output port 516; and (ii) direct the pulse train at wavelength $\lambda_2$ substantially exclusively to output port 517. For the time interval (B), polarization splitter 515 operates to cause each of output ports 516 and 517 to have an approximately equal amount of the pulse train at wavelength hi and the pulse train at wavelength $\lambda_2$. Likewise, for the time interval (C), polarization splitter 515 operates to cause each of output ports 516 and 517 to have an approximately equal amount of the pulse train at wavelength $\lambda_1$ and the pulse train at wavelength $\lambda_2$. Not shown in FIG. 7C, for time intervals (B) and (C), are possible beat frequency oscillations at the difference frequency $\Delta f=|f_1-f_2|$ during times when pulses at wavelength $\lambda_1$ temporally overlap with pulses at wavelength $\lambda_2$. However, as long as $\Delta f$ is chosen sufficiently large compared to the symbol rate $R_S$, these oscillations may average out within each modulation symbol of transmitter 500 and, as such, may not significantly affect the performance. More precisely, the total optical energy within a time period corresponding to twice the total optical pulse duration $T_P$ measured at the polarization-splitting interface 515 may remain approximately constant, irrespective of the polarization state at the input to polarization splitter 515.

Figure 7D:
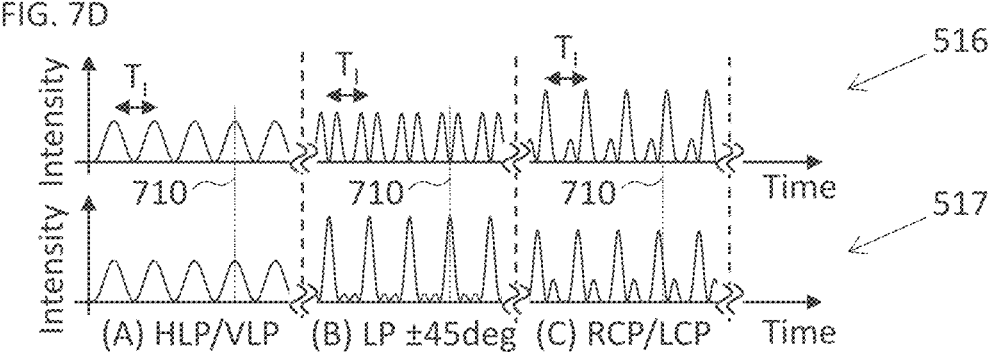

FIG. 7D shows the optical power at the two output ports 516 and 517 of polarization splitter 515 for the example use case, wherein optical power supply 103 operates to transmit four tones separated by $R_I$, two in HLP and two in VLP (also see FIG. 3E). Time intervals (A), (B), and (C) correspond to the same three instantiations of random polarization fluctuations as in FIG. 7B. For the time interval (A), polarization splitter 515 operates to: (i) direct the two lower-frequency tones at frequencies $f_1-R_I/2$ and $f_1+R_I/2$ substantially exclusively to output port 516; and (ii) direct the two higher-frequency tones at frequencies $f_2-R_I/2$ and $f_2+R_I/2$ substantially exclusively to output port 517. In the time domain, output ports 516 and 517 may therefore exhibit time-aligned $\sin^2$-shaped optical intensity pulses. For the time interval (B), polarization splitter 515 operates to cause each of output ports 516 and 517 to have an approximately equal amount of the four tones shown in FIG. 3E. Likewise, for the time interval (C), polarization splitter 515 operates to cause each of output ports 516 and 517 to have an approximately equal amount of the four tones shown in FIG. 3E. Owing to the close spacing of the two lower-frequency tones and the two higher-frequency tones, beat oscillations may be clearly visible in (B) and (C). However, due to the specific nature of the four-tone dual-polarization optical field, the pulse energy may always stay well confined near a common center-of-mass line, e.g., 710, irrespective of polarization rotations. This confinement of pulse energies at a specific temporal location within a symbol period irrespective of polarization rotations on fiber link $102_6$ may be beneficial for modulation within transmit module 504.

As exemplified by the results graphically shown in FIGS. 7B-7D, the use of various embodiments of optical power supply module 103 beneficially causes polarization splitter 515 to passively perform a substantially equal-power split between output ports 516 and 517 thereof regardless of polarization rotations within one or more sections of non-polarization-maintaining optical fiber disposed between optical power supply module 103 and the host device (e.g., transmit module 504, FIG. 5) of polarization splitter 515. This passive, equal-power split in polarization splitter 515 is enabled, e.g., by the above-described example configurations of optical power supply module 103, according to which the light outputted at output port 242 thereof has two components that are both time/frequency orthogonal to one another and polarization-orthogonal. The latter characteristic of the received light then causes polarization splitter 515 to perform the substantially equal-power split between output ports 516 and 517 thereof passively, i.e., without the use of any tuning or active power-control mechanisms. The light produced at output ports 516 and 517 can then advantageously be used, e.g., as an optical carrier onto which data information can be modulated by transmit module 504.

As a result of the above-described operation of polarization splitter 515, during some time intervals (e.g., time interval (A)) optical modulator $530_1$ may receive supply light at a first optical center frequency but not at a second optical center frequency, and modulator $530_2$ may receive supply light at the second optical center frequency but not at the first optical center frequency; during some time intervals (not explicitly shown in FIG. 7) optical modulator $530_1$ may receive supply light at the second optical center frequency but not at the first optical center frequency, and modulator $530_2$ may receive supply light at the first optical center frequency but not at the second optical center frequency; during some time intervals (e.g., time intervals (B) and (C)) optical modulator $530_1$ may receive supply light at both the first optical center frequency and the second optical center frequency, and modulator $530_2$ may also receive supply light at both the first optical center frequency and the second optical center frequency.

Figure 8:
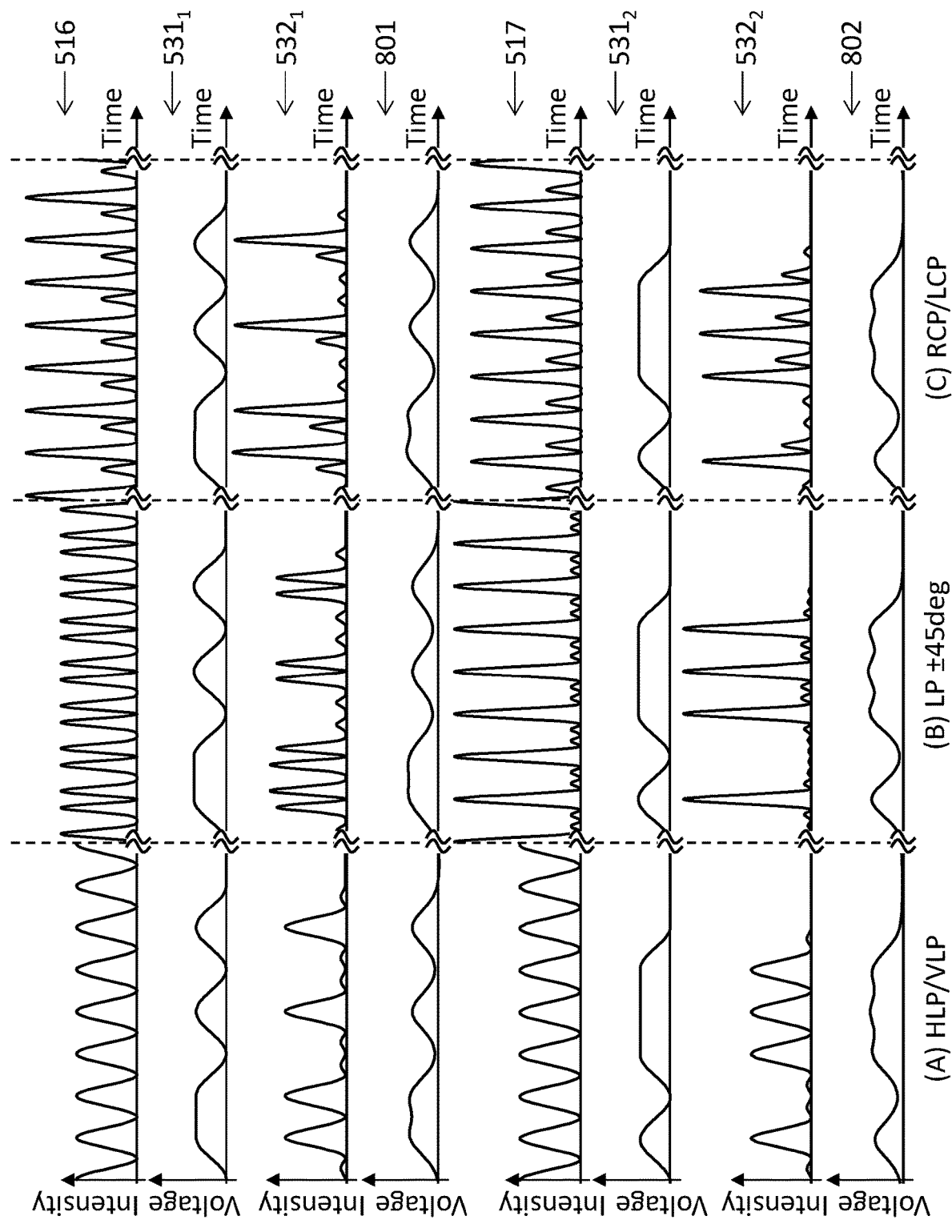
FIG. 8 graphically illustrates some signals used/generated in the optical transmitter of FIG. 5 and the corresponding electrical signals recovered by a corresponding optical receiver according to an example embodiment.

FIG. 8 graphically illustrates some signals used/generated in optical transmitter 500 (FIG. 5) and the corresponding electrical signals recovered by a corresponding optical data receiver according to an example embodiment. More specifically, the following time-dependent signals are shown in FIG. 8:

(i) light supply waveforms at ports 516 and 517, respectively, corresponding to the embodiment of FIG. 3E. These waveforms are shown for three different polarization rotations in optical fiber 543, i.e., for time intervals (A), (B), and (C), as per FIG. 7D;

(ii) electrical drive signals $531_1$ and $531_2$ driving optical modulators $530_1$ and $530_2$, FIG. 5. For illustration purposes, the modulation format imprinted onto the supply light is binary on/off keying (OOK) in this example embodiment (a person of ordinary skill in the art will understand that any other optical modulation format may also be imprinted onto the supply light, including multi-level and multi-dimensional formats using any physical modulation dimension of the supply light's optical field, such as its amplitude, phase, in-phase/quadrature components, frequency, and polarization). The exemplary binary data sequence represented by electrical drive signal $531_1$ is [01101010 . . . 011101010 . . . 01101010]. The exemplary binary data sequence represented by electrical drive signal $531_2$ is [01011100 . . . 01011100 . . . 01011100];

(iii) modulated optical output signals $532_1$ and $532_2$ generated by transmit module 504 in response to the shown electrical drive signals $531_1$ and $531_2$, respectively; and (iv) electrical signals 801 and 802 generated by a direct-detection optical receiver in response to the shown modulated optical output signals $532_1$ and $532_2$, respectively. The direct-detection optical receiver is modeled to have a first-order Gaussian low-pass characteristic of an electrical bandwidth equal to the symbol rate.

The accurate and substantially jitter-free reconstruction of electrical data signals $531_1$ and $532_2$ by electrical signals 801 and 802 is evident, irrespective of the polarization rotation exerted by optical fiber 543.

Figure 9:
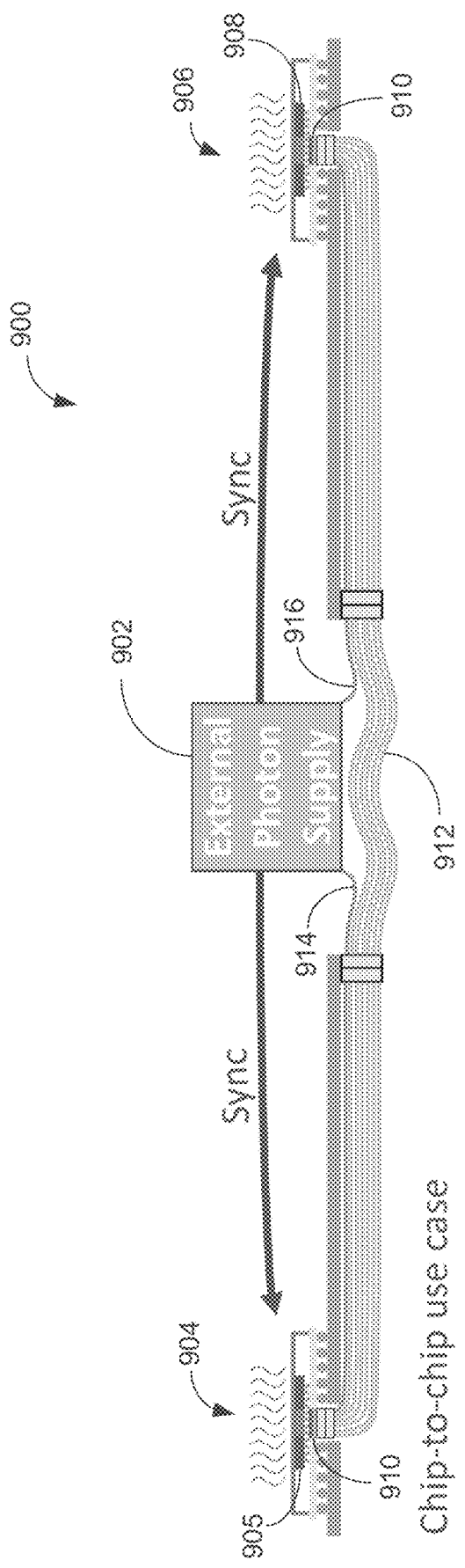

FIG. 9 shows an optical communications system 900 that includes an optical power supply (also referred to as an external photon supply) 902, a first data processing apparatus 904, and a second data processing apparatus 906. The first data processing apparatus 904 includes a first chip 905, and the second data processing apparatus 906 includes a second chip 908. The system 900 enables high-speed communications between the first chip 905 and the second chip 908 using co-packaged optical interconnect modules 910 similar to those shown in, e.g., FIGS. 2-5 and 17 of U.S. application 63/145,368. Each of the first and second chips 906, 908 can be a high-capacity chip, e.g., a high bandwidth Ethernet switch chip.

The first and second chips 906, 908 communicate with each other through an optical fiber interconnection cable 912 that includes a plurality of optical fibers. In some implementations, the optical fiber interconnection cable 912 can include optical fiber cores that transmit data and control signals between the first and second chips 906, 908. The optical fiber interconnection cable 912 also includes one or more optical fiber cores that transmit optical power supply light from the optical power supply or photon supply 902 to the photonic integrated circuits in the co-packaged optical interconnect modules 910 that provide optoelectronic interfaces for the first and second chips 906, 908.

The optical fiber interconnection cable 912 can include single-core fibers or multi-core fibers. Each single-core fiber includes a cladding and a core, typically made from glasses of different refractive indices such that the refractive index of the cladding is lower than the refractive index of the core to establish a dielectric optical waveguide. Each multi-core optical fiber includes a cladding and multiple cores, typically made from glasses of different refractive indices such that the refractive index of the cladding is lower than the refractive index of the core. More complex refractive index profiles, such as index trenches, multi-index profiles, or gradually changing refractive index profiles can also be used. More complex geometric structures such as non-circular cores or claddings, photonic crystal structures, photonic bandgap structures, or nested antiresonant nodeless hollow core structures can also be used.

The example of FIG. 9 illustrates a switch-to-switch use case. The external optical power supply or photon supply 902 provides optical power supply signals, which can be, e.g., continuous-wave light, one or more trains of periodic optical pulses, or one or more trains of non-periodic optical pulses. The power supply light is provided from the photon supply 902 to the co-packaged optical interconnect modules 910 through optical fibers 914 and 916, respectively. For example, the optical power supply 902 can provide continuous wave light, or both pulsed light for data modulation and synchronization, as described in U.S. patent application Ser. No. 16/847,705. This allows the first chip 905 to be synchronized with the second chip 908.

For example, the photon supply 902 can correspond to the optical power supply 103 of FIG. 1. The pulsed light from the photon supply 902 can be provided to the link $102_6$ of the data processing system 200 of FIG. 20 of U.S. application 63/145,368. In some implementations, the photon supply 902 can provide a sequence of optical frame templates, in which each of the optical frame templates includes a respective frame header and a respective frame body, and the frame body includes a respective optical pulse train. The modulators 417 of FIG. 20 of U.S. application 63/145,368 can load data into the respective frame bodies to convert the sequence of optical frame templates into a corresponding sequence of loaded optical frames that are output through optical fiber link $102_1$.

Figure 10:
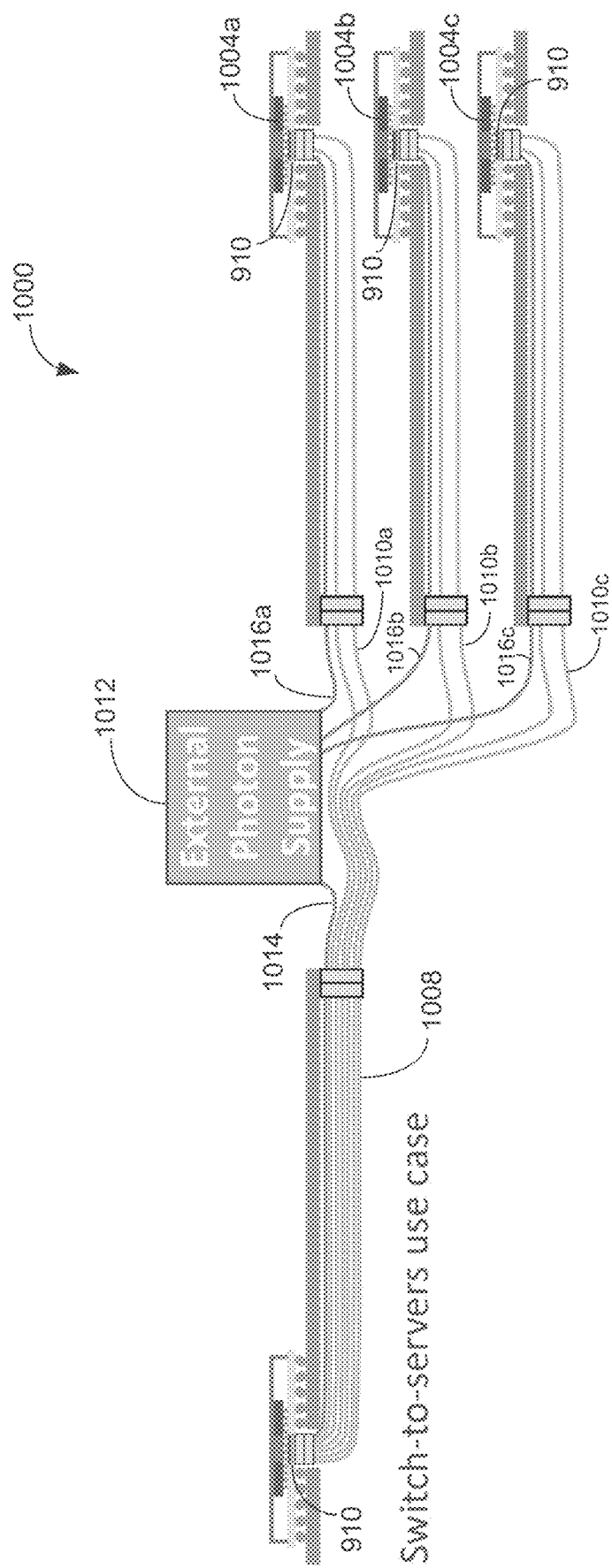

FIG. 10 shows an example of an optical communications system 1000 providing high-speed communications between a high-capacity chip 1002 (e.g., an Ethernet switch chip) and multiple lower-capacity chips 1004a, 1004b, 1004c, e.g., multiple network interface chips attached to computer servers using co-packaged optical interconnect modules 910 similar to those shown in FIG. 9. The high-capacity chip 1002 communicates with the lower-capacity chips 1004a, 1004b, 1004c through a high-capacity optical fiber interconnection cable 1008 that later branches out into several lower-capacity optical fiber interconnection cables 1010a, 1010b, 1010c that are connected to the lower-capacity chips 1004a, 1004b, 1004c, respectively. This example illustrates a switch-to-servers use case.

An external optical power supply or photon supply 1012 provides optical power supply signals, which can be continuous-wave light, one or more trains of periodic optical pulses, or one or more trains of non-periodic optical pulses. The power supply light is provided from the photon supply 1012 to the optical interconnect modules 1006 through optical fibers 1014, 1016a, 1016b, 1016c, respectively. For example, the optical power supply 1012 can provide both pulsed light for data modulation and synchronization, as described in U.S. patent application Ser. No. 16/847,705. This allows the high-capacity chip 1002 to be synchronized with the lower-capacity chips 1004a, 1004b, and 1004c.

Figure 11:
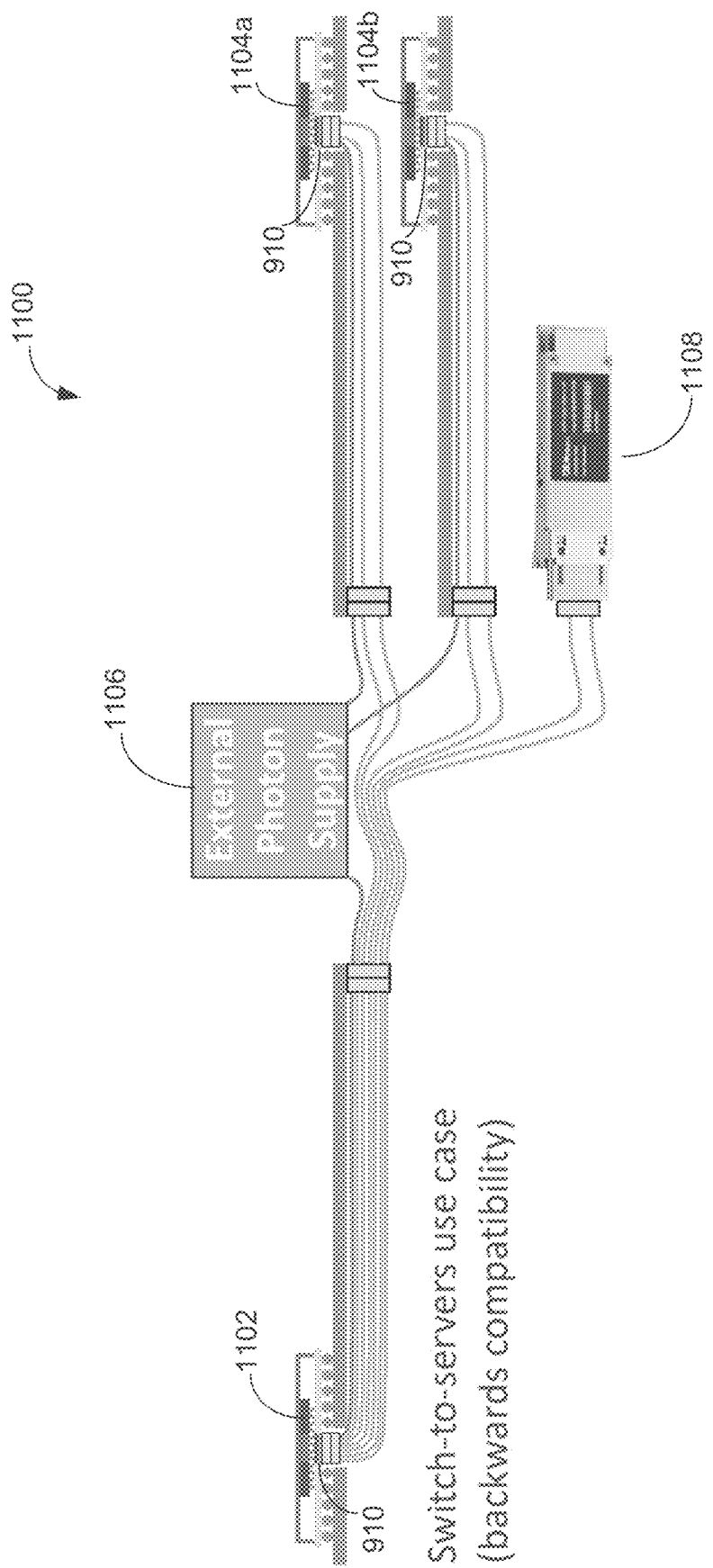

FIG. 11 shows an optical communications system 1100 providing high-speed communications between a high-capacity chip 1102 (e.g., an Ethernet switch chip) and multiple lower-capacity chips 1104a, 1104b, e.g., multiple network interface chips, attached to computer servers using a mix of co-packaged optical interconnect modules 901 similar to those shown in FIG. 9 as well as conventional pluggable optical interconnect modules 1108.

An external optical power supply or photon supply 1106 provides optical power supply signals, which can be continuous-wave light, one or more trains of periodic optical pulses, or one or more trains of non-periodic optical pulses. For example, the optical power supply 1106 can provide both pulsed light for data modulation and synchronization, as described in U.S. patent application Ser. No. 16/847,705. This allows the high-capacity chip 1102 to be synchronized with the lower-capacity chips 1104a and 1104b.

FIGS. 9 to 11 show examples of optical communications systems 900, 1000, 1100 in which in each system an optical power supply or photon supply provides optical power supply light to photonic integrated circuits hosted in multiple communication devices (e.g., optical transponders), and the optical power supply is external to the communication devices. The optical power supply can have its own housing, electrical power supply, and control circuitry, independent of the housings, electrical power supplies, and control circuitry of the communication devices. This allows the optical power supply to be serviced, repaired, or replaced independent of the communication devices. Redundant optical power supplies can be provided so that a defective external optical power supply can be repaired or replaced without taking the communication devices off-line. The external optical power supply can be placed at a convenient centralized location with a dedicated temperature environment (as opposed to being crammed inside the communication devices, which may have a high temperature). The external optical power supply can be built more efficiently than individual power supply units, as certain common parts such as monitoring circuitry and thermal control units can be amortized over many more communication devices. The following describes implementations of the fiber cabling for remote optical power supplies.

Figure 12:
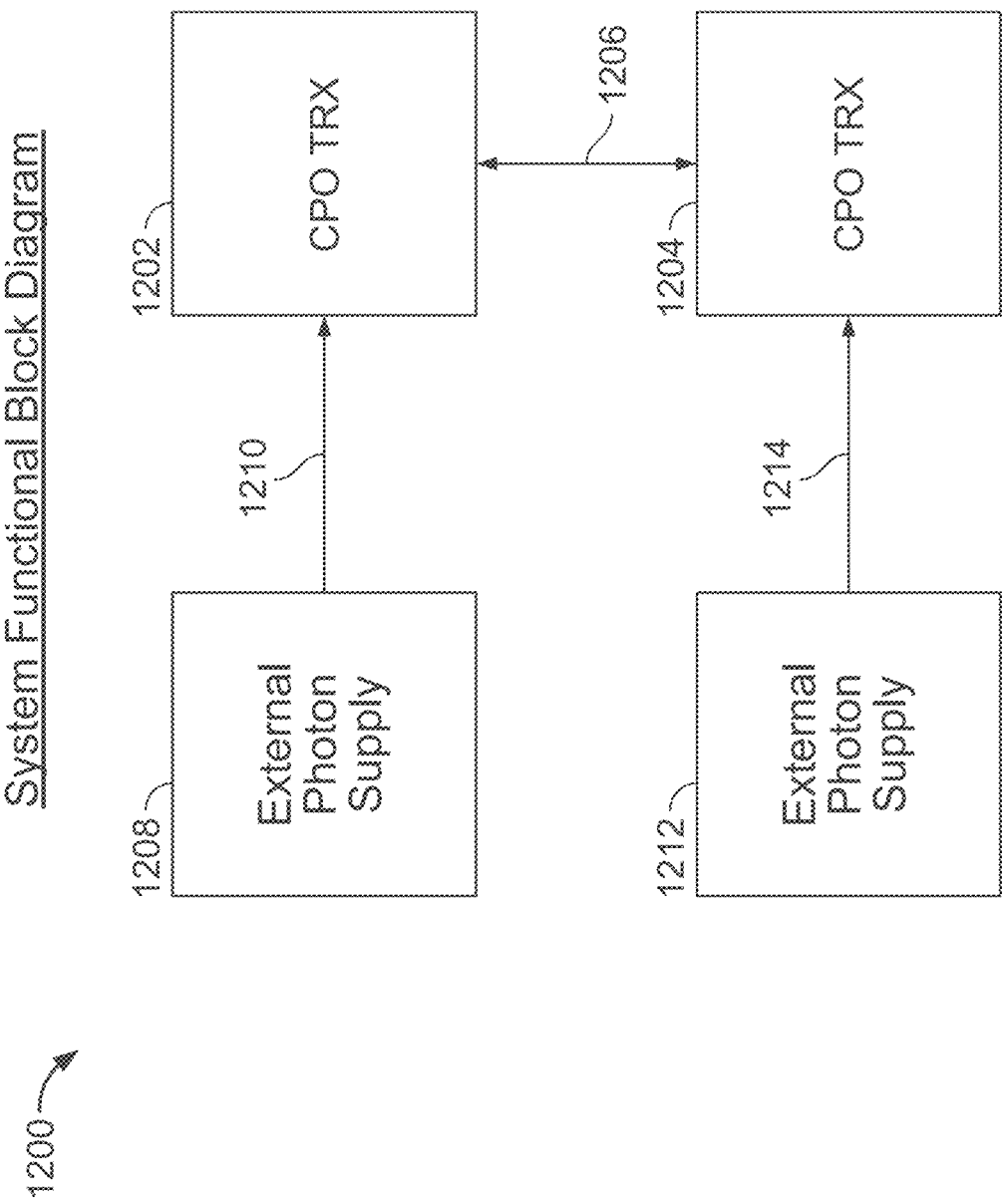

FIG. 12 is a system functional block diagram of an example of an optical communication system 1200 that includes a first communication transponder 1202 and a second communication transponder 1204. Each of the first and second communication transponders 1202, 1204 can include one or more co-packaged optical modules described above. Each communication transponder can include, e.g., one or more data processors, such as network switches, central processing units, graphics processor units, tensor processing units, digital signal processors, and/or other application specific integrated circuits (ASICs). In this example, the first communication transponder 1202 sends optical signals to, and receives optical signals from, the second communication transponder 1204 through a first optical communication link 1206. The one or more data processors in each communication transponder 1202, 1204 process the data received from the first optical communication link 1206 and outputs processed data to the first optical communication link 1206. The optical communication system 1200 can be expanded to include additional communication transponders. The optical communication system 1200 can also be expanded to include additional communication between two or more external photon supplies, which can coordinate aspects of the supplied light, such as the respectively emitted wavelengths or the relative timing of the respectively emitted optical pulses.

A first external photon supply 1208 provides optical power supply light to the first communication transponder 1202 through a first optical power supply link 1210, and a second external photon supply 1212 provides optical power supply light to the second communication transponder 1204 through a second optical power supply link 1214. In one example embodiment, the first external photon supply 1208 and the second external photon supply 1212 provide continuous wave laser light at the same optical wavelength. In another example embodiment, the first external photon supply 1208 and the second external photon supply 1212 provide continuous wave laser light at different optical wavelengths. In yet another example embodiment, the first external photon supply 1208 provides a first sequence of optical frame templates to the first communication transponder 1202, and the second external photon supply 1212 provides a second sequence of optical frame templates to the second communication transponder 1204. For example, as described in U.S. patent Ser. No. 16/847,705, each of the optical frame templates can include a respective frame header and a respective frame body, and the frame body includes a respective optical pulse train. The first communication transponder 1202 receives the first sequence of optical frame templates from the first external photon supply 1208, loads data into the respective frame bodies to convert the first sequence of optical frame templates into a first sequence of loaded optical frames that are transmitted through the first optical communication link 1206 to the second communication transponder 1204. Similarly, the second communication transponder 1204 receives the second sequence of optical frame templates from the second external photon supply 1212, loads data into the respective frame bodies to convert the second sequence of optical frame templates into a second sequence of loaded optical frames that are transmitted through the first optical communication link 1206 to the first communication transponder 1202.

Figures 13A, 13B:
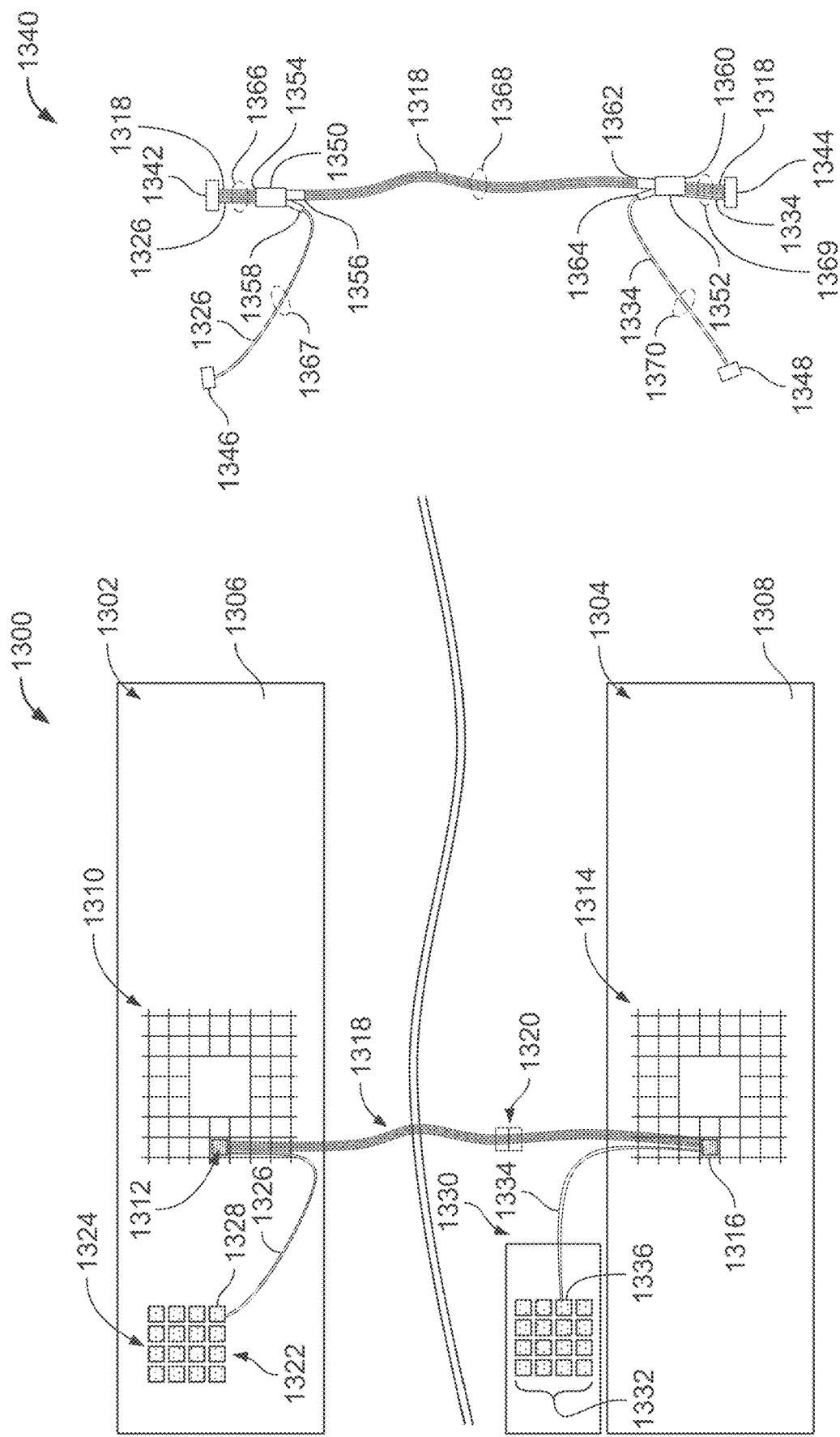

FIG. 13A is a diagram of an example of an optical communication system 1300 that includes a first switch box 1302 and a second switch box 1304. Each of the switch boxes 1302, 1304 can include one or more data processors, such as network switches. The first and second switch boxes 1302, 1304 can be separated by a distance greater than, e.g., 1 foot, 3 feet, 10 feet, 100 feet, or 1000 feet. The figure shows a diagram of a front panel 1306 of the first switch box 1302 and a front panel 1308 of the second switch box 1304. In this example, the first switch box 1302 includes a vertical ASIC mount grid structure 1310, similar to the grid structure 870 of FIG. 43 of U.S. application 63/145,368. A co-packaged optical module 1312 is attached to a receptor of the grid structure 1310. The second switch box 1304 includes a vertical ASIC mount grid structure 1314, similar to the grid structure 870 of FIG. 43 of U.S. application 63/145,368. A co-packaged optical module 1316 is attached to a receptor of the grid structure 1314. The first co-packaged optical module 1312 communicates with the second co-packaged optical module 1316 through an optical fiber bundle 1318 that includes multiple optical fibers. Optional fiber connectors 1320 can be used along the optical fiber bundle 1318, in which shorter sections of optical fiber bundles are connected by the fiber connectors 1320.

In some implementations, each co-packaged optical module (e.g., 1312, 1316) includes a photonic integrated circuit configured to convert input optical signals to input electrical signals that are provided to a data processor, and convert output electrical signals from the data processor to output optical signals. The co-packaged optical module can include an electronic integrated circuit configured to process the input electrical signals from the photonic integrated circuit before the input electrical signals are transmitted to the data processor, and to process the output electrical signals from the data processor before the output electrical signals are transmitted to the photonic integrated circuit. In some implementations, the electronic integrated circuit can include a plurality of serializers/deserializers configured to process the input electrical signals from the photonic integrated circuit, and to process the output electrical signals transmitted to the photonic integrated circuit. The electronic integrated circuit can include a first serializers/deserializers module having multiple serializer units and deserializer units, in which the first serializers/deserializers module is configured to generate a plurality of sets of first parallel electrical signals based on a plurality of first serial electrical signals provided by the photonic integrated circuit, and condition the electrical signals, in which each set of first parallel electrical signals is generated based on a corresponding first serial electrical signal. The electronic integrated circuit can include a second serializers/deserializers module having multiple serializer units and deserializer units, in which the second serializers/deserializers module is configured to generate a plurality of second serial electrical signals based on the plurality of sets of first parallel electrical signals, and each second serial electrical signal is generated based on a corresponding set of first parallel electrical signals. The plurality of second serial electrical signals can be transmitted toward the data processor.

The first switch box 1302 includes an external optical power supply 1322 (i.e., external to the co-packaged optical module) that provides optical power supply light through an optical connector array 1324. In this example, the optical power supply 1322 is located internal of the housing of the switch box 1302. Optical fibers 1326 are optically coupled to an optical connector 1328 (of the optical connector array 1324) and the co-packaged optical module 1312. The optical power supply 1322 sends optical power supply light through the optical connector 1328 and the optical fibers 1326 to the co-packaged optical module 1312. For example, the co-packaged optical module 1312 includes a photonic integrated circuit that modulates the power supply light based on data provided by a data processor to generate a modulated optical signal, and transmits the modulated optical signal to the co-packaged optical module 1316 through one of the optical fibers in the fiber bundle 1318.

In some examples, the optical power supply 1322 is configured to provide optical power supply light to the co-packaged optical module 1312 through multiple links that have built-in redundancy in case of malfunction in some of the optical power supply modules. For example, the co-packaged optical module 1312 can be designed to receive N channels of optical power supply light (e.g., N1 continuous wave light signals at the same or at different optical wavelengths, or N1 sequences of optical frame templates), N1 being a positive integer, from the optical power supply 1322. The optical power supply 1322 provides N1+M1 channels of optical power supply light to the co-packaged optical module 1312, in which M1 channels of optical power supply light are used for backup in case of failure of one or more of the N1 channels of optical power supply light, M1 being a positive integer.

The second switch box 1304 receives optical power supply light from a co-located optical power supply 1330, which is, e.g., external to the second switch box 1304 and located near the second switch box 1304, e.g., in the same rack as the second switch box 1304 in a data center. The optical power supply 1330 includes an array of optical connectors 1332. Optical fibers 1334 are optically coupled to an optical connector 1336 (of the optical connectors 1332) and the co-packaged optical module 1316. The optical power supply 1330 sends optical power supply light through the optical connector 1336 and the optical fibers 1334 to the co-packaged optical module 1316. For example, the co-packaged optical module 1316 includes a photonic integrated circuit that modulates the power supply light based on data provided by a data processor to generate a modulated optical signal, and transmits the modulated optical signal to the co-packaged optical module 1312 through one of the optical fibers in the fiber bundle 1318.

In some examples, the optical power supply 1330 is configured to provide optical power supply light to the co-packaged optical module 1316 through multiple links that have built-in redundancy in case of malfunction in some of the optical power supply modules. For example, the co-packaged optical module 1316 can be designed to receive N2 channels of optical power supply light (e.g., N2 continuous wave light signals at the same or at different optical wavelengths, or N2 sequences of optical frame templates), N2 being a positive integer, from the optical power supply 1322. The optical power supply 1322 provides N2+M2 channels of optical power supply light to the co-packaged optical module 1312, in which M2 channels of optical power supply light are used for backup in case of failure of one or more of the N2 channels of optical power supply light, M2 being a positive integer.

Figure 13C:
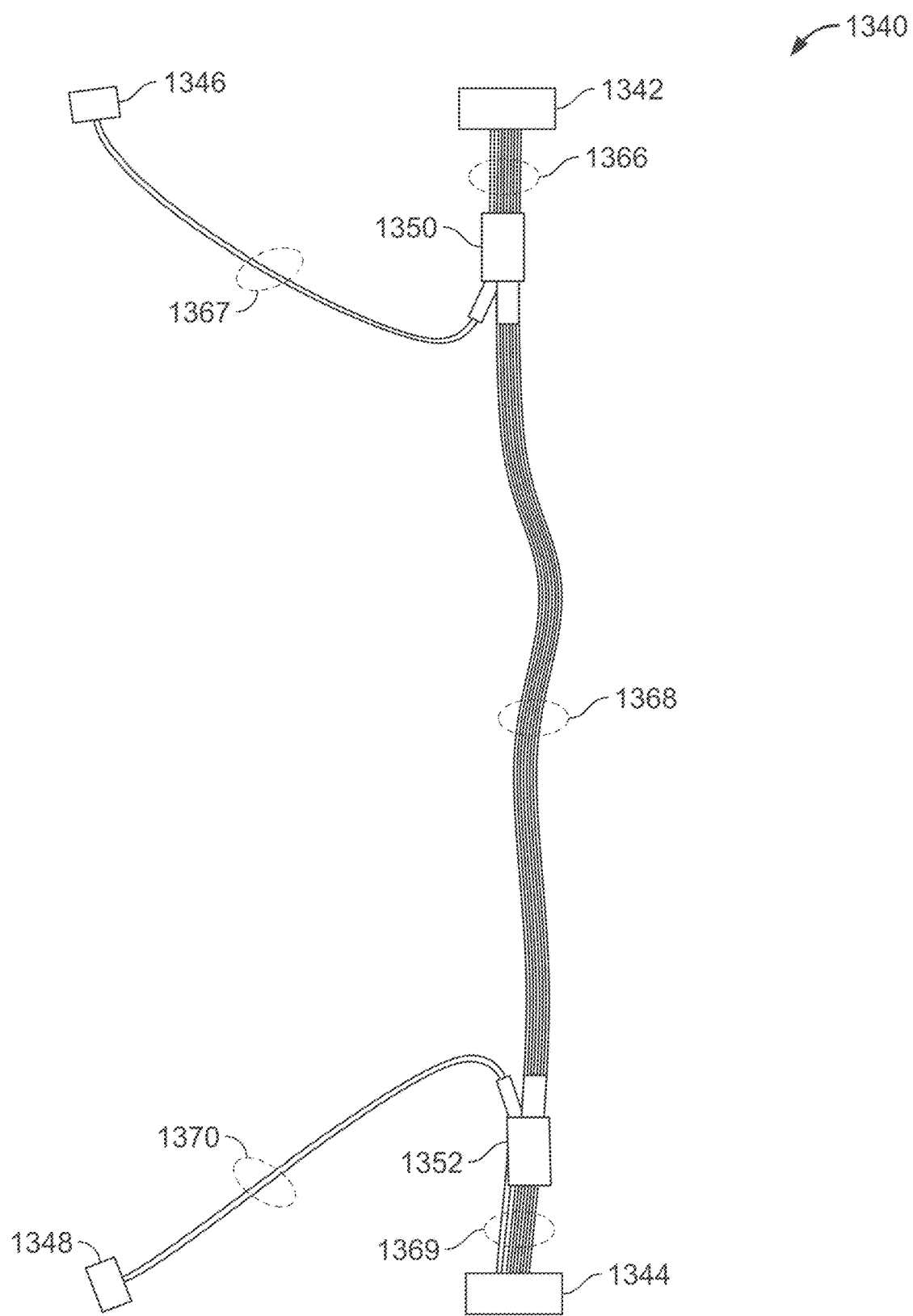
FIG. 13C is an enlarged diagram of the optical cable assembly of FIG. 13B.

FIG. 13B is a diagram of an example of an optical cable assembly 1340 that can be used to enable the first co-packaged optical module 1312 to receive optical power supply light from the first optical power supply 1322, enable the second co-packaged optical module 1316 to receive optical power supply light from the second optical power supply 1330, and enable the first co-packaged optical module 1312 to communicate with the second co-packaged optical module 1316. FIG. 13C is an enlarged diagram of the optical cable assembly 1340 without some of the reference numbers to enhance clarity of illustration.

The optical cable assembly 1340 includes a first optical fiber connector 1342, a second optical fiber connector 1344, a third optical fiber connector 1346, and a fourth optical fiber connector 1348. The first optical fiber connector 1342 is designed and configured to be optically coupled to the first co-packaged optical module 1312. For example, the first optical fiber connector 1342 can be configured to mate with a connector part of the first co-packaged optical module 1312, or a connector part that is optically coupled to the first co-packaged optical module 1312. The first, second, third, and fourth optical fiber connectors 1342, 1344, 1346, 1348 can comply with an industry standard that defines the specifications for optical fiber interconnection cables that transmit data and control signals, and optical power supply light.

The first optical fiber connector 1342 includes optical power supply (PS) fiber ports, transmitter (TX) fiber ports, and receiver (RX) fiber ports. The optical power supply fiber ports provide optical power supply light to the co-packaged optical module 1312. The transmitter fiber ports allow the co-packaged optical module 1312 to transmit output optical signals (e.g., data and/or control signals), and the receiver fiber ports allow the co-packaged optical module 1312 to receive input optical signals (e.g., data and/or control signals). An example of the arrangement of the optical power supply fiber ports, the transmitter ports, and the receiver ports in the first optical fiber connector 1342 are shown in FIG. 13D.

Figure 13D:
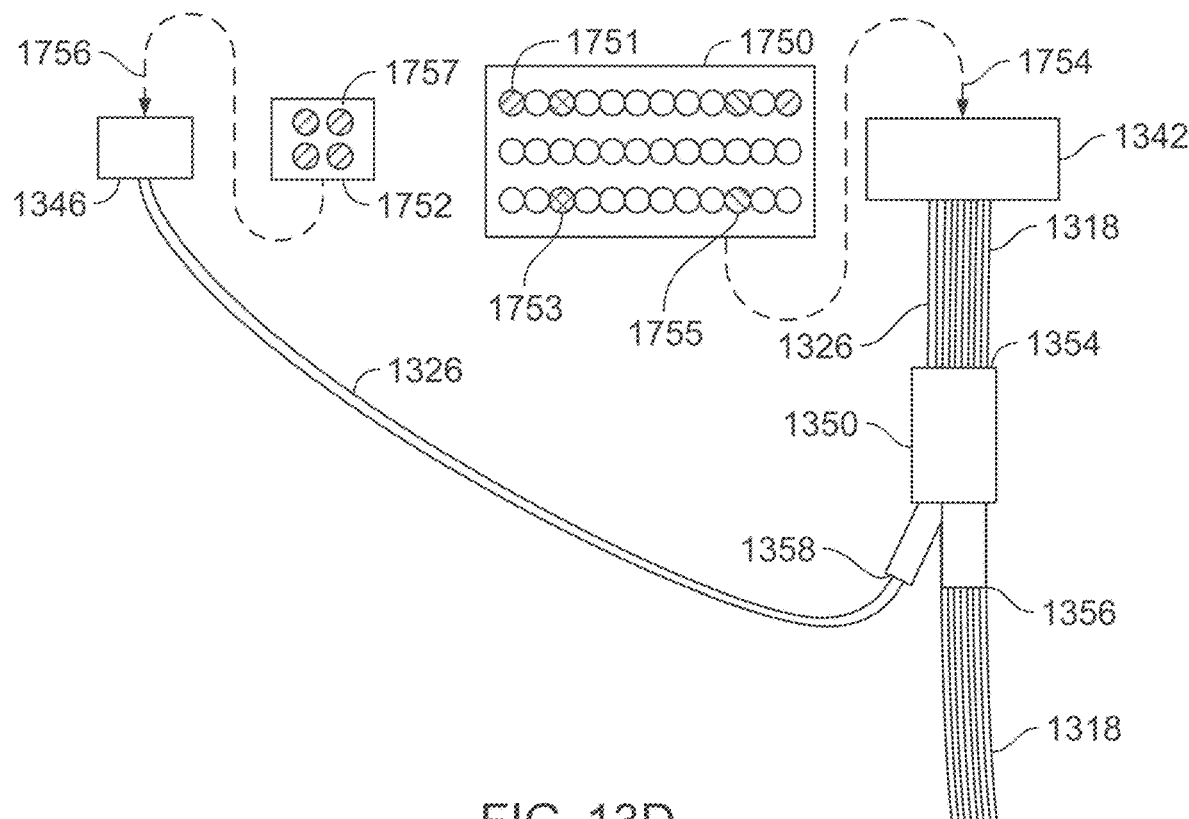
FIG. 13D is an enlarged diagram of the upper portion of the optical cable assembly of FIG. 13B.

FIG. 13D shows an enlarged upper portion of the diagram of FIG. 13B, with the addition of an example of a mapping of fiber ports 1750 of the first optical fiber connector 1342 and a mapping of fiber ports 1752 of the third optical fiber connector 1346. The mapping of fiber ports 1750 shows the positions of the transmitter fiber ports (e.g., 1753), receiver fiber ports (e.g., 1755), and power supply fiber ports (e.g., 1751) of the first optical fiber connector 1342 when viewed in the direction 1754 into the first optical fiber connector 1342. The mapping of fiber ports 1752 shows the positions of the power supply fiber ports (e.g., 1757) of the third optical fiber connector 1346 when viewed in the direction 1756 into the third optical fiber connector 1346.

The second optical fiber connector 1344 is designed and configured to be optically coupled to the second co-packaged optical module 1316. The second optical fiber connector 1344 includes optical power supply fiber ports, transmitter fiber ports, and receiver fiber ports. The optical power supply fiber ports provide optical power supply light to the co-packaged optical module 1316. The transmitter fiber ports allow the co-packaged optical module 1316 to transmit output optical signals, and the receiver fiber ports allow the co-packaged optical module 1316 to receive input optical signals. An examples of the arrangement of the optical power supply fiber ports, the transmitter ports, and the receiver ports in the second optical fiber connector 1344 are shown in FIG. 13E.

Figure 13E:
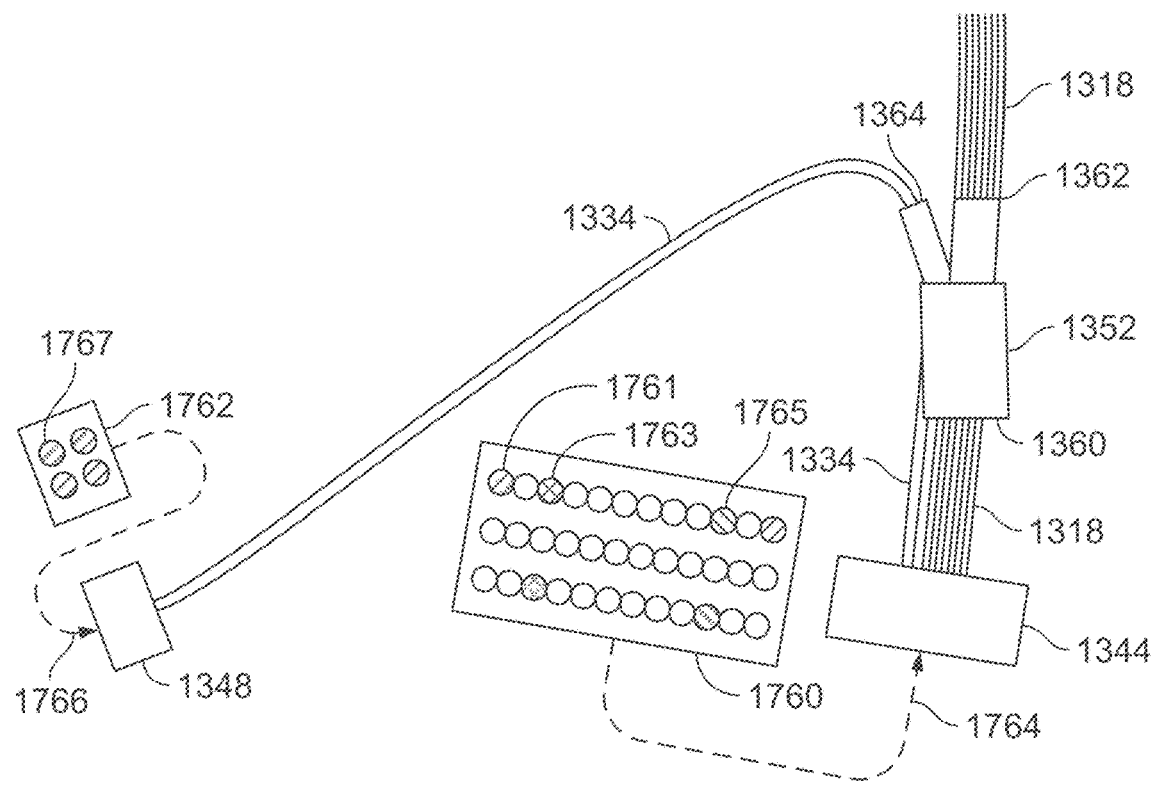
FIG. 13E is an enlarged diagram of the lower portion of the optical cable assembly of FIG. 13B.

FIG. 13E shows an enlarged lower portion of the diagram of FIG. 13B, with the addition of an example of a mapping of fiber ports 1760 of the second optical fiber connector 1344 and a mapping of fiber ports 1762 of the fourth optical fiber connector 1348. The mapping of fiber ports 1760 shows the positions of the transmitter fiber ports (e.g., 1763), receiver fiber ports (e.g., 1765), and power supply fiber ports (e.g., 1761) of the second optical fiber connector 1344 when viewed in the direction 1764 into the second optical fiber connector 1344. The mapping of fiber ports 1762 shows the positions of the power supply fiber ports (e.g., 1767) of the fourth optical fiber connector 1348 when viewed in the direction 1766 into the fourth fiber connector 1348.

The third optical connector 1346 is designed and configured to be optically coupled to the power supply 1322. The third optical connector 1346 includes optical power supply fiber ports (e.g., 1757) through which the power supply 1322 can output the optical power supply light. The fourth optical connector 1348 is designed and configured to be optically coupled to the power supply 1330. The fourth optical connector 1348 includes optical power supply fiber ports (e.g., 1762) through which the power supply 1322 can output the optical power supply light.

In some implementations, the optical power supply fiber ports, the transmitter fiber ports, and the receiver fiber ports in the first and second optical fiber connectors 1342, 1344 are designed to be independent of the communication devices, i.e., the first optical fiber connector 1342 can be optically coupled to the second switch box 1304, and the second optical fiber connector 1344 can be optically coupled to the first switch box 1302 without any re-mapping of the fiber ports. Similarly, the optical power supply fiber ports in the third and fourth optical fiber connectors 1346, 1348 are designed to be independent of the optical power supplies, i.e., if the first optical fiber connector 1342 is optically coupled to the second switch box 1304, the third optical fiber connector 1346 can be optically coupled to the second optical power supply 1330. If the second optical fiber connector 1344 is optically coupled to the first switch box 1302, the fourth optical fiber connector 1348 can be optically coupled to the first optical power supply 1322.

The optical cable assembly 1340 includes a first optical fiber guide module 1350 and a second optical fiber guide module 1352. The optical fiber guide module depending on context is also referred to as an optical fiber coupler or splitter because the optical fiber guide module combines multiple bundles of fibers into one bundle of fibers, or separates one bundle of fibers into multiple bundles of fibers. The first optical fiber guide module 1350 includes a first port 1354, a second port 1356, and a third port 1358. The second optical fiber guide module 1352 includes a first port 1360, a second port 1362, and a third port 1364. The fiber bundle 1318 extends from the first optical fiber connector 1342 to the second optical fiber connector 1344 through the first port 1354 and the second port 1356 of the first optical fiber guide module 1350 and the second port 1362 and the first port 1360 of the second optical fiber guide module 1352. The optical fibers 1326 extend from the third optical fiber connector 1346 to the first optical fiber connector 1342 through the third port 1358 and the first port 1354 of the first optical fiber guide module 1350. The optical fibers 1334 extend from the fourth optical fiber connector 1348 to the second optical fiber connector 1344 through the third port 1364 and the first port 1360 of the second optical fiber guide module 1352.

A portion (or section) of the optical fibers 1318 and a portion of the optical fibers 1326 extend from the first port 1354 of the first optical fiber guide module 1350 to the first optical fiber connector 1342. A portion of the optical fibers 1318 extend from the second port 1356 of the first optical fiber guide module 1350 to the second port 1362 of the second optical fiber guide module 1352, with optional optical connectors (e.g., 1320) along the paths of the optical fibers 1318. A portion of the optical fibers 1326 extend from the third port 1358 of the first optical fiber connector 1350 to the third optical fiber connector 1346. A portion of the optical fibers 1334 extend from the third port 1364 of the second optical fiber connector 1352 to the fourth optical fiber connector 1348.

The first optical fiber guide module 1350 is designed to restrict bending of the optical fibers such that the bending radius of any optical fiber in the first optical fiber guide module 1350 is greater than the minimum bending radius specified by the optical fiber manufacturer to avoid excess optical light loss or damage to the optical fiber. For example, the minimum bend radii can be 2 cm, 1 cm, 5 mm, or 2.5 mm. Other bend radii are also possible. For example, the fibers 1318 and the fibers 1326 extend outward from the first port 1354 along a first direction, the fibers 1318 extend outward from the second port 1356 along a second direction, and the fibers 1326 extend outward from the third port 1358 along a third direction. A first angle is between the first and second directions, a second angle is between the first and third directions, and a third angle is between the second and third directions. The first optical fiber guide module 1350 can be designed to limit the bending of optical fibers so that each of the first, second, and third angles is in a range from, e.g., 300 to 180°.

For example, the portion of the optical fibers 1318 and the portion of the optical fibers 1326 between the first optical fiber connector 1342 and the first port 1354 of the first optical fiber guide module 1350 can be surrounded and protected by a first common sheath 1366. The optical fibers 1318 between the second port 1356 of the first optical fiber guide module 1350 and the second port 1362 of the second optical fiber guide module 1352 can be surrounded and protected by a second common sheath 1368. The portion of the optical fibers 1318 and the portion of the optical fibers 1334 between the second optical fiber connector 1344 and the first port 1360 of the second optical fiber guide module 1352 can be surrounded and protected by a third common sheath 1369. The optical fibers 1326 between the third optical fiber connector 1346 and the third port 1358 of the first optical fiber guide module 1350 can be surrounded and protected by a fourth common sheath 1367. The optical fibers 1334 between the fourth optical fiber connector 1348 and the third port 1364 of the second optical fiber guide module 1352 can be surrounded and protected by a fifth common sheath 1370. Each of the common sheaths can be laterally flexible and/or laterally stretchable, as described in, e.g., U.S. patent application Ser. No. 16/822,103.

One or more optical cable assemblies 1340 (FIGS. 13B, 13C) and other optical cable assemblies (e.g., 1400 of FIG. 15B, 15C, 1490 of FIG. 17B, 17C) described in this document can be used to optically connect switch boxes that are configured differently compared to the switch boxes 1302, 1304 shown in FIG. 13A, in which the switch boxes receive optical power supply light from one or more external optical power supplies. For example, in some implementations, the optical cable assembly 1340 can be attached to a fiber-optic array connector mounted on the outside of the front panel of an optical switch, and another fiber-optic cable then connects the inside of the fiber connector to a co-packaged optical module that is mounted on a circuit board positioned inside the housing of the switch box. The co-packaged optical module (which includes, e.g., a photonic integrated circuit, optical-to-electrical converters, such as photodetectors, and electrical-to-optical converters, such as laser diodes) can be co-packaged with a switch ASIC and mounted on a circuit board that can be vertically or horizontally oriented. For example, in some implementations, the front panel is mounted on hinges and a vertical ASIC mount is recessed behind it. See the examples in FIGS. 77A, 77B, and 78 of U.S. application 63/145,368. The optical cable assembly 1340 provides optical paths for communication between the switch boxes, and optical paths for transmitting power supply light from one or more external optical power supplies to the switch boxes. The switch boxes can have any of a variety of configurations regarding how the power supply light and the data and/or control signals from the optical fiber connectors are transmitted to or received from the photonic integrated circuits, and how the signals are transmitted between the photonic integrated circuits and the data processors.

One or more optical cable assemblies 1340 and other optical cable assemblies (e.g., 1400 of FIG. 15B, 15C, 1490 of FIG. 17B, 17C) described in this document can be used to optically connect computing devices other than switch boxes. For example, the computing devices can be server computers that provide a variety of services, such as cloud computing, database processing, audio/video hosting and streaming, electronic mail, data storage, web hosting, social network, supercomputing, scientific research computing, healthcare data processing, financial transaction processing, logistics management, weather forecast, or simulation, to list a few examples. The optical power light required by the optoelectronic modules of the computing devices can be provided using one or more external optical power supplies. For example, in some implementations, one or more external optical power supplies that are centrally managed can be configured to provide the optical power supply light for hundreds or thousands of server computers in a data center, and the one or more optical power supplies and the server computers can be optically connected using the optical cable assemblies (e.g., 1340, 1400, 1490) described in this document and variations of the optical cable assemblies using the principles described in this document.

Figure 14:
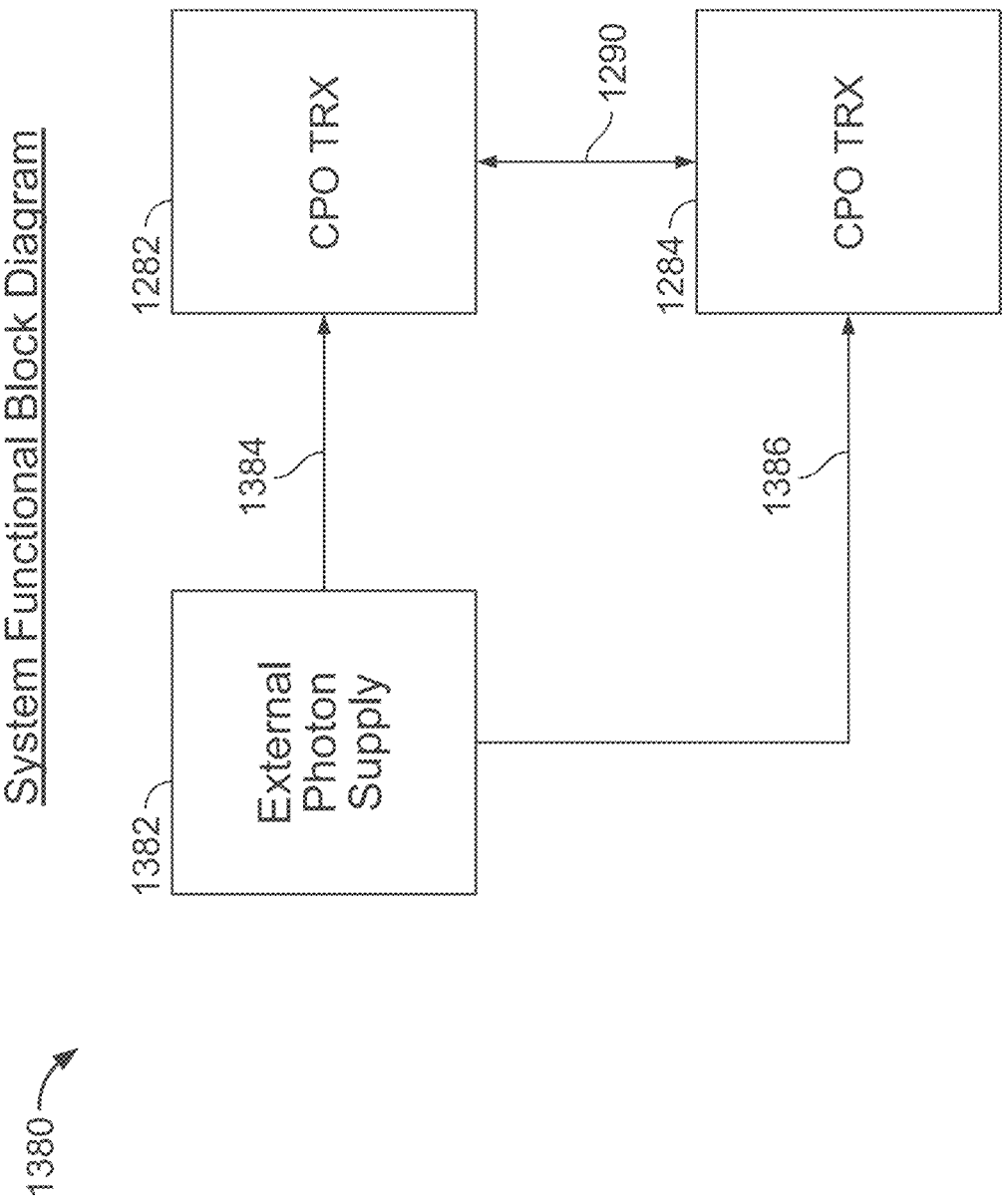
FIGS. 14 and 15A are diagrams of examples of optical communication systems.

FIG. 14 is a system functional block diagram of an example of an optical communication system 1380 that includes a first communication transponder 1282 and a second communication transponder 1284. The first communication transponder 1282 sends optical signals to, and receives optical signals from, the second communication transponder 1284 through a first optical communication link 1290. The optical communication system 1380 can be expanded to include additional communication transponders.

An external photon supply 1382 provides optical power supply light to the first communication transponder 1282 through a first optical power supply link 1384, and provides optical power supply light to the second communication transponder 1284 through a second optical power supply link 1386. In one example, the external photon supply 1282 provides continuous wave light to the first communication transponder 1282 and to the second communication transponder 1284. In one example, the continuous wave light can be at the same optical wavelength. In another example, the continuous wave light can be at different optical wavelengths. In yet another example, the external photon supply 1282 provides a first sequence of optical frame templates to the first communication transponder 1282, and provides a second sequence of optical frame templates to the second communication transponder 1284. Each of the optical frame templates can include a respective frame header and a respective frame body, and the frame body includes a respective optical pulse train. The first communication transponder 1282 receives the first sequence of optical frame templates from the external photon supply 1382, loads data into the respective frame bodies to convert the first sequence of optical frame templates into a first sequence of loaded optical frames that are transmitted through the first optical communication link 1290 to the second communication transponder 1284. Similarly, the second communication transponder 1284 receives the second sequence of optical frame templates from the external photon supply 1382, loads data into the respective frame bodies to convert the second sequence of optical frame templates into a second sequence of loaded optical frames that are transmitted through the first optical communication link 1290 to the first communication transponder 1282.

Figures 15A, 15B:
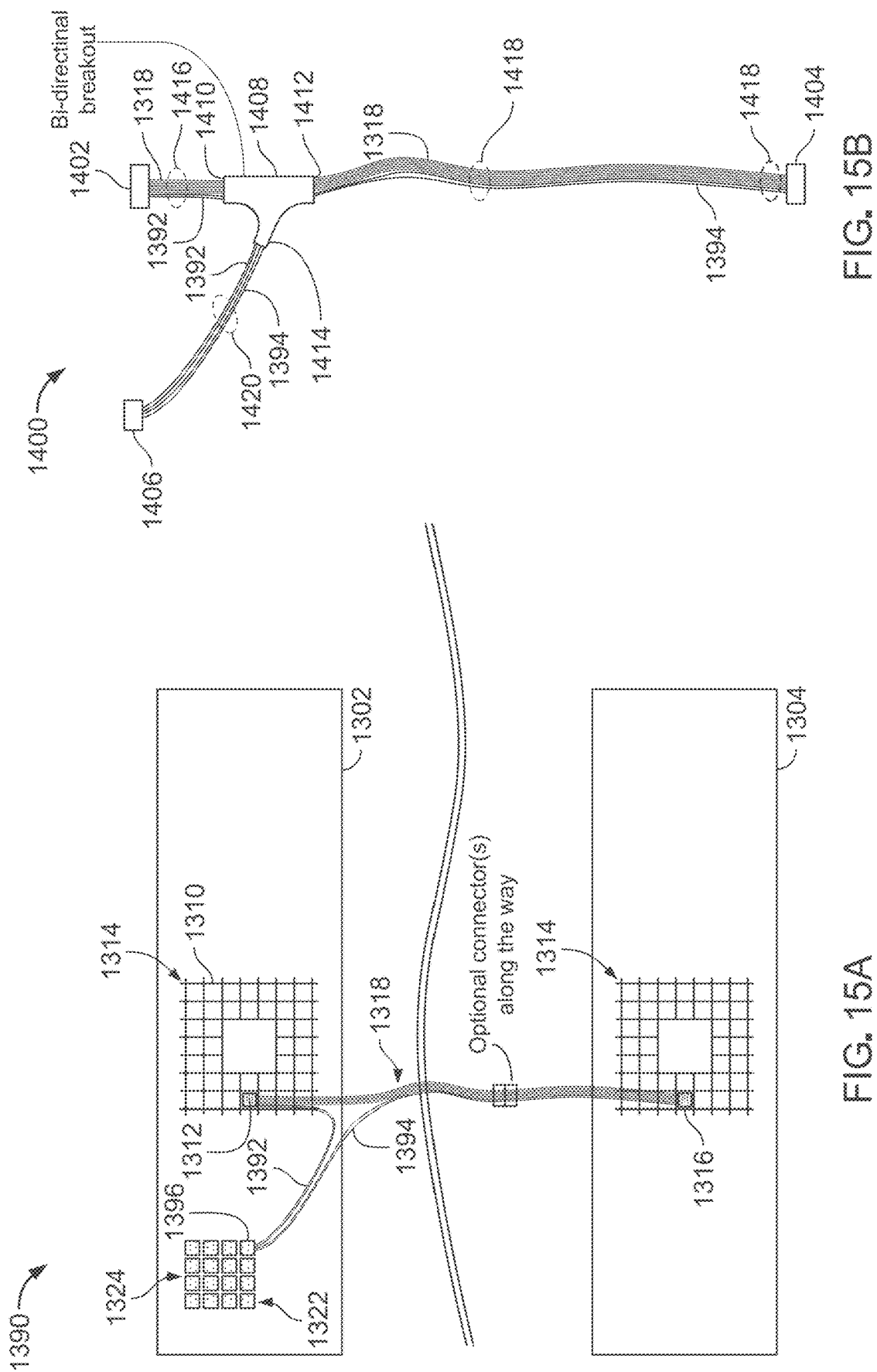
FIG. 15B is a diagram of an example of an optical cable assembly.

FIG. 15A is a diagram of an example of an optical communication system 1390 that includes a first switch box 1302 and a second switch box 1304, similar to those in FIG. 13A. The first switch box 1302 includes a vertical ASIC mount grid structure 1310, and a co-packaged optical module 1312 is attached to a receptor of the grid structure 1310. The second switch box 1304 includes a vertical ASIC mount grid structure 1314, and a co-packaged optical module 1316 is attached to a receptor of the grid structure 1314. The first co-packaged optical module 1312 communicates with the second co-packaged optical module 1316 through an optical fiber bundle 1318 that includes multiple optical fibers.

As discussed above in connection with FIGS. 13A to 13E, the first and second switch boxes 1302, 1304 can have other configurations. For example, horizontally mounted ASICs can be used. A fiber-optic array connector attached to a front panel can be used to optically connect the optical cable assembly 1340 to another fiber-optic cable that connects to a co-packaged optical module mounted on a circuit board inside the switch box. The front panel can be mounted on hinges and a vertical ASIC mount can be recessed behind it. The switch boxes can be replaced by other types of server computers.

In an example embodiment, the first switch box 1302 includes an external optical power supply 1322 that provides optical power supply light to both the co-packaged optical module 1312 in the first switch box 1302 and the co-packaged optical module 1316 in the second switch box 1304. In another example embodiment, the optical power supply can be located outside the switch box 1302 (cf. 1330, FIG. 13A). The optical power supply 1322 provides the optical power supply light through an optical connector array 1324. Optical fibers 1392 are optically coupled to an optical connector 1396 and the co-packaged optical module 1312. The optical power supply 1322 sends optical power supply light through the optical connector 1396 and the optical fibers 1392 to the co-packaged optical module 1312 in the first switch box 1302. Optical fibers 1394 are optically coupled to the optical connector 1396 and the co-packaged optical module 1316. The optical power supply 1322 sends optical power supply light through the optical connector 1396 and the optical fibers 1394 to the co-packaged optical module 1316 in the second switch box 1304.

Figure 15C:
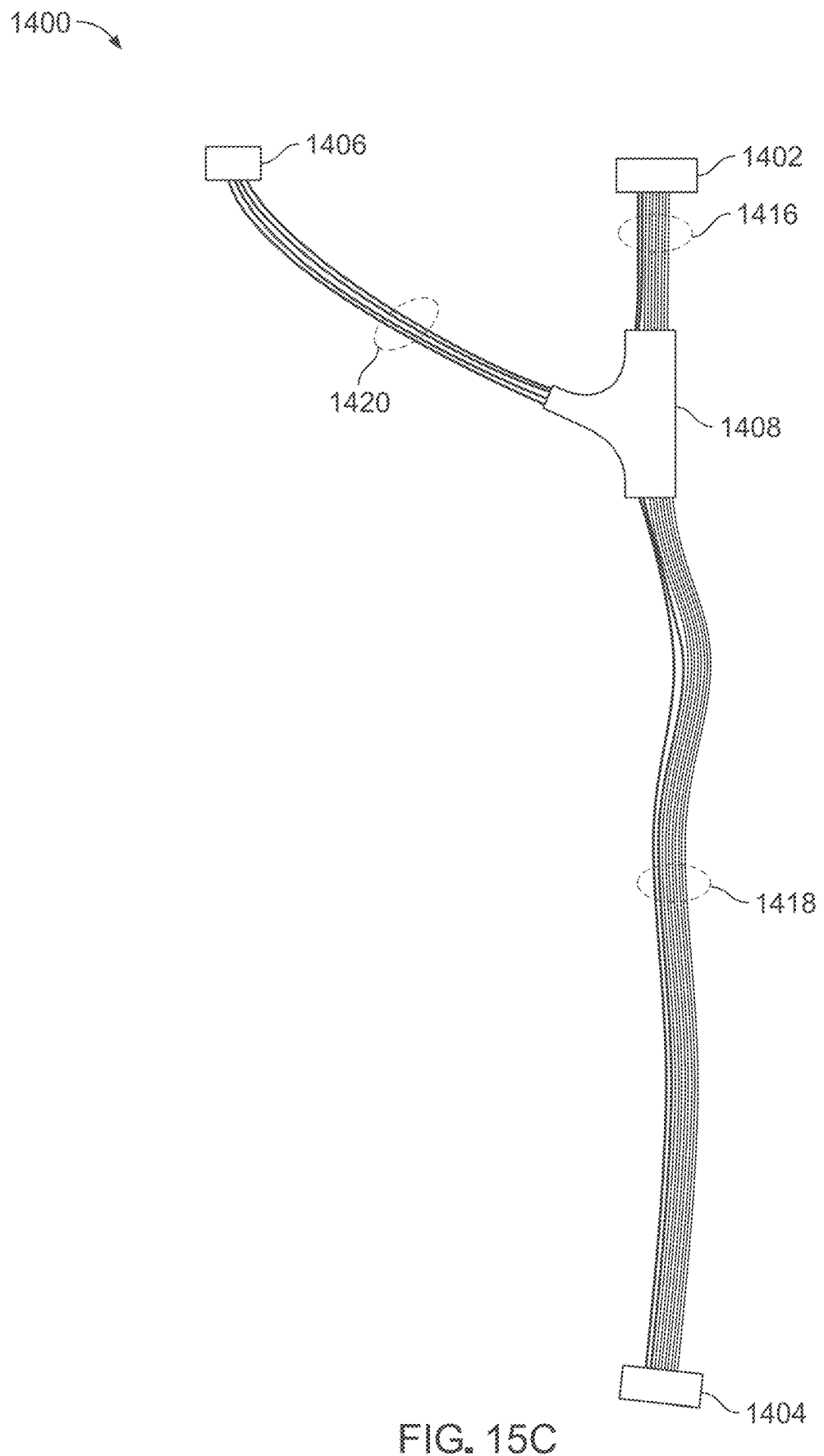
FIG. 15C is an enlarged diagram of the optical cable assembly of FIG. 15B.

FIG. 15B shows an example of an optical cable assembly 1400 that can be used to enable the first co-packaged optical module 1312 to receive optical power supply light from the optical power supply 1322, enable the second co-packaged optical module 1316 to receive optical power supply light from the optical power supply 1322, and enable the first co-packaged optical module 1312 to communicate with the second co-packaged optical module 1316. FIG. 15C is an enlarged diagram of the optical cable assembly 1400 without some of the reference numbers to enhance clarity of illustration.

The optical cable assembly 1400 includes a first optical fiber connector 1402, a second optical fiber connector 1404, and a third optical fiber connector 1406. The first optical fiber connector 1402 is similar to the first optical fiber connector 1342 of FIGS. 13B, 13C, 13D, and is designed and configured to be optically coupled to the first co-packaged optical module 1312. The second optical fiber connector 1404 is similar to the second optical fiber connector 1344 of FIGS. 13B, 13C, 13E, and is designed and configured to be optically coupled to the second co-packaged optical module 1316. The third optical connector 1406 is designed and configured to be optically coupled to the power supply 1322. The third optical connector 1406 includes first optical power supply fiber ports (e.g., 1770, FIG. 15D) and second optical power supply fiber ports (e.g., 1772). The power supply 1322 outputs optical power supply light through the first optical power supply fiber ports to the optical fibers 1392, and outputs optical power supply light through the second optical power supply fiber ports to the optical fibers 1394. The first, second, and third optical fiber connectors 1402, 1404, 1406 can comply with an industry standard that defines the specifications for optical fiber interconnection cables that transmit data and control signals, and optical power supply light.

Figure 15D:
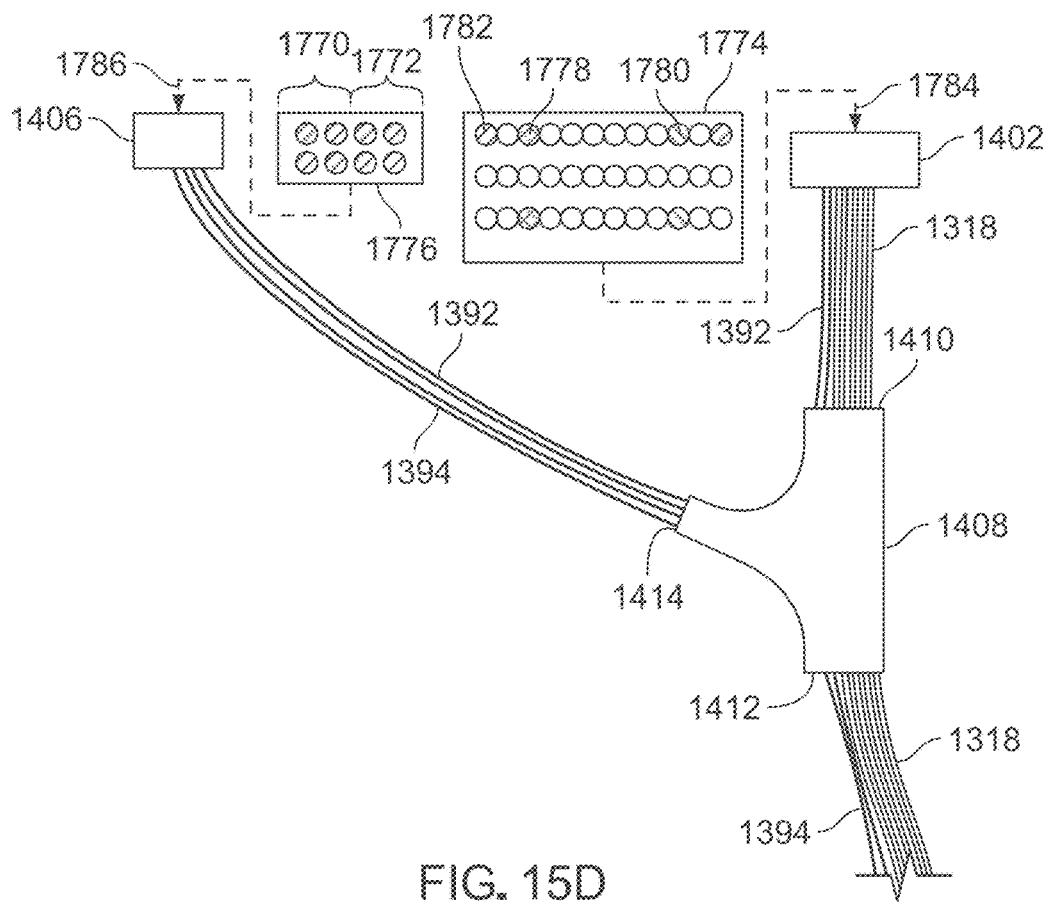
FIG. 15D is an enlarged diagram of the upper portion of the optical cable assembly of FIG. 15B.

FIG. 15D shows an enlarged upper portion of the diagram of FIG. 15B, with the addition of an example of a mapping of fiber ports 1774 of the first optical fiber connector 1402 and a mapping of fiber ports 1776 of the third optical fiber connector 1406. The mapping of fiber ports 1774 shows the positions of the transmitter fiber ports (e.g., 1778), receiver fiber ports (e.g., 1780), and power supply fiber ports (e.g., 1782) of the first optical fiber connector 1402 when viewed in the direction 1784 into the first optical fiber connector 1402. The mapping of fiber ports 1776 shows the positions of the power supply fiber ports (e.g., 1770, 1772) of the third optical fiber connector 1406 when viewed in the direction 1786 into the third optical fiber connector 1406. In this example, the third optical fiber connector 1406 includes 8 optical power supply fiber ports.

In some examples, optical connector array 1324 of the optical power supply 1322 can include a first type of optical connectors that accept optical fiber connectors having 4 optical power supply fiber ports, as in the example of FIG. 13D, and a second type of optical connectors that accept optical fiber connectors having 8 optical power supply fiber ports, as in the example of FIG. 15D. In some examples, if the optical connector array 1324 of the optical power supply 1322 only accepts optical fiber connectors having 4 optical power supply fiber ports, then a converter cable can be used to convert the third optical fiber connector 1406 of FIG. 15D to two optical fiber connectors, each having 4 optical power supply fiber ports, that is compatible with the optical connector array 1324.

Figure 15E:
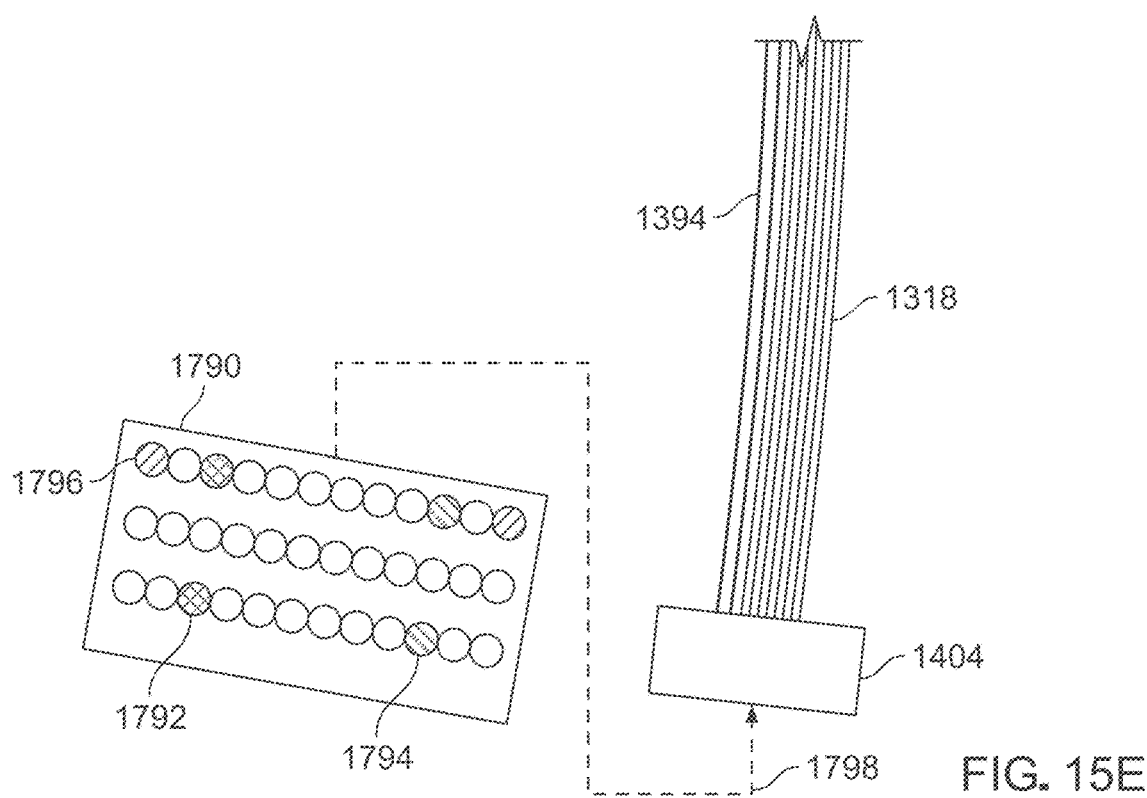
FIG. 15E is an enlarged diagram of the lower portion of the optical cable assembly of FIG. 15B.

FIG. 15E shows an enlarged lower portion of the diagram of FIG. 15B, with the addition of an example of a mapping of fiber ports 1790 of the second optical fiber connector 1404. The mapping of fiber ports 1790 shows the positions of the transmitter fiber ports (e.g., 1792), receiver fiber ports (e.g., 1794), and power supply fiber ports (e.g., 1796) of the second optical fiber connector 1404 when viewed in the direction 1798 into the second optical fiber connector 1404.

The port mappings of the optical fiber connectors shown in FIGS. 13D, 13E, 15D, and 15E are merely examples. Each optical fiber connector can include a greater number or a smaller number of transmitter fiber ports, a greater number or a smaller number of receiver fiber ports, and a greater number or a smaller number of optical power supply fiber ports, as compared to those shown in FIGS. 13D, 13E, 15D, and 15E. The arrangement of the relative positions of the transmitter, receiver, and optical power supply fiber ports can also be different from those shown in FIGS. 13D, 13E, 15D, and 15E.

The optical cable assembly 1400 includes an optical fiber guide module 1408, which includes a first port 1410, a second port 1412, and a third port 1414. The optical fiber guide module 1408 depending on context is also referred as an optical fiber coupler (for combining multiple bundles of optical fibers into one bundle of optical fiber) or an optical fiber splitter (for separating a bundle of optical fibers into multiple bundles of optical fibers). The fiber bundle 1318 extends from the first optical fiber connector 1402 to the second optical fiber connector 1404 through the first port 1410 and the second port 1412 of the optical fiber guide module 1408. The optical fibers 1392 extend from the third optical fiber connector 1406 to the first optical fiber connector 1402 through the third port 1414 and the first port 1410 of the optical fiber guide module 1408. The optical fibers 1394 extend from the third optical fiber connector 1406 to the second optical fiber connector 1404 through the third port 1414 and the second port 1412 of the optical fiber guide module 1408.

A portion of the optical fibers 1318 and a portion of the optical fibers 1392 extend from the first port 1410 of the optical fiber guide module 1408 to the first optical fiber connector 1402. A portion of the optical fibers 1318 and a portion of the optical fibers 1394 extend from the second port 1412 of the optical fiber guide module 1408 to the second optical fiber connector 1404. A portion of the optical fibers 1394 extend from the third port 1414 of the optical fiber connector 1408 to the third optical fiber connector 1406.

The optical fiber guide module 1408 is designed to restrict bending of the optical fibers such that the radius of curvature of any optical fiber in the optical fiber guide module 1408 is greater than the minimum radius of curvature specified by the optical fiber manufacturer to avoid excess optical light loss or damage to the optical fiber. For example, the optical fibers 1318 and the optical fibers 1392 extend outward from the first port 1410 along a first direction, the optical fibers 1318 and the optical fibers 1394 extend outward from the second port 1412 along a second direction, and the optical fibers 1392 and the optical fibers 1394 extend outward from the third port 1414 along a third direction. A first angle is between the first and second directions, a second angle is between the first and third directions, and a third angle is between the second and third directions. The optical fiber guide module 1408 is designed to limit the bending of optical fibers so that each of the first, second, and third angles is in a range from, e.g., 30° to 180°.

For example, the portion of the optical fibers 1318 and the portion of the optical fibers 1392 between the first optical fiber connector 1402 and the first port 1410 of the optical fiber guide module 1408 can be surrounded and protected by a first common sheath 1416. The optical fibers 1318 and the optical fibers 1394 between the second optical fiber connector 1404 and the second port 1412 of the optical fiber guide module 1408 can be surrounded and protected by a second common sheath 1418. The optical fibers 1392 and the optical fibers 1394 between the third optical fiber connector 1406 and the third port 1414 of the optical fiber guide module 1408 can be surrounded and protected by a third common sheath 1420. Each of the common sheaths can be laterally flexible and/or laterally stretchable.

Figure 16:
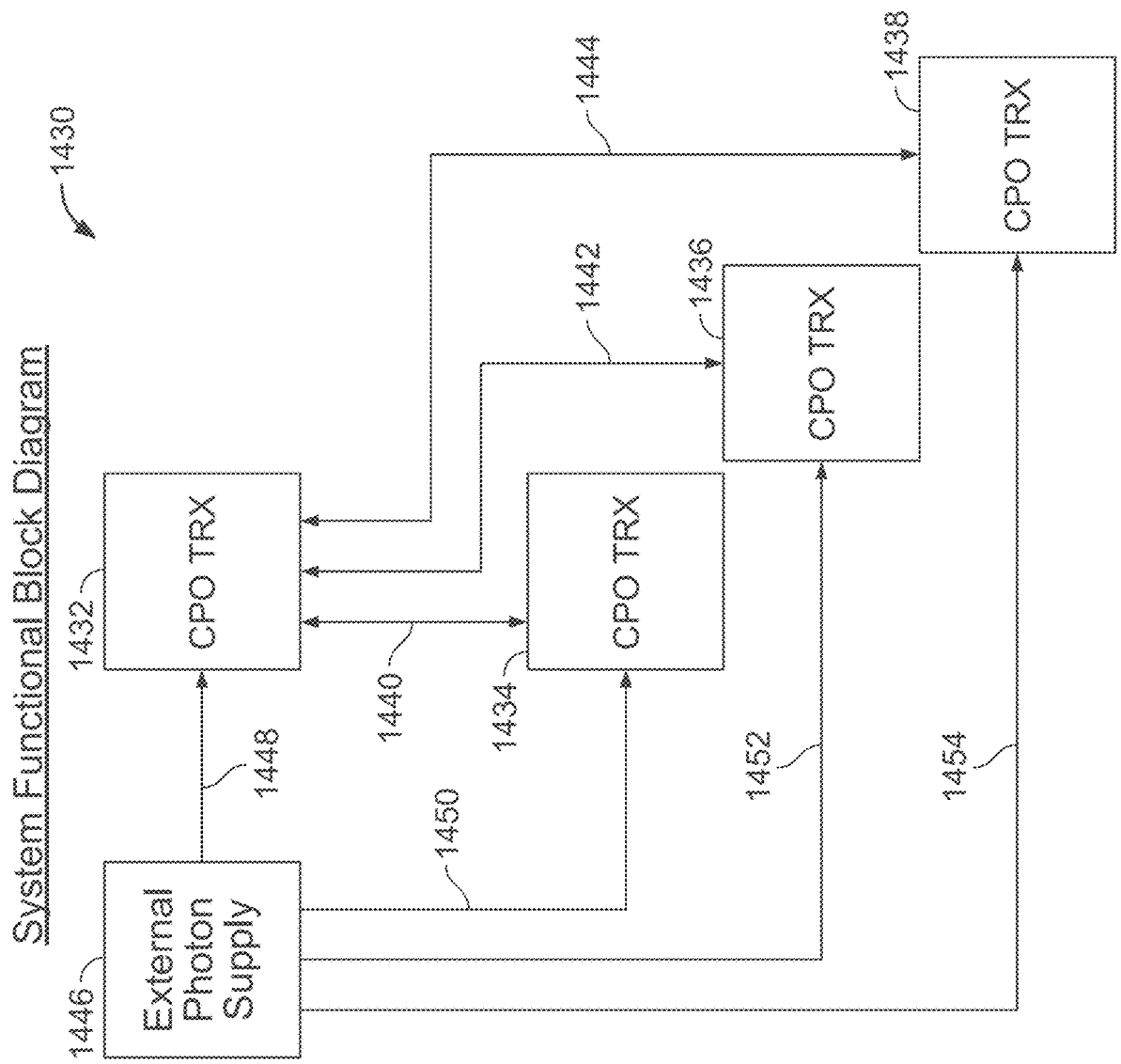

FIG. 16 is a system functional block diagram of an example of an optical communication system 1430 that includes a first communication transponder 1432, a second communication transponder 1434, a third communication transponder 1436, and a fourth communication transponder 1438. Each of the communication transponders 1432, 1434, 1436, 1438 can be similar to the communication transponders 1202, 1204 of FIG. 12. The first communication transponder 1432 communicates with the second communication transponder 1434 through a first optical link 1440. The first communication transponder 1432 communicates with the third communication transponder 1436 through a second optical link 1442. The first communication transponder 1432 communicates with the fourth communication transponder 1438 through a third optical link 1444.

An external photon supply 1446 provides optical power supply light to the first communication transponder 1432 through a first optical power supply link 1448, provides optical power supply light to the second communication transponder 1434 through a second optical power supply link 1450, provides optical power supply light to the third communication transponder 1436 through a third optical power supply link 1452, and provides optical power supply light to the fourth communication transponder 1438 through a fourth optical power supply link 1454.

FIG. 17A is a diagram of an example of an optical communication system 1460 that includes a first switch box 1462 and a remote server array 1470 that includes a second switch box 1464, a third switch box 1466, and a fourth switch box 1468. The first switch box 1462 includes a vertical ASIC mount grid structure 1310, and a co-packaged optical module 1312 is attached to a receptor of the grid structure 1310. The second switch box 1464 includes a co-packaged optical module 1472, the third switch box 1466 includes a co-packaged optical module 1474, and the third switch box 1468 includes a co-packaged optical module 1476. The first co-packaged optical module 1312 communicates with the co-packaged optical modules 1472, 1474, 1476 through an optical fiber bundle 1478 that later branches out to the co-packaged optical modules 1472, 1474, 1476.

In one example embodiment, the first switch box 1462 includes an external optical power supply 1322 that provides optical power supply light through an optical connector array 1324. In another example embodiment, the optical power supply can be located external to switch box 1462 (cf. 1330, FIG. 13A). Optical fibers 1480 are optically coupled to an optical connector 1482, and the optical power supply 1322 sends optical power supply light through the optical connector 1482 and the optical fibers 1480 to the co-packaged optical modules 1312, 1472, 1474, 1476.

Figure 17C:
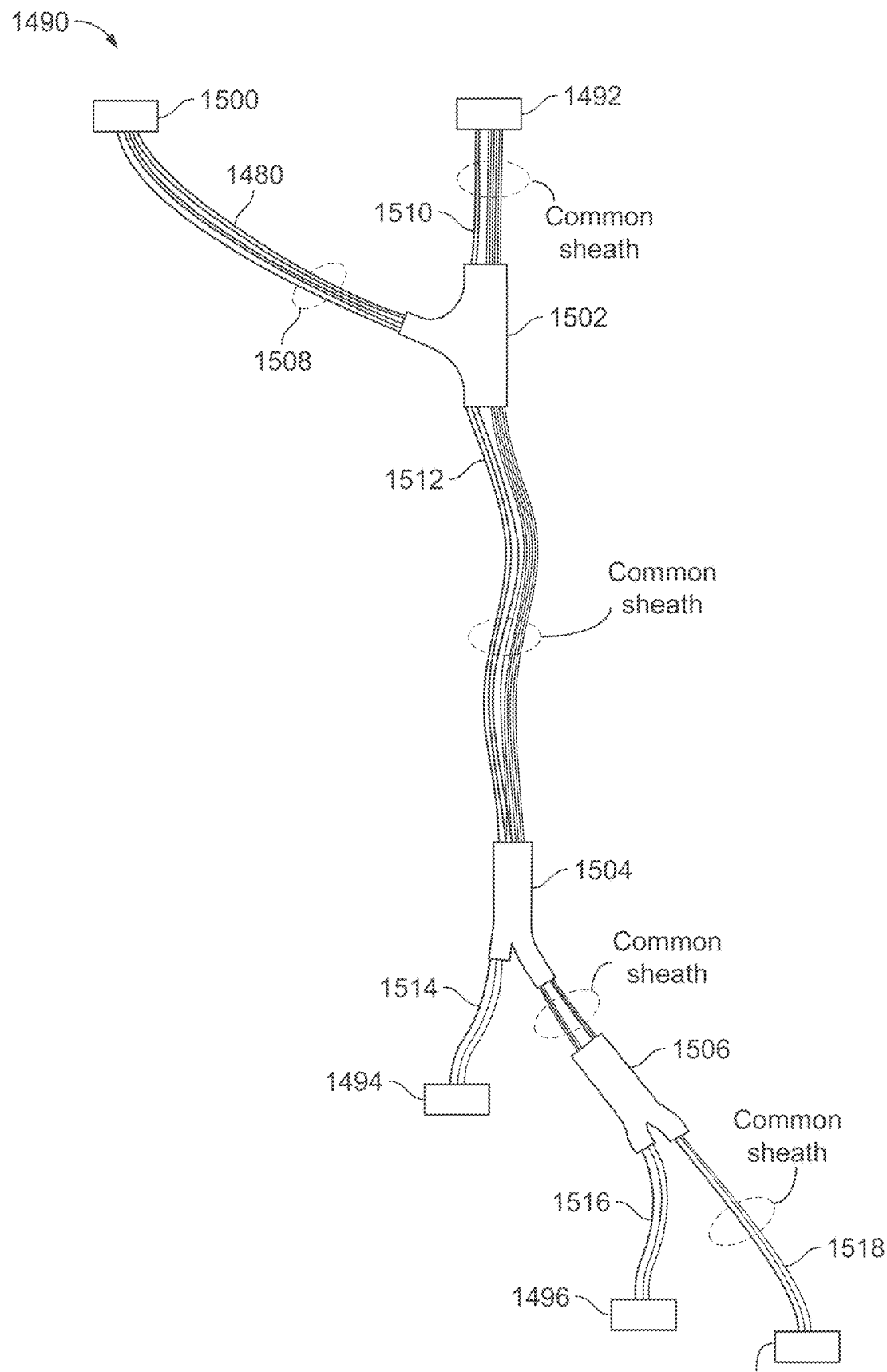
FIG. 17C is an enlarged diagram of the optical cable assembly of FIG. 17B.

FIG. 17B shows an example of an optical cable assembly 1490 that can be used to enable the optical power supply 1322 to provide optical power supply light to the co-packaged optical modules 1312, 1472, 1474, 1476, and enable the co-packaged optical module 1312 to communicate with the co-packaged optical modules 1472, 1474, 1476. The optical cable assembly 1490 includes a first optical fiber connector 1492, a second optical fiber connector 1494, a third optical fiber connector 1496, a fourth optical fiber connector 1498, and a fifth optical fiber connector 1500. The first optical fiber connector 1492 is configured to be optically coupled to the co-packaged optical module 1312. The second optical fiber connector 1494 is configured to be optically coupled to the co-packaged optical module 1472. The third optical fiber connector 1496 is configured to be optically coupled to the co-packaged optical module 1474. The fourth optical fiber connector 1498 is configured to be optically coupled to the co-packaged optical module 1476. The fifth optical fiber connector 1500 is configured to be optically coupled to the optical power supply 1322. FIG. 17C is an enlarged diagram of the optical cable assembly 1490.

Optical fibers that are optically coupled to the optical fiber connectors 1500 and 1492 enable the optical power supply 1322 to provide the optical power supply light to the co-packaged optical module 1312. Optical fibers that are optically coupled to the optical fiber connectors 1500 and 1494 enable the optical power supply 1322 to provide the optical power supply light to the co-packaged optical module 1472. Optical fibers that are optically coupled to the optical fiber connectors 1500 and 1496 enable the optical power supply 1322 to provide the optical power supply light to the co-packaged optical module 1474. Optical fibers that are optically coupled to the optical fiber connectors 1500 and 1498 enable the optical power supply 1322 to provide the optical power supply light to the co-packaged optical module 1476.

Optical fiber guide modules 1502, 1504, 1506, and common sheaths are provided to organize the optical fibers so that they can be easily deployed and managed. The optical fiber guide module 1502 is similar to the optical fiber guide module 1408 of FIG. 15B. The optical fiber guide modules 1504, 1506 are similar to the optical fiber guide module 1350 of FIG. 13B. The common sheaths gather the optical fibers in a bundle so that they can be more easily handled, and the optical fiber guide modules guide the optical fibers so that they extend in various directions toward the devices that need to be optically coupled by the optical cable assembly 1490. The optical fiber guide modules restrict bending of the optical fibers such that the bending radiuses are greater than minimum values specified by the optical fiber manufacturers to prevent excess optical light loss or damage to the optical fibers.

The optical fibers 1480 that extend from the include optical fibers that extend from the optical 1482 are surrounded and protected by a common sheath 1508. At the optical fiber guide module 1502, the optical fibers 1480 separate into a first group of optical fibers 1510 and a second group of optical fibers 1512. The first group of optical fibers 1510 extend to the first optical fiber connector 1492. The second group of optical fibers 1512 extend toward the optical fiber guide modules 1504, 1506, which together function as an optical 1:3 splitter that separates the optical fibers 1512 into a third group of optical fibers 1514, a fourth group of optical fibers 1516, and a fifth group of optical fibers 1518. The group of optical fibers 1514 extend to the optical fiber connector 1494, the group of optical fibers 1516 extend to the optical fiber connector 1496, and the group of optical fibers 1518 extend to the optical fiber connector 1498. In some examples, instead of using two 1:2 split optical fiber guide modules 1504, 1506, it is also possible to use a 1:3 split optical fiber guide module that has four ports, e.g., one input port and three output ports. In general, separating the optical fibers in a 1:N split (N being an integer greater than 2) can occur in one step or multiple steps.

Figure 18:
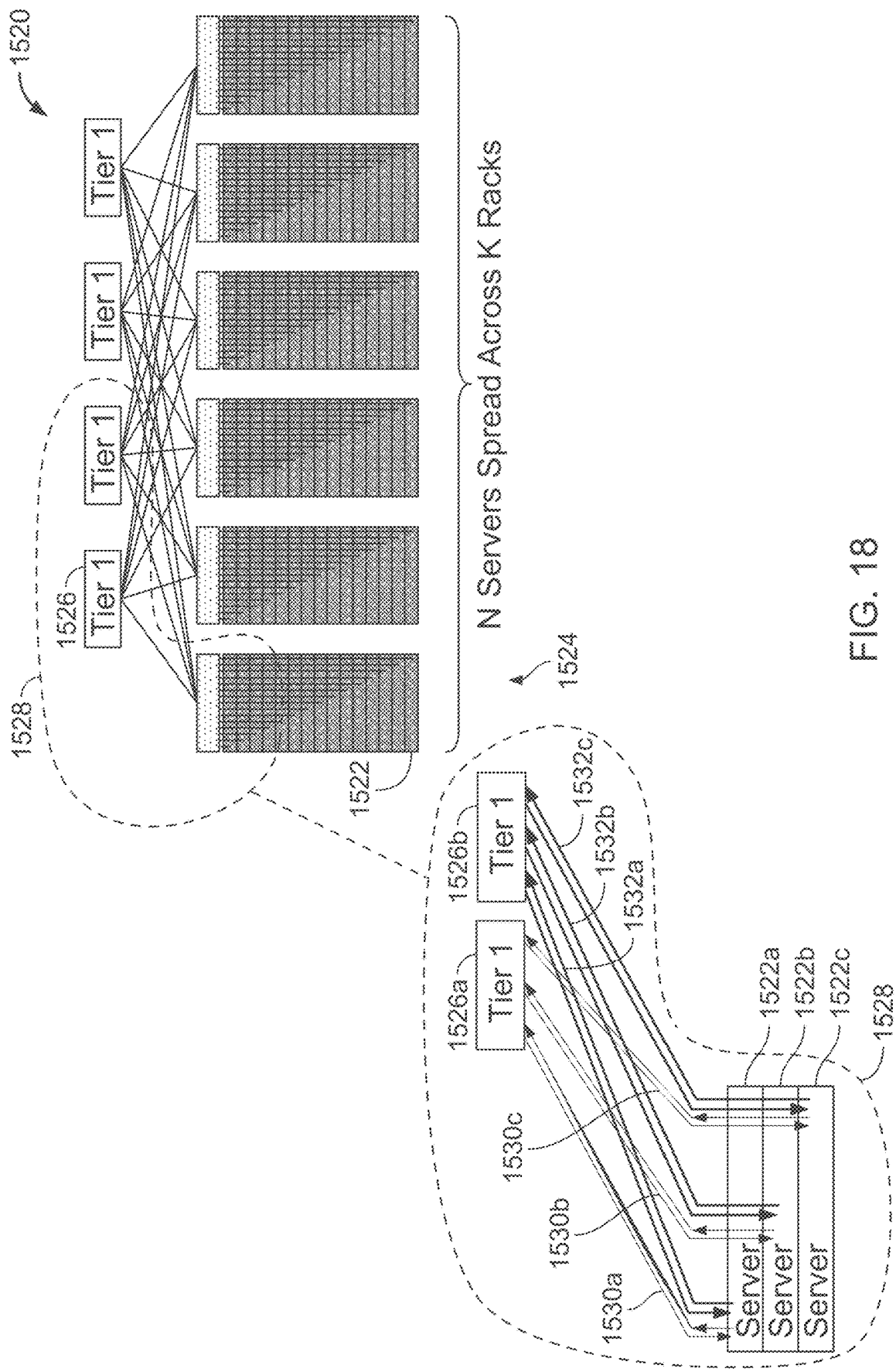
FIGS. 18 to 20B are diagrams of examples of data processing systems.

FIG. 18 is a diagram of an example of a data processing system (e.g., data center) 1520 that includes N servers 1522 spread across K racks 1524. In this example, there are 6 racks 1524, and each rack 1524 includes 15 servers 1522. Each server 1522 directly communicates with a tier 1 switch 1526. The left portion of the figure shows an enlarged view of a portion 1528 of the system 1520. A server 1522a directly communicates with a tier 1 switch 1526a through a communication link 1530a. Similarly, servers 1522b, 1522c directly communicate with the tier 1 switch 1526a through communication links 1530b, 1530c, respectively. The server 1522a directly communicates with a tier 1 switch 1526b through a communication link 1532a. Similarly, servers 1522b, 1522c directly communicate with the tier 1 switch 1526b through communication links 1532b, 1532c, respectively. Each communication link can include a pair of optical fibers to allow bi-directional communication. The system 1520 bypasses the conventional top-of-rack switch and can have the advantage of higher data throughput. The system 1520 includes a point-to-point connection between every server 1522 and every tier 1 switch 1526. In this example, there are 4 tier 1 switches 1526, and 4 fiber pairs are used per server 1522 for communicating with the tier 1 switches 1526. Each tier-1 switch 1526 is connected to N servers, so there are N fiber pairs connected to each tier-1 switch 1526.

Figure 19:
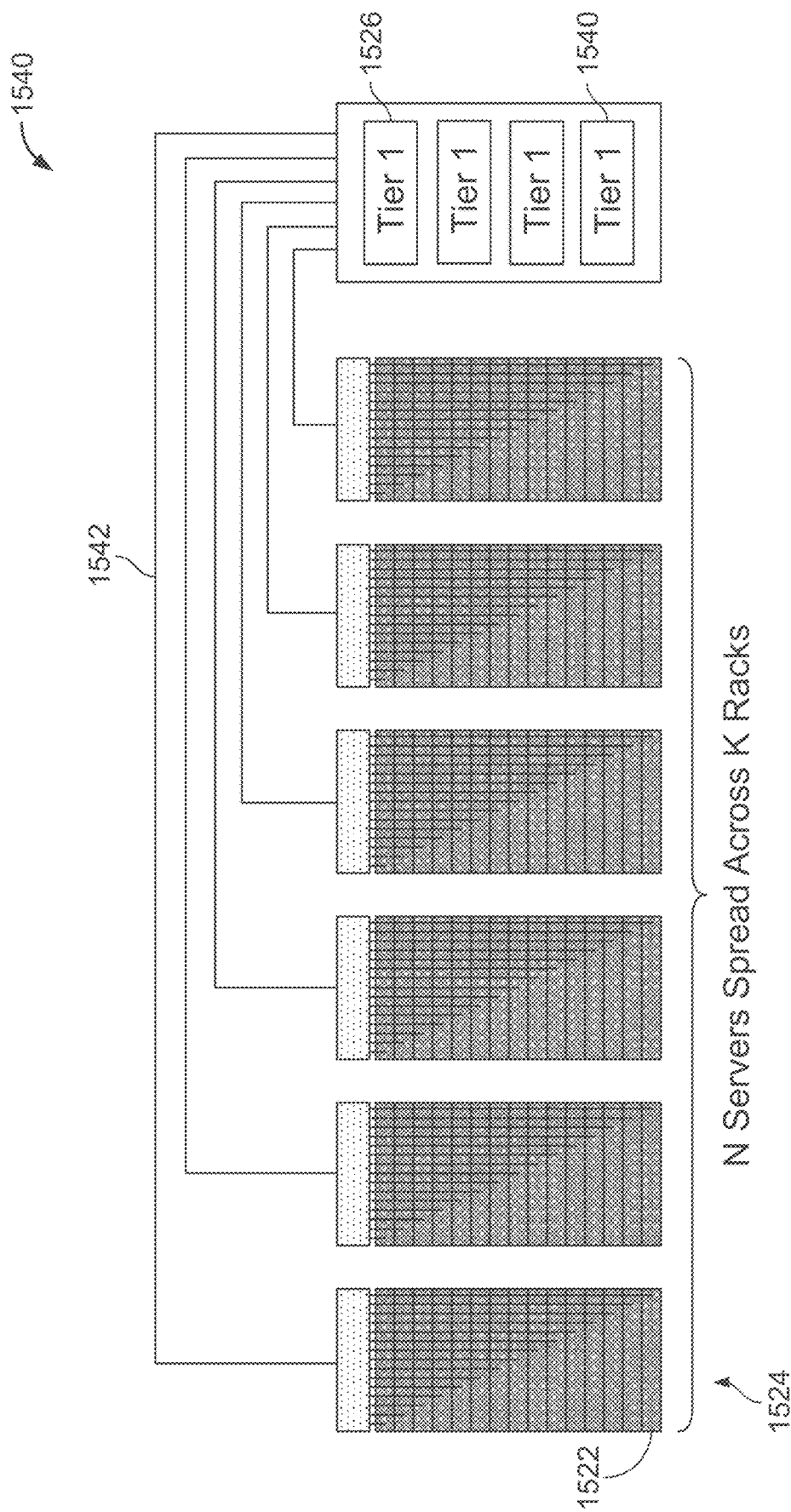

Referring to FIG. 19, in some implementations, a data processing system (e.g., data center) 1540 includes tier-1 switches 1526 that are co-located in a rack 1540 separate from the N servers 1522 that are spread across K racks 1524. Each server 1522 has a direct link to each of the tier-1 switches 1526. In some implementations, there is one fiber cable 1542 (or a small number<<N/K of fiber cables) from the tier-1 switch rack 1540 to each of the K server racks 1524.

Figure 20A:
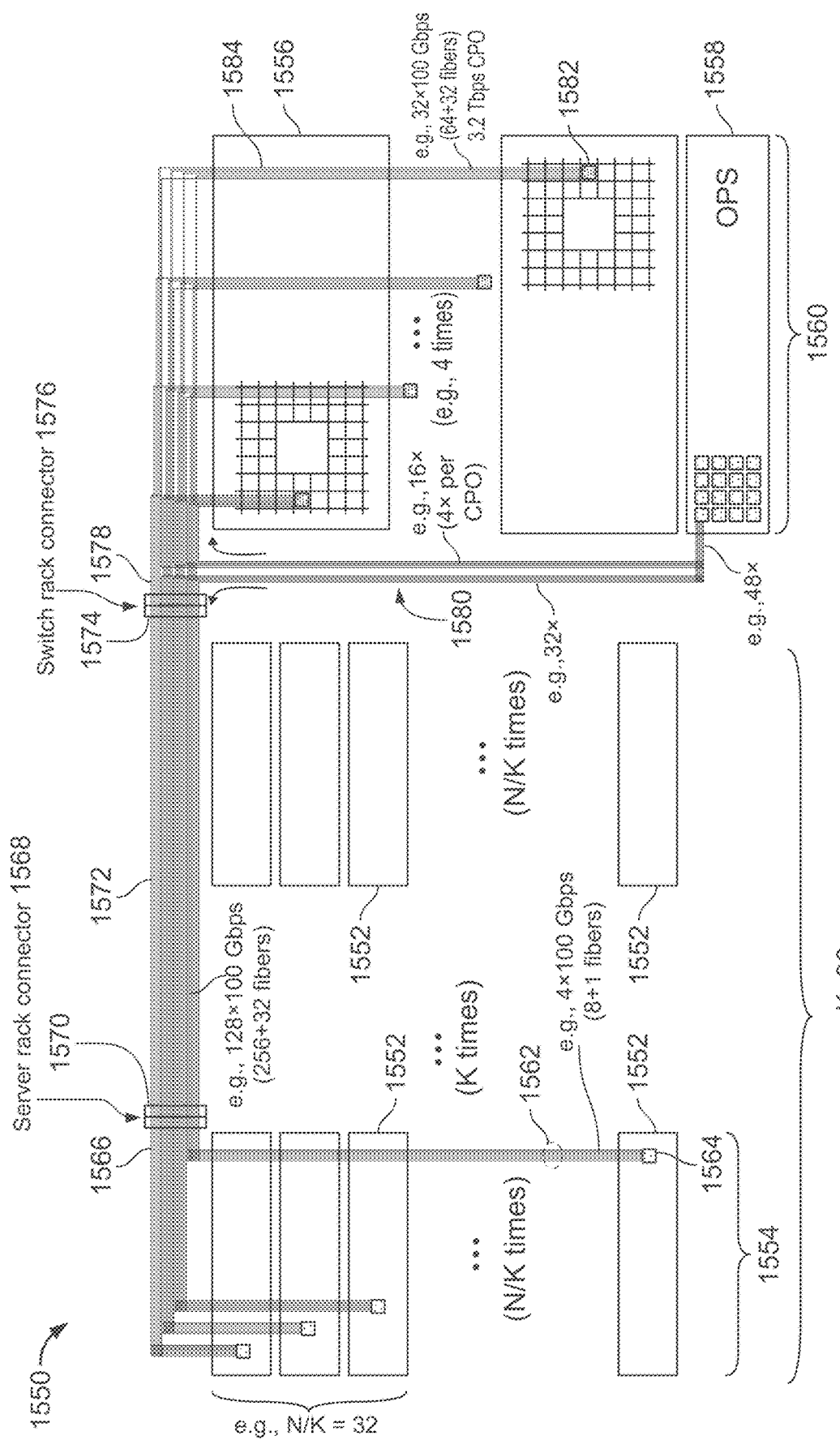

FIG. 20A is a diagram of an example of a data processing system 1550 that includes N=1024 servers 1552 spread across K=32 racks 1554, in which each rack 1554 includes N/K=1024/32=32 servers 1552. There are 4 tier-1 switches 1556 and an optical power supply 1558 that is co-located in a rack 1560.

Optical fibers connect the servers 1552 to the tier-1 switches 1556 and the optical power supply 1558. In this example, a bundle of 9 optical fibers is optically coupled to a co-packaged optical module 1564 of a server 1552, in which 1 optical fiber provides the optical power supply light, and 4 pairs of (a total of 8) optical fibers provide 4 bi-directional communication channels, each channel having a 100 Gbps bandwidth, for a total of 4×100 Gbps bandwidth in each direction. Because there are 32 servers 1552 in each rack 1554, there are a total of 256+32=288 optical fibers that extend from each rack 1554 of servers 1552, in which 32 optical fibers provide the optical power supply light, and 256 optical fibers provide 128 bi-directional communication channels, each channel having a 100 Gbps bandwidth.

For example, at the server rack side, optical fibers 1566 (that are connected to the servers 1552 of a rack 1554) terminate at a server rack connector 1568. At the switch rack side, optical fibers 1578 (that are connected to the switch boxes 1556 and the optical power supply 1558) terminate at a switch rack connector 1576. An optical fiber extension cable 1572 is optically coupled to the server rack side and the switch rack side. The optical fiber extension cable 1572 includes 256+32=288 optical fibers. The optical fiber extension cable 1572 includes a first optical fiber connector 1570 and a second optical fiber connector 1574. The first optical fiber connector 1570 is connected to the server rack connector 1568, and the second optical fiber connector 1574 is connected to the switch rack connector 1576. At the switch rack side, the optical fibers 1578 include 288 optical fibers, of which 32 optical fibers 1580 are optically coupled to the optical power supply 1558. The 256 optical fibers that carry 128 bi-directional communication channels (each channel having a 100 Gbps bandwidth in each direction) are separated into four groups of 64 optical fibers, in which each group of 64 optical fibers is optically coupled to a co-packaged optical module 1582 in one of the switch boxes 1556. The co-packaged optical module 1582 is configured to have a bandwidth of 32×100 Gbps=3.2 Tbps in each direction (input and output). Each switch box 1556 is connected to each server 1552 of the rack 1554 through a pair of optical fibers that carry a bandwidth of 100 Gbps in each direction.

The optical power supply 1558 provides optical power supply light to co-packaged optical modules 1582 at the switch boxes 1556. In this example, the optical power supply 1558 provides optical power supply light through 4 optical fibers to each co-packaged optical module 1582, so that a total of 16 optical fibers are used to provide the optical power supply light to the 4 switch boxes 1556. A bundle of optical fibers 1584 is optically coupled to the co-packaged optical module 1582 of the switch box 1556. The bundle of optical fibers 1584 includes 64+16=80 fibers. In some examples, the optical power supply 1558 can provide additional optical power supply light to the co-packaged optical module 1582 using additional optical fibers. For example, the optical power supply 1558 can provide optical power supply light to the co-packaged optical module 1582 using 32 optical fibers with built-in redundancy.

Figure 20B:
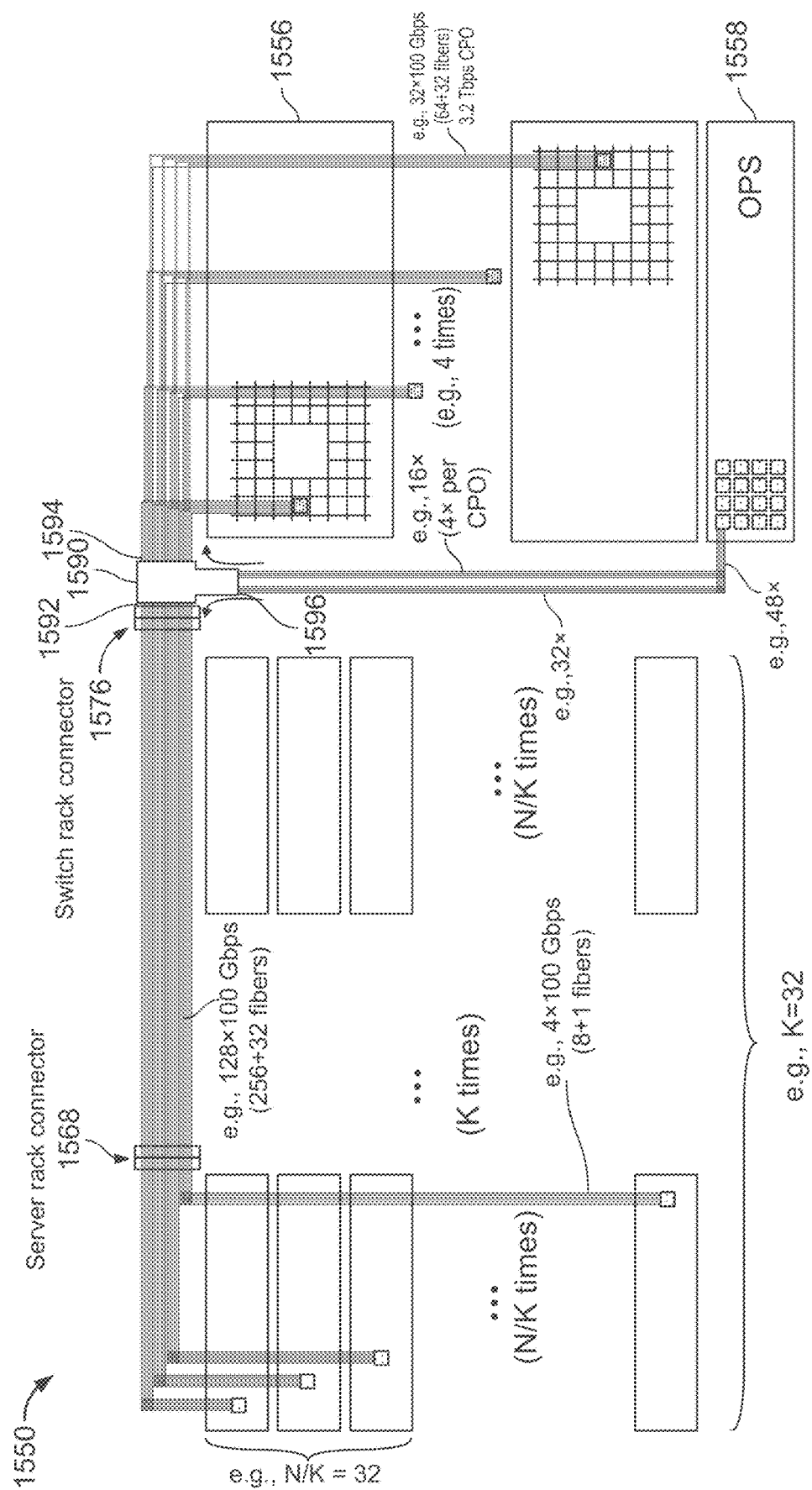

Referring to FIG. 20B, the data processing system 1550 includes an optical fiber guide module 1590 that helps organize the optical fibers so that they are directed to the appropriate directions. The optical fiber guide module 1590 also restricts bending of the optical fibers to be within the specified limits to prevent excess optical light loss or damage to the optical fibers. The optical fiber guide module 1590 includes a first port 1592, a second port 1594, and a third port 1596. The optical fibers that extend outward from the first port 1592 are optically coupled to the switch rack connector 1576. The optical fibers that extend outward from the second port 1594 are optically coupled to the switch boxes. The optical fibers that extend outward from the third port 1596 are optically coupled to the optical power supply 1558.

In some implementations, each of the optical power supply or external photon supply 902 of FIG. 9, 1012 of FIG. 10, 1106 of FIG. 11, 1208, 1212 of FIG. 12, 1322, 1330 of FIG. 13A, 1382 of FIG. 14,1322 of FIG. 15A, 1446 of FIG. 16, 1322 of FIG. 17A, and 1558 of FIGS. 20A and 20B can have a configuration similar to any one of the optical power supplies shown in FIGS. 2 and 4A to 4F. In some implementations, each of the optical fibers 914 and 916 of FIG. 9, 1014, 1016a, 1016b, 1016c of FIGS. 10, 1210 and 1214 of FIGS. 12, 1384 and 1386 of FIG. 14, 1394 of FIG. 15A, 1448, 1450, 1452, 1454 of FIGS. 16, and 1580 of FIG. 20A that is optically coupled to the optical power supply can include one or more sections of non-polarization-maintaining optical fiber. Light supplied by optical power supply module may experience random polarization rotation upon propagation through the optical fiber.

In some implementations, each of the co-packaged optical interconnect modules 910 of FIGS. 9 to 11, the communication transponders 1202 and 1204 of FIG. 12, the co-packaged optical modules 1312 and 1316 of FIG. 13A, the communication transponders 1282 and 1284 of FIG. 14, the co-packaged optical modules 1312 and 1316 of FIG. 15A, the communication transponders 1432, 1434, 1436, and 1438 of FIG. 16, the co-packaged optical modules 1312, 1472, 1474, and 1476 of FIG. 17A, the co-packaged optical module 1564 and 1582 of FIG. 20A, can have one or more optical transmit modules similar to the optical transmit module 504 of FIG. 5 or 600 of FIG. 6.

Remote or external optical power supplies, e.g., laser sources that provide light (continuous wave or pulsed) to a transmitter module via an exposed optical fiber, represent an eye safety risk. If the optical power supply fiber breaks, servicing technicians may be exposed to unacceptably high optical power levels, e.g., as standardized by IEC 60825-1. To mitigate the eye safety risk to service technicians, the system can be designed to keep power levels within eye-safe limits. Because every transmitter-to-receiver (TX→RX) link fed by the power supply requires a certain minimum optical supply power to properly operate, keeping supply power levels low results in the need for a large number of optical supply fibers, in the worst case one supply fiber per TX modulator. From a system design point of view, it is desirable to minimize the number of optical power supply fibers feeding a single switch box or a single CPO module. Thus, it is preferable to increase the optical power per supply fiber as much as possible, possibly beyond applicable eye-safety limits. The high optical power fed from the optical power supply to the remote transponder module is then split into N paths at or near the transponder module, and each split path supplies an individual transmit modulator. Increasing the aggregate optical supply power allows feeding as many transmit modulators as possible. In some implementations, active system monitoring/control schemes are implemented that quickly reduce the optical power feeding a power supply link whenever that link is broken, e.g., due to disconnected connectors or broken fibers.

In some examples, a system can monitor fiber breaks or other disruptions of optical paths by monitoring the optical power received on the far-side of the laser source and inform the laser source via a control feedback path of a potential fiber break so the laser source can be shut down to prevent eye injuries. In some examples, dedicated optical fiber strands are used to check for continuity. These techniques may (a) require extra optical power (which goes against the desire to design a power-efficient link) and/or (b) will only detect entire cable breaks, but will not detect a break of just the optical supply fiber strand within a cable. Further, if multiple power supply fibers are being used, it is desirable to only power down those lasers that are feeding the actually broken fiber strand(s), and not the entire cable or system, which allows for continued partial operation of the unaffected portion of the system.

Figure 21:
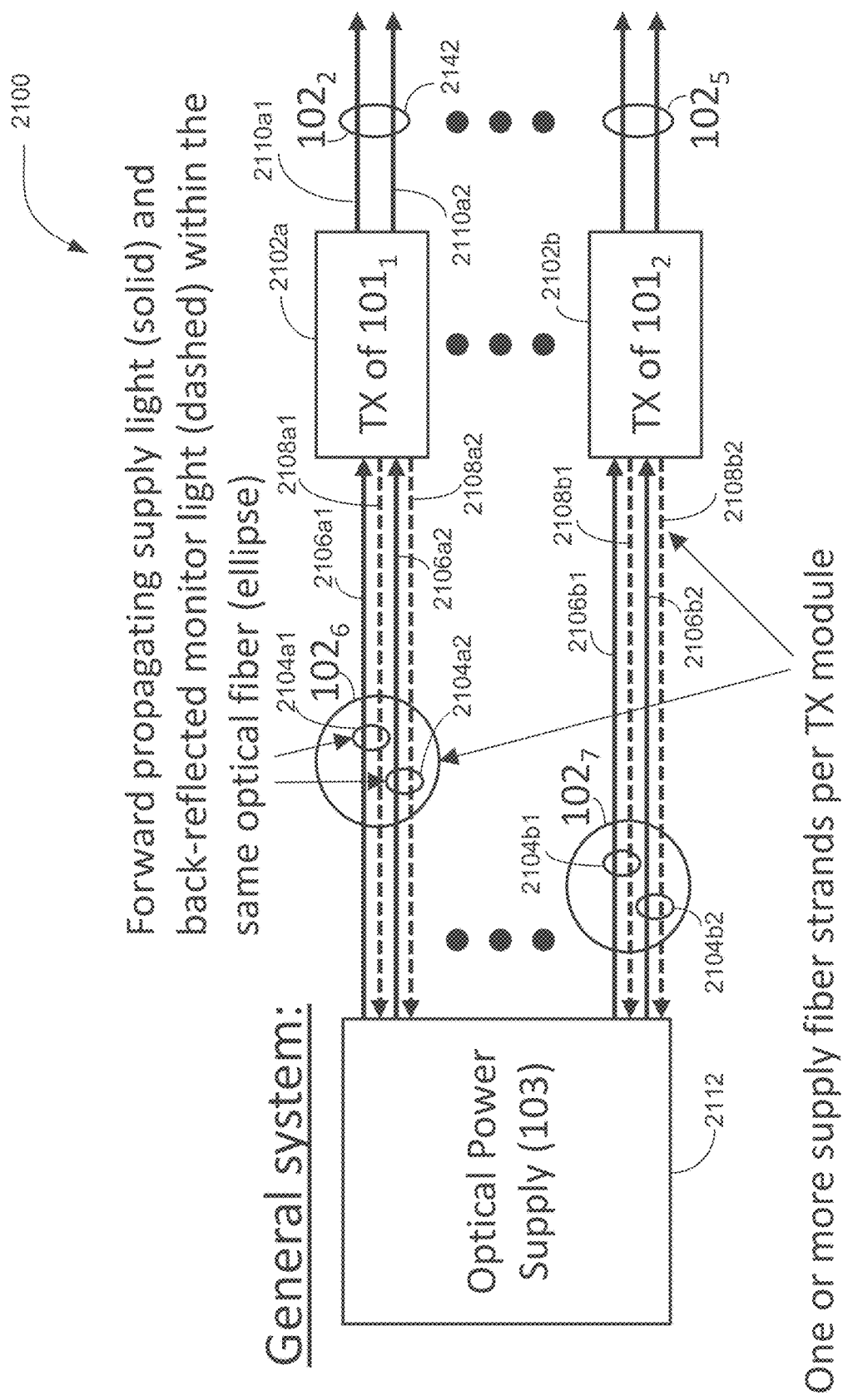
FIG. 21 is a diagram of an example of a system that includes an optical power supply that transmits power supply light (with or without monitor light at a different wavelength) to transponder modules.

Referring to FIG. 21, in some implementations, a system 2100 includes an optical power supply 2112 that transmits power supply light (with or without monitor light at a different wavelength) to transponder modules, e.g., 2102a and 2012b (collectively referenced as 2102), which can be part of nodes, e.g., 101$_1$ and 101$_2$, respectively, through optical fibers, and monitors returned light (e.g., reflected or redirected light, either with or without modulation) in the same optical fibers to evaluate the conditions of the optical fibers, such as whether one or more of the optical fibers are broken. If the optical power supply 2112 determines that a particular optical fiber is broken, the optical power supply quickly reduces the level of the power supply light or shuts off the power supply light sent to the particular optical fiber to prevent harm to technicians operating or maintaining the system 2100.

For example, the optical power supply 2112 transmits power supply light (with or without additional monitor light at a different wavelength) to the transponder module 2102a through an optical link 102$_6$, which can include one or more optical fibers or fiber strands, such as optical fibers 2104a1 and 2104a2 (collectively referenced as 2104a). The optical power supply 2112 transmits power supply light (with or without the additional monitor light at the different wavelength) to the transponder module 2102b through an optical link 1027, which can include one or more optical fibers or fiber strands, such as optical fibers 2104b1 and 2104b2 (collectively referenced as 2104b). The optical power supply 2112 uses reflected or redirected light, either with or without modulation, in the optical links $102_6$ and $102_7$ to evaluate the condition of the optical fibers in the optical links $102_6$ and $102_7$.

For example, the optical power supply 2112 transmits forward propagating power supply light 2106a1 (shown in a solid line) through the optical fiber 2104a1 to the transponder module 2102a, and a portion of the power supply light is reflected or redirected back to become back-reflected light 2108a1 (shown in a dashed line). The optical power supply 2112 monitors the back-reflected light) 2108a1, and lowers or shuts off the forward propagating power supply light 2106a1 if there is an indication that the optical fiber 2104a1 is broken. The transponder module 2102a modulates the power supply light received from the optical fiber 2104a1 and transmits modulated light on an optical fiber 2110a1, which can be part of the optical link 1022.

For example, the optical power supply 2112 transmits forward propagating power supply light 2106a2 (shown in a solid line) through the optical fiber 2104a2 to the transponder module 2102a, and a portion of the power supply light is reflected back to become back-reflected light 2108a2 (shown in a dashed line). The optical power supply 2112 monitors the back-reflected light 2108a2, and lowers or shuts off the forward propagating power supply light 2106a2 if there is an indication that the optical fiber 2104a2 is broken. The transponder module 2102a modulates the power supply light received from the optical fiber 2104a2 and transmits modulated light on an optical fiber 2110a2, which can be part of the optical link 1022.

In this example, two optical power supply fibers 2104a1 and 2104a2 provide optical power to the transponder module 2102a. Each optical power supply fiber 2104a1 or 2104a2 is monitored individually so that if one of the optical power supply fibers breaks, the other optical power supply fiber can continue to transmit optical power to the transponder module 2102a. The same principle applies when the optical link $102_6$ includes three or more optical power supply fibers or fiber strands.

In this example, reflected light is monitored to evaluate the condition of the optical power supply fiber. In some examples, the light can be redirected back to the optical fiber, and not necessarily reflected back to the optical fiber. See the example of FIG. 27, in which a transponder module includes an optical splitter that sends one of the output signals to an optical circulator that directs the output signal back to the power supply optical fiber, in which the transponder does not use a reflecting surface to reflect the forward propagating light from the optical fiber.

In a similar manner, the optical power supply 2112 transmits forward propagating power supply light 2106b1 through the optical fiber 2104b1 to the transponder module 2102b, monitors back-reflected light 2108b1, and lowers or shuts off the forward propagating power supply light 2106b1 if there is an indication that the optical fiber 2104b1 is broken. The optical power supply 2112 transmits forward propagating power supply light 2106b2 to the transponder module 2102b, monitors the back-reflected light 2108b2, and lowers or shuts off the forward propagating power supply light 2106b2 if there is an indication that the optical fiber 2104b2 is broken. The transponder module 2102b modulates the received power supply light and transmits modulated light on optical fibers in the optical link 1025.

For example, the optical power supply 2112 and the optical links $102_2$, $102_5$, $102_6$, and $102_7$ in FIG. 21 can be used as the optical power supply 103 and the optical links $102_2$, $102_5$, $102_6$, and $102_7$, respectively, in FIG. 1. The transponder modules 2102 in FIG. 21 can be part of the nodes such as $101_1$, $101_2$ in FIG. 1.

In some implementations, the optical power supply 2112 uses light reflected directly from within the CPO module back to the laser source as an indicator for fiber continuity. If the reflected light is above a certain threshold, the exact fiber strand that transports the supply light is deemed intact. The threshold is determined such that unwanted reflections from connectors or Fresnel reflections from a broken fiber will not provide enough reflected power to cross the threshold. As soon as no or not enough reflected light is detected at the laser source, the corresponding laser is shut down.

The technique of monitoring reflected or redirected light to evaluate whether the fiber is intact or broken can be used in any system that transmits optical power from an optical power supply to a transmitter module through a medium, such as an optical fiber. For example, this technique can be used in the systems described in U.S. patent application Ser. No. 16/816,171, filed on Mar. 11, 2020, PCT patent application PCT/US2021/021953, filed on Mar. 11, 2021, U.S. patent application 16/822,103, filed on Mar. 18, 2020, PCT patent application PCT/US2021/022730, filed on Mar. 17, 2021, U.S. patent application Ser. No. 16/847,705, filed on Apr. 14, 2020, U.S. patent application Ser. No. 17/375,361, filed on Jul. 14, 2021, PCT application PCT/US2021/027306, filed on Apr. 14, 2021, U.S. patent application Ser. No. 16/888,890, filed on Jun. 1, 2020, PCT application PCT/US2021/035179, filed on Jun. 1, 2021, and U.S. provisional patent application 63/017,211, filed on Apr. 29, 2020. The entire contents of the above applications are herein incorporated by reference.

For example, U.S. patent application Ser. No. 16/847,705, filed on Apr. 14, 2020, U.S. patent application Ser. No. 17/375,361, filed on Jul. 14, 2021, and PCT application PCT/US2021/027306, filed on Apr. 14, 2021 describe various examples of optical communication systems that include optical communication devices and optical power supplies each configured to generate a sequence of optical frame templates directed to one or more optical communication devices. The optical communication device can use the received optical frame templates as a light source for generating data-loaded optical frames and/or can extract from the optical frame templates control information encoded in the optical frame templates using one or more headers of the optical frame templates.

Figure 22A:
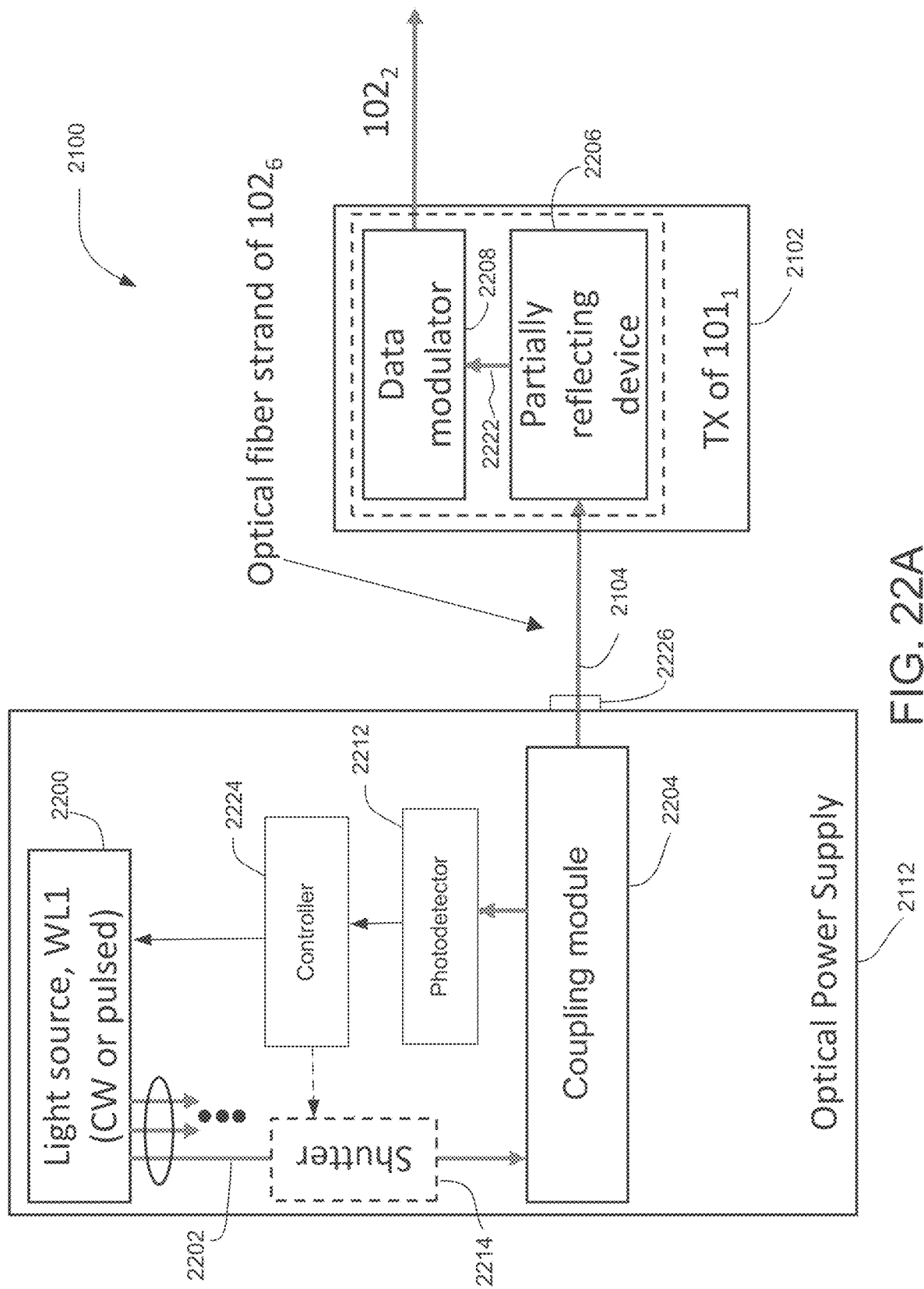
FIGS. 22A and 22B are diagrams of examples of optical power supplies and transponder modules.

Referring to FIG. 22A in some implementations, the optical power supply 2112 includes a high-power power supply light source 2200 that generates power supply light 2202 that can be or include, e.g., a continuous wave, optical pulses, or a sequence of optical frame templates in which each frame template can optionally include a header. In the normal operating mode (as shown in the upper diagram of FIG. 23), the power supply light source 2200 emits power supply light 2202 at wavelength WL1 that is transmitted to a coupling module 2204 that outputs the power supply light 2202 through an optical input/output port 2226 to a fiber strand, e.g., the power supply optical fiber 2104, of the optical link $102_6$. In some implementations, the optical power supply 2112 sends power supply light having the wavelength WL1 to a transponder module 2102 through the optical fiber 2104, the transponder module 2102 reflects a portion of the power supply light back to the optical input/output port 2226 of the optical power supply 2112 through the optical fiber 2104, and the optical power supply 2112 monitors the reflected power supply light having the wavelength WL1 to evaluate whether the optical fiber 2104 is intact or broken.

For example, the coupling module 2204 can be a directional coupler that transmits the power supply light 2202 at the wavelength WL1 received from the power supply light source 2200 to the optical fiber 2104, and transmits the reflected power supply light at the wavelength WL1 received from the optical fiber 2104 to a monitor photodetector 2212 that detects the level of the reflected power supply light. The output of the monitor photodetector 2212 is provided to a controller 2224 that includes electronic circuitry for performing threshold detection. For example, the controller 2224 can be implemented using an integrated circuit or discrete electronic components.

In some implementations, the transponder module 2102 includes a partially reflecting device 2206 and a data modulator 2208. The partially reflecting device 2206 transmits a first portion of the power supply light to the data modulator 2208 for data modulation and subsequent data transmission on the optical link $102_2$, and reflects a second portion of the power supply light (at wavelength WL1) back to the optical fiber 2104. In a normal operating mode, a substantial fraction of the light at the wavelength WL1 propagating from the optical power supply 2112 to the transponder module 2102 is reflected back towards the optical power supply 2112 within the same fiber 2104 by the partially reflecting device 2206. The partially reflecting device 2206 is configured such that the amount of reflected light is greater than the sum of all the light that can potentially be reflected by other sources of reflections ($P_{Si}$), such as at connectors (e.g., 2300 and 2302 in FIG. 23) that each optically couple two segments of the optical fiber.

In some examples, the partially reflecting device 2206 can be a native part of the data modulator, see the examples shown in FIGS. 27A to 27D for details. The directional coupler 2204 in the optical power supply 2112 directs the reflected light towards the monitor photodetector 2212 to perform threshold detection. If the reflected light is below a certain threshold, which indicates there is a break in the optical fiber 2104 as shown in the lower diagram of FIG. 23, the controller 2224 substantially reduces or shuts off the power supply light output from the optical power supply 2112. This can be achieved by, e.g., substantially reducing or turning off one or more supply currents to the power supply light source 2200, or activating an optical shutter/attenuator mechanism 2214 to substantially reduce or block the power supply light that reaches the directional coupler 2204.

In some examples, the optical power can be split into multiple paths, each having their own shutter/attenuator, coupling module, and supply fiber. This allows the optical power supply 2112 to provide power supply light to multiple data modulators, and monitor the condition of the supply fibers using a fraction of the power supply light at the wavelength WL1.

Each power supply optical fiber corresponds to an input/output port. Thus, if the optical power supply provides power supply light to N power supply optical fibers, there are N input/output ports that correspond to the N power supply optical fibers. In the example in which reflected power supply light is used to monitor the condition of the optical fiber, the power supply light is transmitted through the input/output port to the corresponding power supply optical fiber, and the reflected power supply light is transmitted back through the same power supply optical fiber and the corresponding input/output port to the optical power supply. In the example in which reflected monitor light is used to monitor the condition of the optical fiber, the combined light including power supply light and monitor light is transmitted through the input/output port to the corresponding power supply optical fiber, and the reflected monitor light is transmitted back through the same power supply optical fiber and the corresponding input/output port to the optical power supply.

The threshold for the reflective light is set such that spurious reflections from optical connectors (e.g., 2300 and 2302 in FIG. 23) that are used to connect multiple segments of the optical fiber 2104, or Fresnel reflections from a fiber break on the optical fiber 2104, will not be able to produce enough reflected light to cross the threshold, i.e., the light power $P_R$ reflected by the partially reflecting surface 2206 in normal operation is substantially larger than the sum of all the light potentially reflected by other sources of reflections ($P_{Si}$).

In some implementations, the partially reflecting surface 2206 is placed at a location within the transponder module 2102 such that no failure downstream of the partially reflecting device 2206 can expose harmful optical radiation to humans in normal operation mode. The "normal operation mode" here includes, e.g., connecting or disconnecting CPO modules to substrates, circuit boards, or optical fibers. For example, the link 2222 between the partially reflecting device 2206 and the data modulator 2208 is designed such that the link 2222 is not exposed to humans in normal operation mode. For example, the link 2222 can be optically shielded such that if the link 2222 breaks or becomes loosened from the partially reflecting device 2206 or the data modulator 2208, harmful optical radiation, if any, will be blocked by the optical shield. For example, the data modulator 2208, the partially reflecting device 2206, and the link 2222 can be placed in a housing that includes panels that are held together by screws. A warning label can be placed on the exterior of the housing to warn of potential exposure to harmful radiation if the housing is opened. In some implementations, warning labels are provided at locations in the system 2100 to warn of potential exposure to harmful radiation if certain modules are opened or taken apart.

Figure 22B:
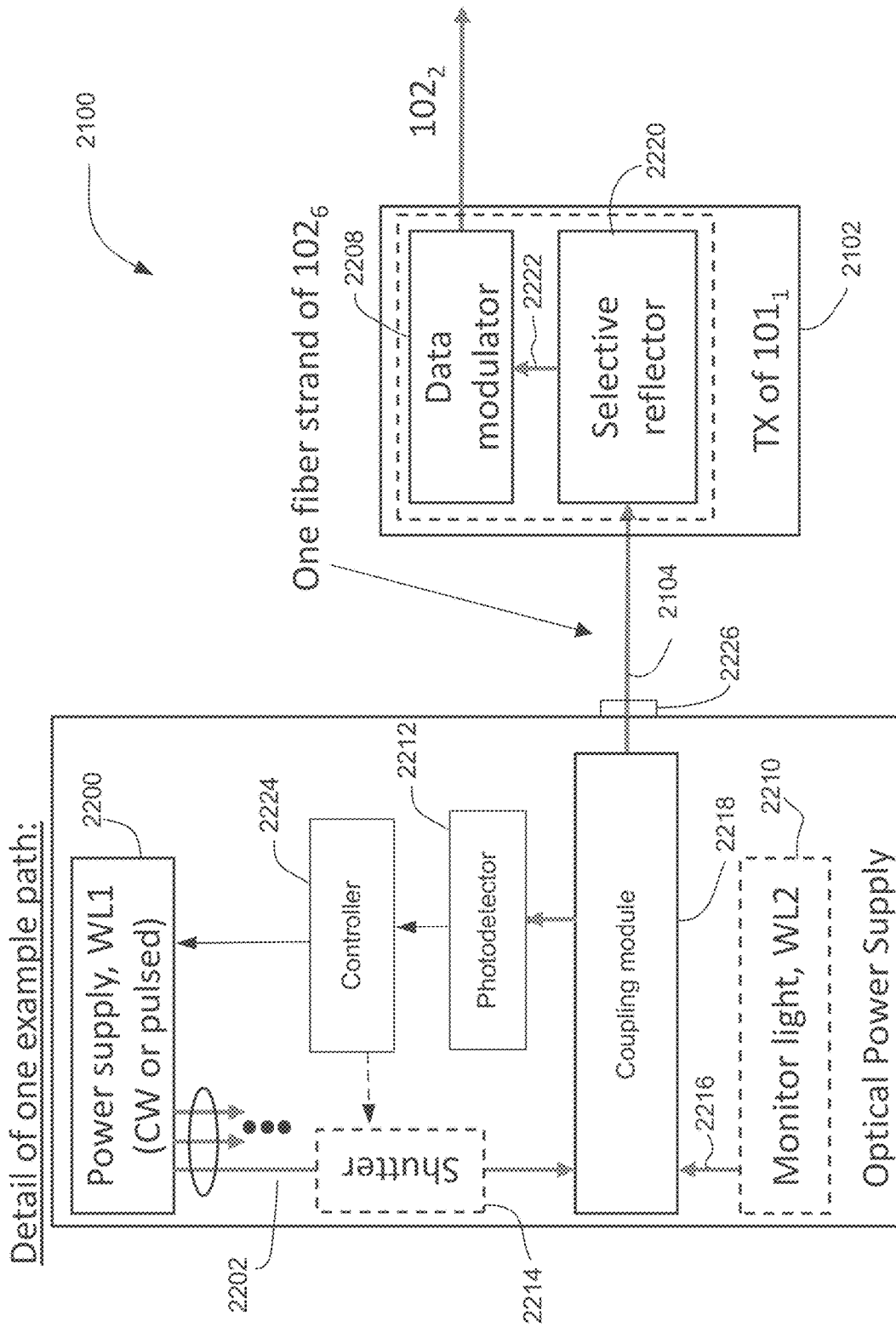

Referring to FIG. 22B, in some implementations, the power supply module 2112 monitors the reflected monitor light having the wavelength WL2 to evaluate whether the optical fiber 2104 is intact or broken. The optical power supply 2112 includes a monitor light source 2210 that generates monitor light 2216 having wavelength WL2. A coupling module 2218 combines the power supply light 2202 at the wavelength WL1 with the monitor light 2216 at the wavelength WL2 to generate combined light that is transmitted to the transponder module 2102 through an optical input/output port 2226 and the optical fiber 2104.

The transponder module 2102a includes a selective reflector 2220 and a data modulator 2208. The selective reflector 2220 is designed such that substantially all light (e.g., with less than 0.1 dB or less than 0.5 dB or less than 1 dB or less than 3 dB loss) at the wavelength WL1 passes through the selective reflector 2220 to the data modulator 2208 for data modulation and subsequent data transmission on the link $102_2$. In normal operating mode, substantially all (or a substantial fraction) of the monitor light at the wavelength WL2 is reflected back towards the optical input/output port 2226 of the optical power supply 2112 through the same fiber by the selective reflector 2220. The selective reflector 2220 is configured such that the amount of reflected light at the wavelength WL2 is greater than the sum of all the light that can potentially be reflected by other sources of reflections ($P_{Si}$), such as at connectors (e.g., 2300 and 2302 in FIG. 23) that each optically couple two segments of the optical fiber.

The coupling module 2218 sends the reflected monitor light at the wavelength WL2 to the monitor photodetector 2212 to perform threshold detection. If the reflected light at the wavelength WL2 is below a certain threshold, which indicates there is a break in the optical fiber 2104 as shown in the lower diagram of FIG. 23, the controller 2224 substantially reduces or shuts off the power supply light output at the wavelength WL1 from the optical power supply 2112. This can be achieved by, e.g., substantially reducing or turning off one or more supply currents to the power supply light source 2200, or activating an optical shutter/attenuator mechanism 2214 to substantially reduce or block the power supply light that reaches the coupling module 2218. In some examples, the optical power can be split into multiple paths, each having their own shutter/attenuator, wavelength coupling module, and supply fiber. This allows the optical power supply 2112 to provide power supply light to multiple data modulators, and monitor the condition of the supply fibers using the monitor light at the wavelength WL2.

The threshold for the reflective light at the wavelength WL2 is set such that spurious reflections from optical connectors (e.g., 2300 and 2302 in FIG. 23) that can be part of the optical fiber 2104 or Fresnel reflections from a fiber break on the optical fiber 2104 will not be able to produce enough reflected light at the wavelength WL2 to cross the threshold, i.e., the light power $P_R$ reflected by the partially reflecting surface 2206 in normal operation is substantially larger than the sum of all the light potentially reflected by other sources of reflections ($P_{Si}$). In some implementations, the selective reflector 2220 is placed at a location within the transponder module 2102 such that no failure downstream of the selective reflector 2220 can expose harmful optical radiation to humans in normal operation mode. For example, the link 2222 between the selective reflector 2220 and the data modulator 2208 is designed such that the link 2222 is not exposed to humans in normal operation mode. For example, the link 2222 can be optically shielded such that if the link 2222 breaks or becomes loosened from the selective reflector 2220 or the data modulator 2208, harmful optical radiation, if any, will be blocked by the optical shield. For example, the data modulator 2208, the selective reflector 2220, and the link 2222 can be placed in a housing that includes panels that are held together by screws. A warning label can be placed on the exterior of the housing to warn of potential exposure to harmful radiation if the housing is opened. In some implementations, warning labels are provided at locations in the system 2100 to warn of potential exposure to harmful radiation if certain modules are opened or taken apart.

Figure 23:
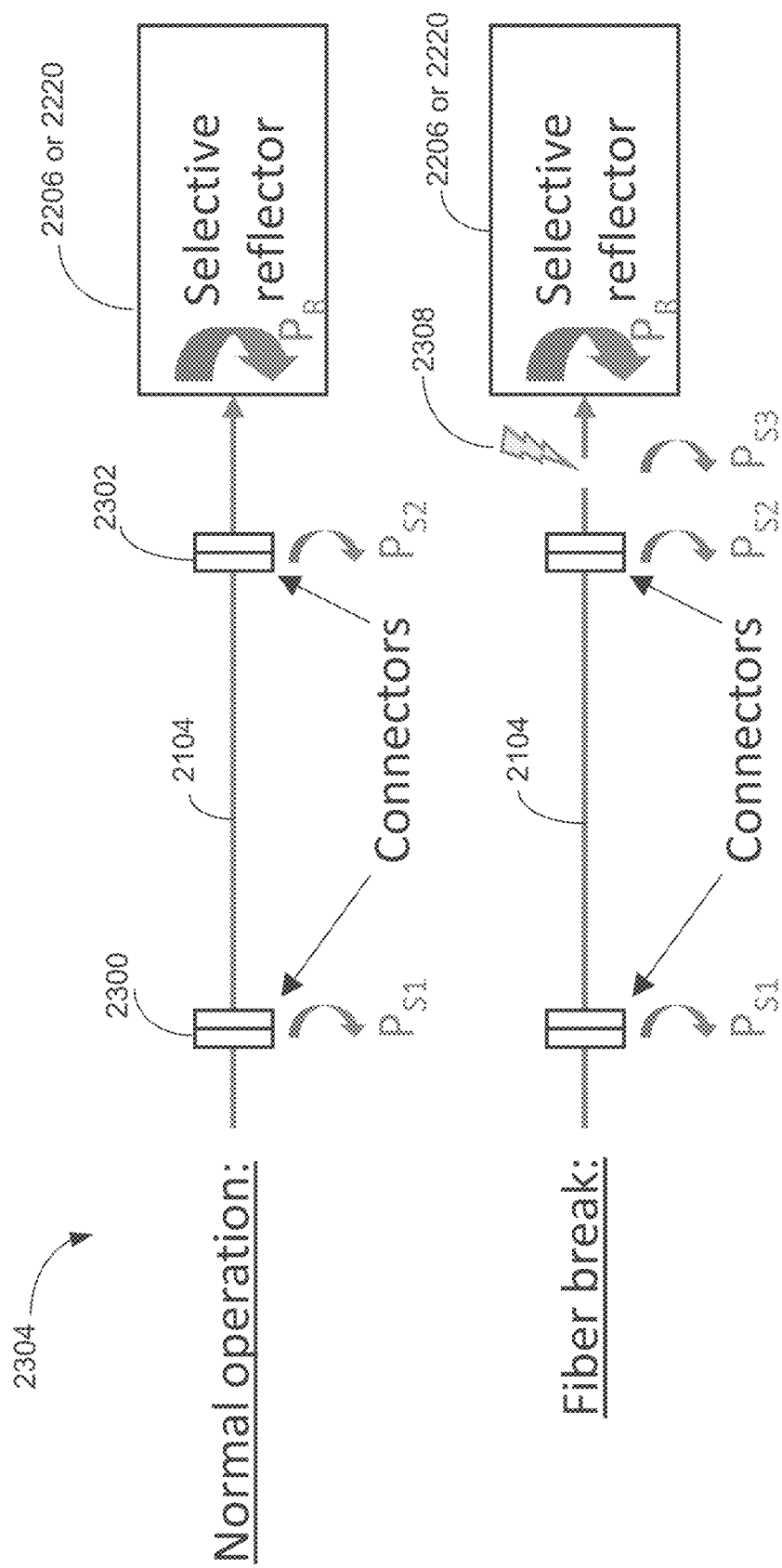
FIG. 23 is a diagram of examples conditions of an optical fiber optically coupled between an optical power supply and a transponder module.

FIG. 23 shows in an upper diagram 2304 an example of normal operation of the system in which the optical fiber 2104 is intact without breakage. The optical fiber 2104 includes two fiber connectors 2300 and 2302 that optically couple three segments of the optical fiber 2104. The fiber connector 2300 reflects a portion of the light that is directed towards the fiber connector 2300, in which the reflected light is represented by $P_{S1}$. The fiber connector 2302 reflects a portion of the light that is directed at the fiber connector 2302, in which the reflected light is represented by $P_{S2}$. A lower diagram 2306 of FIG. 23 shows an example in which a segment of the optical fiber 2104 is broken 2308, and the reflected light due to the Fresnel reflection from the fiber break is represented by $P_{S3}$.

The partially reflecting device 2206 (FIG. 22A) is configured such that the amount of reflected light at the wavelength WL1, represented by $P_R$, is greater than the sum of all the light at the wavelength WL1 that can potentially be reflected by other sources of reflections ($P_{Si}$), e.g., $P_R > (P_{S1} + P_{S2} + P_{S3})$. The selective reflector 2220 (FIG. 22B) is configured such that the amount of reflected light at the wavelength WL2, represented by $P_R$, is greater than the sum of all the light at the wavelength WL2 that can potentially be reflected by other sources of reflections ($P_{Si}$), e.g., $P_R > (P_{S1} + P_{S2} + P_{S3})$.

Figure 24A:
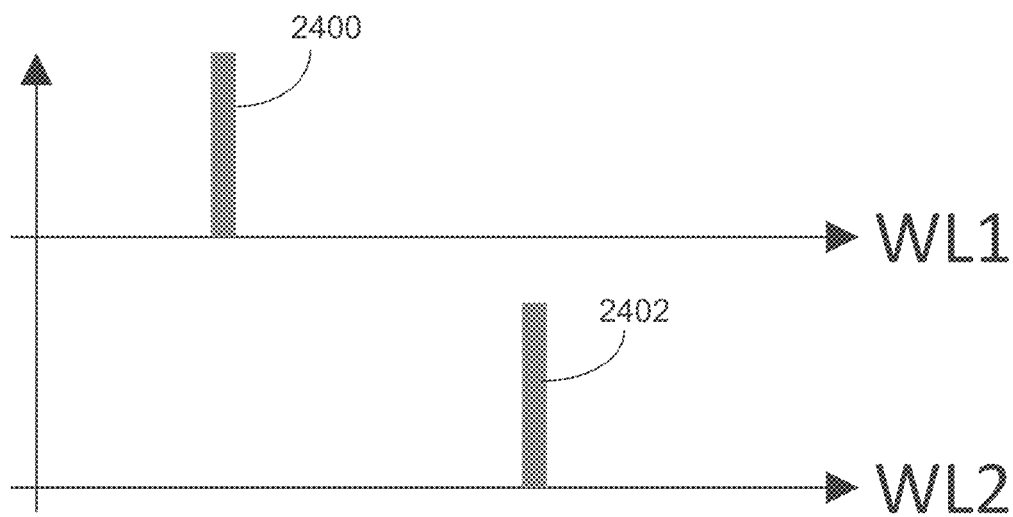
FIGS. 24A to 24C are graphs of examples of wavelength ranges of power supply light and monitor light.
Figure 24B:
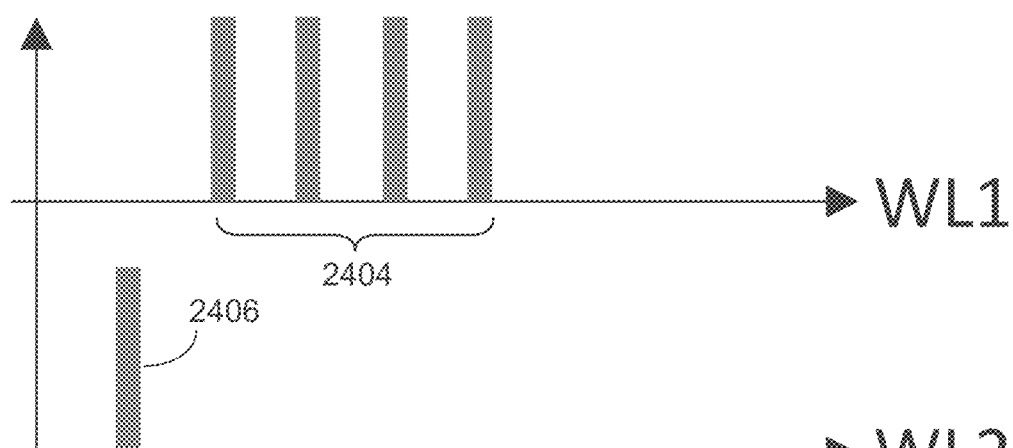
Figure 24C:
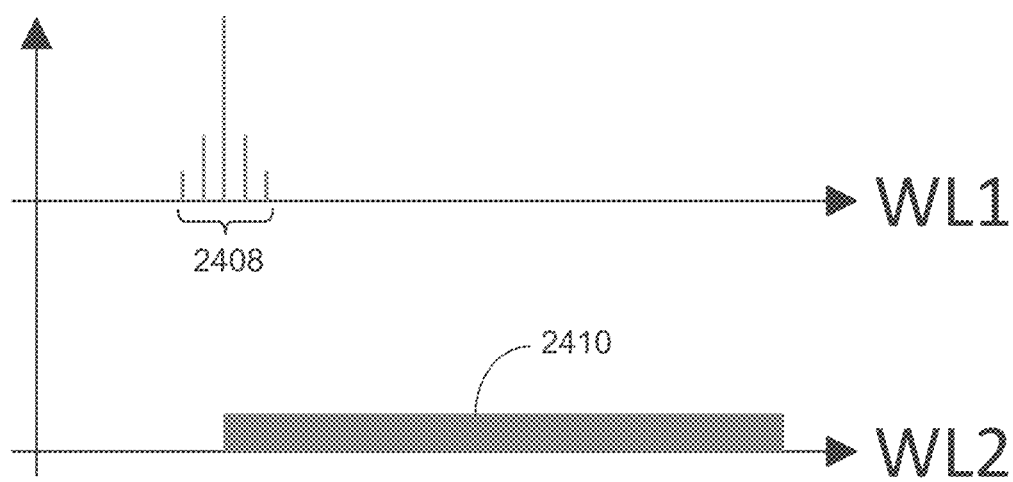

Referring to FIGS. 24A to 24C, in some implementations, the wavelength WL1 has a first set of one or more discrete wavelengths or wavelength ranges, and the wavelength WL2 has a second set of one or more discrete wavelengths or wavelength ranges. The wavelengths WL1 and WL2 need not be strictly frequency-disjoint as long as the majority of optical power is contained in disjoint frequency bands.

In the example of FIG. 24A, the wavelength WL1 has a first wavelength range 2400 and the wavelength WL2 has a second wavelength range 2402, in which the first wavelength range 2400 does not overlap the second wavelength range 2402. In the example of FIG. 24B, the wavelength WL1 has a first set of wavelength ranges 2404 and the wavelength WL2 has a second wavelength range 2406, in which the first set of wavelength ranges 2404 do not overlap the second wavelength range 2406. In the example of FIG. 24C, the wavelength WL1 has a first set of discrete wavelengths 2408 and the wavelength WL2 has a second wavelength range 2410. Some of the discrete wavelengths in the first set of discrete wavelengths 2408 overlap the second wavelength range 2410. However, the majority of optical power in the first set of discrete wavelengths 2408 and the majority of optical power in the second wavelength range 2410 are contained in disjoint frequency bands.

In some examples, at least 10% of optical power in the power supply light and at least 10% of optical power in the monitor light are contained in disjoint frequency bands. In some examples, at least 50% of optical power in the power supply light and at least 50% of optical power in the monitor light are contained in disjoint frequency bands. In some examples, at least 90% of optical power in the power supply light and at least 90% of optical power in the monitor light are contained in disjoint frequency bands.

In some examples, the selective reflector 2220 reflects a small portion of the power supply light at the wavelength WL1 back to the optical power supply 2112. The coupling module 2218 separates the reflected monitor light having the wavelength WL2 (which is the reflected monitor light) from the reflected light having the wavelength WL1 (which is the reflected power supply light), and sends the reflected monitor light having the wavelength WL2 to the monitor photodetector 2212 to perform threshold detection.

Figure 25A:
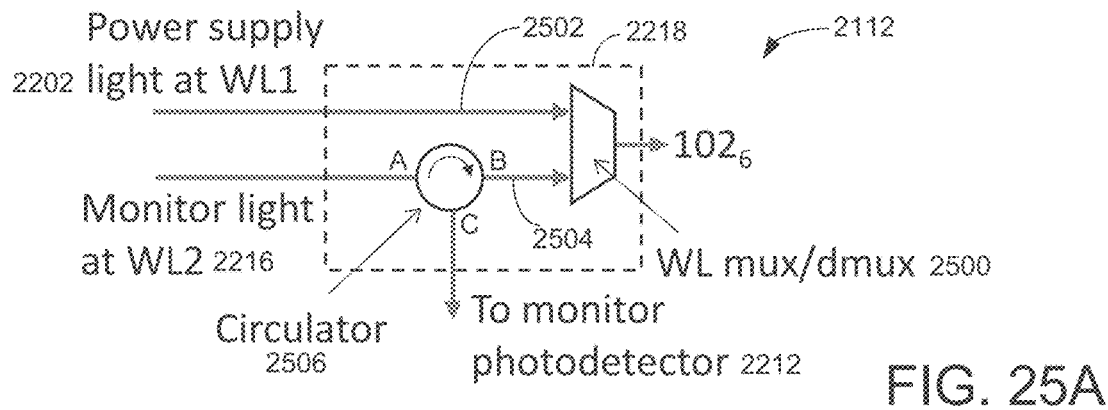
FIGS. 25A to 25D are diagrams of examples of coupling modules of optical power supplies.

The following describes various examples of the coupling module 2218 that combines the power supply light 2202 and the monitor light 2216. Referring to FIG. 25A, in some implementations, the coupling module 2218 of the optical power supply 2112 includes a wavelength multiplexer/demultiplexer 2500 that receives the power supply light 2202 (wavelength WL1) through a first optical fiber 2502, and receives the monitor light 2216 (wavelength WL2) through a second optical fiber 2504. An optical circulator 2506 including ports A, B, and C is coupled to the second optical fiber 2504. The optical circulator 2506 transmits the monitor light 2216 from port A to port B, which is optically coupled to the wavelength multiplexer/demultiplexer 2500. The wavelength multiplexer/demultiplexer 2500 multiplexes or combines the power supply light 2202 (wavelength WL1) with the monitor light 2216 (wavelength WL2) and sends the combined light to the optical link $102_6$, which is optically coupled to the transponder module 2102.

While FIGS. 25A to 25D show that the combined light is transmitted to the optical link $102_x$, in which x=6, k, or n, it is understood that the optical link $102_x$ can include one or more strands of optical fibers. If the combined light is transmitted to a particular optical fiber of the optical link $102_x$, the monitor light is reflected back in the same optical fiber, and the reflected monitor light is used to monitor the condition of that particular optical fiber.

The monitor light at the wavelength WL2 is reflected back to the wavelength multiplexer/demultiplexer 2500 through the same optical link $102_6$, or more specifically, the same optical fiber in the optical link $102_6$. The wavelength multiplexer/demultiplexer 2500 sends the reflected monitor light to the optical fiber 2504. The optical circulator 2410 transmits the reflected monitor light from port B to port C, which is optically coupled to the monitor photodetector 2212. The output of the monitor photodetector 2212 can be used to determine whether the optical fiber in the optical link $102_6$ is intact or broken. Using this design, the majority of the power supply light 2202 can be used for data modulation. It is not necessary to use a portion of the power supply light 2202 for the purpose of monitoring whether there is a breakage in the optical fiber of the optical link $102_6$.

Figure 25B:
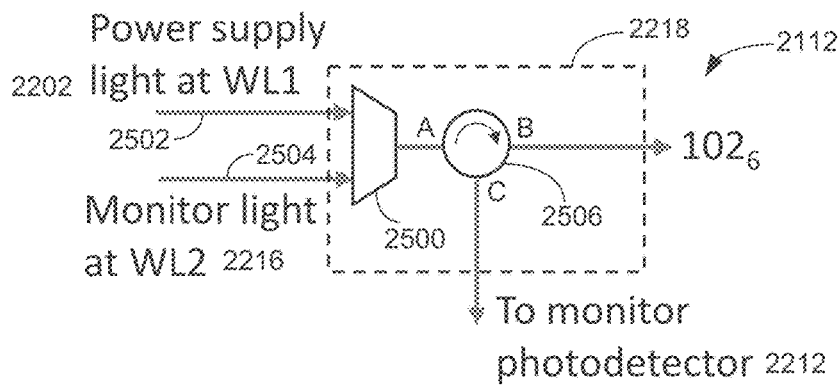

Referring to FIG. 25B, in some implementations, the coupling module 2218 of the optical power supply 2112 includes a wavelength multiplexer/demultiplexer 2500 that receives the power supply light 2202 (wavelength WL1) through a first optical fiber 2502, and receives the monitor light 2216 (wavelength WL2) through a second optical fiber 2504. The wavelength multiplexer/demultiplexer 2500 multiplexes or combines the power supply light 2202 (wavelength WL1) with the monitor light 2216 (wavelength WL2) and sends the combined light to port A of an optical circulator 2506 (which has ports A, B, and C). The optical circulator 2506 transfers the combined light from port A to port B, which is optically coupled to the optical link $102_6$.

In some implementations, the monitor light at the wavelength WL2 is reflected back to port B of the optical circulator 2506 through the same optical link $102_6$. The optical circulator 2506 sends the reflected monitor light from port B to port C, which is optically coupled to the monitor photodetector 2212. The output of the monitor photodetector 2212 can be used to determine whether the optical link $102_6$ is intact or broken. Using this design, the majority of the power supply light 2202 can be used for data modulation. It is not necessary to use a portion of the power supply light 2202 for the purpose of monitoring whether there is a breakage in the optical link $102_6$.

Figure 25C:
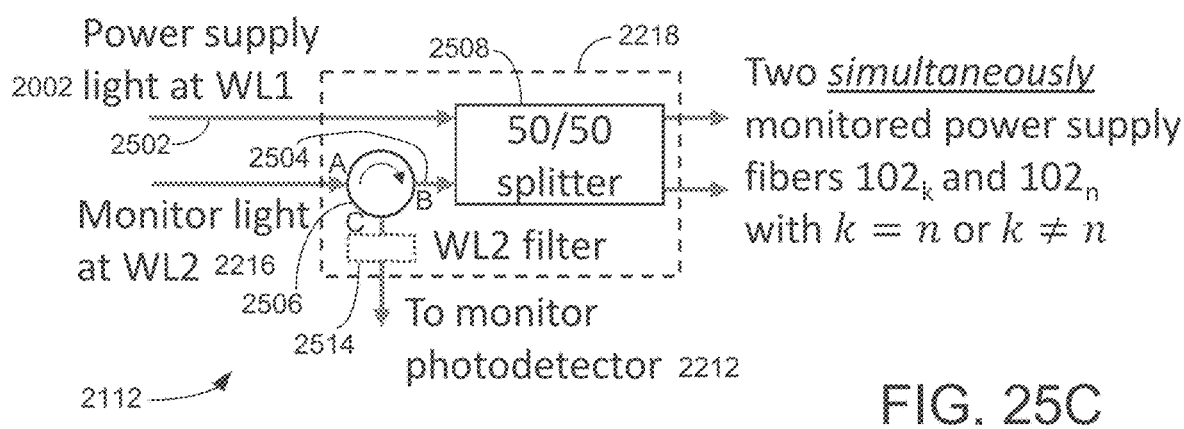

Referring to FIG. 25C, in some implementations, the coupling module 2218 of the optical power supply 2112 includes an optical 50/50 splitter 2508 that receives power supply light 2202 (wavelength WL1) from a first optical fiber 2502 and monitor light 2216 (wavelength WL2) from a second optical fiber 2504. An optical circulator 2506 including ports A, B, and C is coupled to the second optical fiber 2504. The optical circulator 2506 transfers the monitor light 2216 from port A to port B, which is optically coupled to the optical 50/50 splitter 2508. The optical 50/50 splitter 2508 sends half of the power supply light 2202 and half of the monitor light 2216 to a first optical link $102_k$, and sends the other half of the power supply light 2202 and the other half of the monitor light 2216 to a second optical link $102_n$, in which k=n or k≠n.

In the example of FIG. 25C, the optical 50/50 splitter is optically coupled to two optical links $102_k$ and $102_n$ through two optical input/output ports.

In some implementations, the first optical link $102_k$ transmits the first combined light to a first transponder module that modulates the power supply light (wavelength WL1) and reflects the monitor light (wavelength WL2) back to the first optical link $102_k$. The second optical link $102_n$ transmits the second combined light to a second transponder module that modulates the power supply light (wavelength WL1) and reflects the monitor light (wavelength WL2) back to the second optical link $102_n$. The optical 50/50 splitter 2508 sends half of the reflected monitor light from the first optical link $102_k$ and half of the reflected monitor light from the second optical link $102_n$ to port B of the optical circulator 2506, which sends the reflected monitor light to port C that is optically coupled to the monitor photodiode 2212. In some examples, an optical filter 2514 that allows light having the wavelength WL2 to pass is provided to remove light having the wavelength WL1 if in an optical band different from that of the wavelength WL2.

The output of the monitor photodetector 2212 is compared with a first threshold and the result of the comparison is used to monitor the conditions of both optical links $102_k$ and $102_n$. If either one, or both, of the optical links $102_k$ and $102_n$ break, the amount of reflected monitor light will be reduced, and the output of the monitor photodetector 2212 will be less than the first threshold. When the output of the monitor photodetector 2212 is less than the first threshold, the optical power supply 2112 is quickly adjusted to reduce or stop the power supply light from being transmitted from the optical power supply 2112 to the optical link $102_k$ and $102_n$.

Figure 25D:
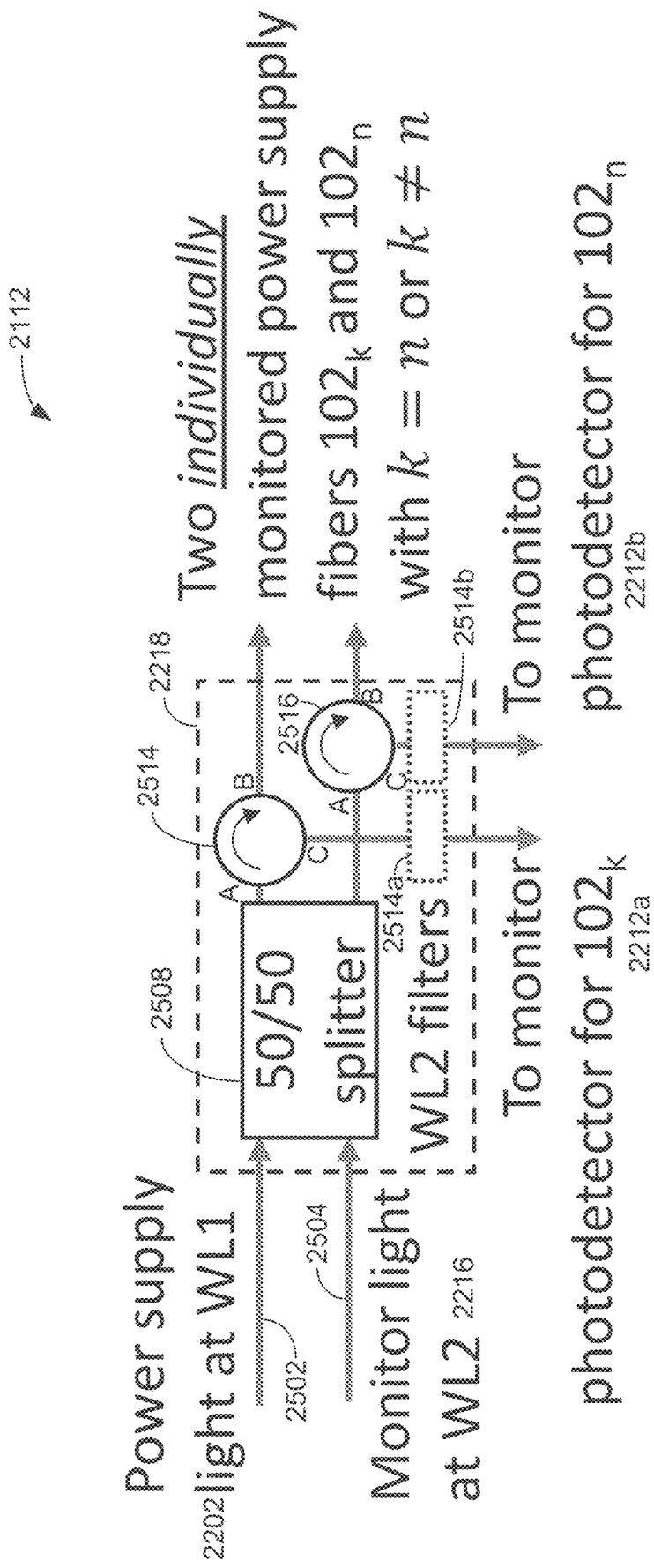

Referring to FIG. 25D, in some implementations, the coupling module 2218 of the optical power supply 2112 includes an optical 50/50 splitter 2508 that receives the power supply light 2202 (wavelength WL1) through a first optical fiber 2502, and receives the monitor light 2216 (wavelength WL2) through a second optical fiber 2504. The optical 50/50 splitter 2508 sends first combined light that includes half of the power supply light 2202 and half of the monitor light 2216 to a first optical link $102_k$, and sends second combined light that includes the other half of the power supply light 2202 and the other half of the monitor light 2216 to a second optical link $102_n$, in which k=n or k≠n.

A first optical circulator 2514 including ports A, B, and C transmits the first combined light from port A to port B, which is optically coupled to the first optical link $102_k$. The first optical circulator 2514 transmits reflected monitor light from port B to port C, which is optically coupled to a first monitor photodetector 2212a. A second optical circulator 2516 including ports A, B, and C transmits the second combined light from port A to port B, which is optically coupled to the second optical link $102_n$. The second optical circulator 2516 transmits reflected monitor light from port B to port C, which is optically coupled to a second monitor photodetector 2212b. In some examples, an optical filter 2514a is provided to allow light having the wavelength WL2 to pass to the first monitor photodetector 2212a and remove light having the wavelength WL1 (if in an optical band different from that of the wavelength WL2). An optical filter 2514b is provided to allow light having the wavelength WL2 to pass to the second monitor photodetector 2212b and remove light having the wavelength WL1 (if in an optical band different from that of the wavelength WL2).

The output of the first monitor photodetector 2212a is compared with a threshold, and the result of the comparison is used to determine whether the first optical link $102_k$ is intact or broken. The output of the second monitor photodetector 2212b is compared with a threshold, and the result of the comparison is used to determine whether the second optical link $102_n$ is intact or broken. This design allows the optical links $102_k$ and $102_n$ to be monitored independently and makes it possible to determine which one of the optical links $102_k$, $102_n$ is broken.

Figure 26A:
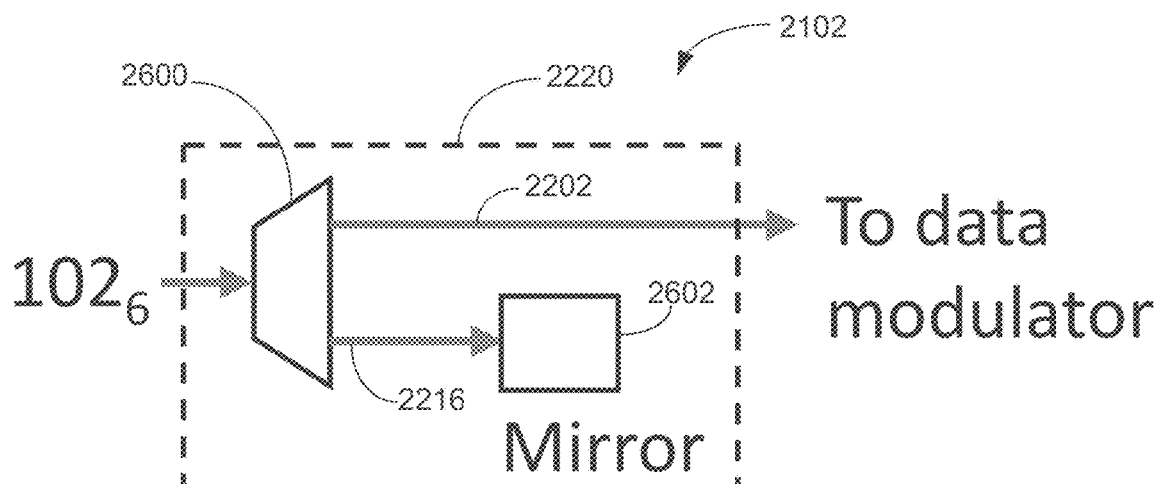
FIGS. 26A and 26B are diagrams of examples of selective reflectors of transponder modules.

The following describes examples of the selective reflector 2220 in the transponder module 2102 of FIG. 22B. Referring to FIG. 26A, in some implementations, the selective reflector 2220 includes a wavelength selective multiplexer/demultiplexer 2600 that receives the combined light (including the power supply light 2202 having wavelength WL1 and the monitor light 2216 having wavelength WL2) from the optical link $102_6$, sends the power supply light 2202 to the data modulator 2208, and sends the monitor light 2216 to a mirror 2602. The mirror 2602 reflects the monitor light 2216 (wavelength WL2) back to the wavelength selective multiplexer/demultiplexer 2600, which sends the reflected monitor light back to the optical link $102_6$.

Figure 26B:
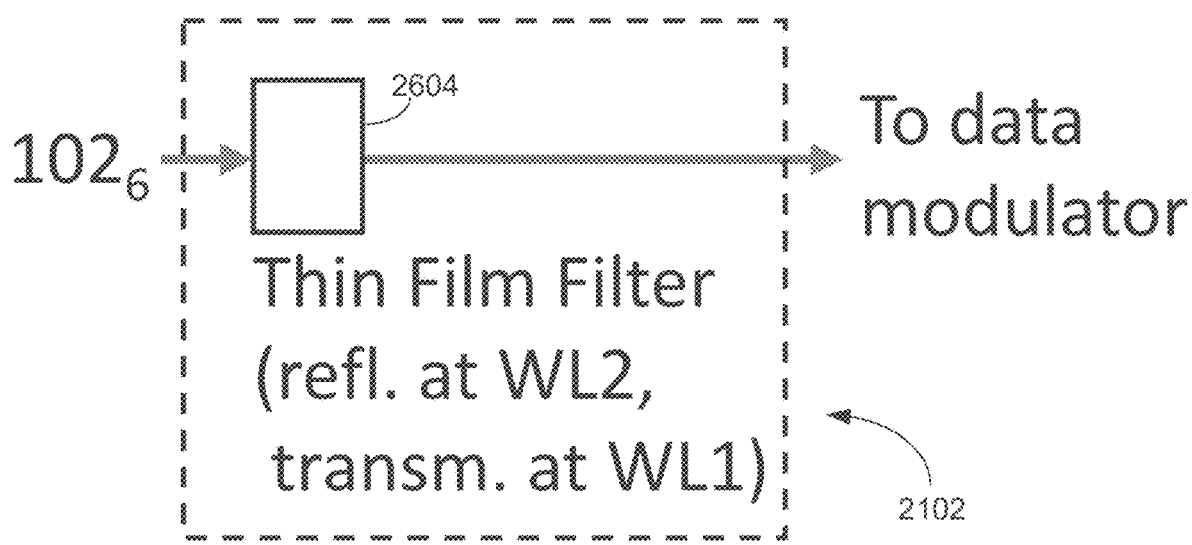

Referring to FIG. 26B, in some implementations, the selective reflector 2220 includes thin film filter 2604 that receives the combined light (including the power supply light 2202 having wavelength WL1 and the monitor light 2216 having wavelength WL2) from the optical link $102_6$, transmits the power supply light 2202 having wavelength WL1 to the data modulator 2208, and reflects the monitor light 2216 having wavelength WL2 back to the optical link $102_6$.

Figure 27A:
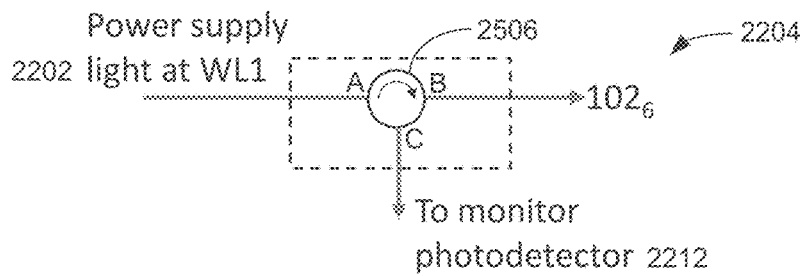
FIGS. 27A to 27C are diagrams of examples of coupling modules of optical power supplies.
Figure 27B:
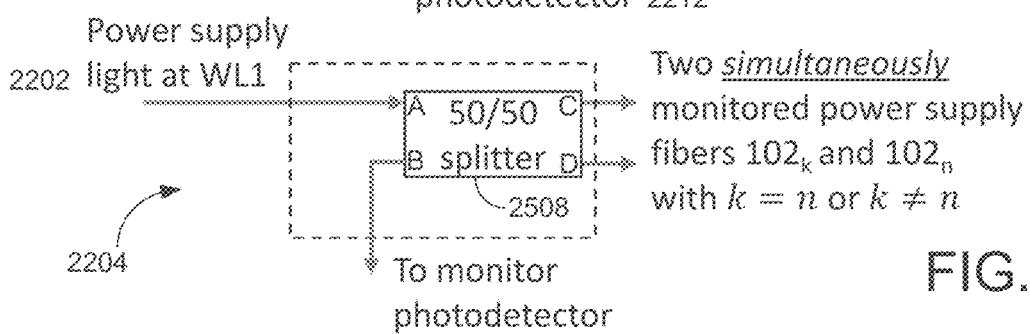
Figure 27C:
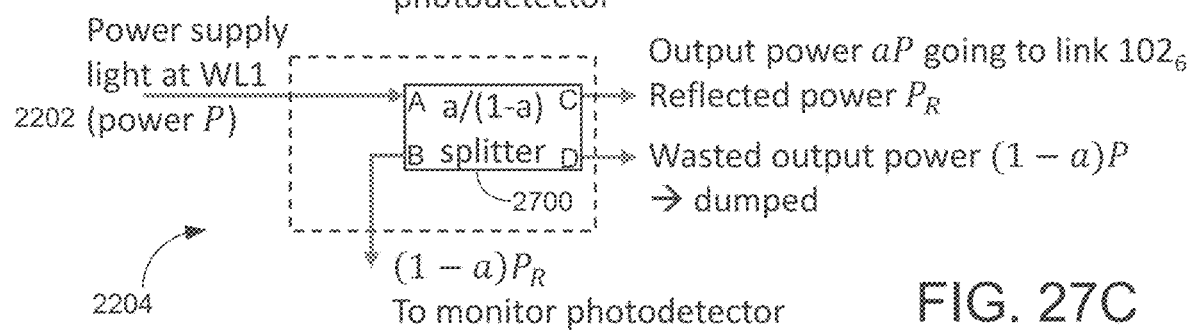

Each of the optical circulators 2506 shown in FIGS. 25A to 25D and 29 can also be implemented as an "a/(1−a) directional coupler" 2700 as shown in FIG. 27C, which may be cheaper at the expense of loss.

The following describes examples of the coupling module 2204 (FIG. 22A) of the optical power supply 2112 that does not use a dedicated monitoring light source at wavelength WL2 but instead uses either a fraction of the power supply light at wavelength WL1 (which induces losses to the power supply light) or light of a second output port of an interference-based data modulator, such as a Mach-Zehnder based modulator. Such modulators essentially act as switches, switching input light to either one of their output ports and thereby modulating one output port with "data" and the other output port with "inverted data." One of them is used for subsequent data transmission onto, e.g., links $102_2$ or $102_5$. The other output is otherwise not used for data transmission and hence can be beneficially used as a reflective signal towards the optical light supply. This solution is particularly useful for reflective modulators as shown below.

Referring to FIG. 27A, in some implementations, the coupling module 2204 (FIG. 22A) includes an optical circulator 2506 having ports A, B, and C. The power supply light 2202 (wavelength WL1) is transmitted from the power supply light source 2200 to port A of the optical circulator 2506, from port A to port B, and from port B to the optical link $102_6$. The power supply light 2202 is transmitted to the transponder module 2102, which reflects a portion of the power supply light 2202 back to the optical link $102_6$. The reflected power supply light is transmitted from the optical link $102_6$ to port B of the optical circulator 2506, from port B to port C, and from port C to a monitor photodetector 2212.

Referring to FIG. 27B, in some implementations, the coupling module 2204 (FIG. 22A) includes an optical 50/50 splitter 2508 that includes ports A, B, C, and D. The optical 50/50 splitter 2508 receives the power supply light 2202 (wavelength WL1) at port A, sends half of the power supply light 2202 from port A to port C, and from port C to the optical link $102_k$. The optical 50/50 splitter 2508 sends the other half of the power supply light 2202 from port A to port D, and from port D to the optical link $102_n$, in which k=n or k≠n. The optical link $102_k$ sends the power supply light 2202 to a first transponder module that reflects a portion of the power supply light 2202 back to the optical link $102_k$.

The optical 50/50 splitter 2508 receives the reflected power supply light from the optical link $102_k$ at port C and sends half of the reflected power supply light from port C to port B, and from port B to a monitor photodetector 2212. The optical 50/50 splitter 2508 receives the reflected power supply light from the optical link $102_n$ at port D and sends half of the reflected power supply light from port D to port B, and from port B to the monitor photodetector 2212. In this example, the conditions of two power supply optical links $102_k$ and $102_n$ are monitored simultaneously.

Referring to FIG. 27C, in some implementations, the coupling module 2204 (FIG. 22A) includes an a/(1−a) optical splitter 2700 that includes ports A, B, C, and D. The a/(1−a) optical splitter 2700 receives the power supply light 2202 (wavelength WL1, power P) at port A, sends a portion of the power supply light 2202 from port A to port C, and from port C to the optical link $102_k$, in which the power supply light output from port C has power a·P. The reflected power supply light in the optical link $102_k$ has power $P_R$. The a/(1−a) optical splitter 2700 sends a portion of the reflected power supply light from port C to port B, and from port B to a monitor photodetector 2212, in which the reflected power supply light output from port B has power (1−a)·$P_R$.

The a/(1−a) optical splitter 2700 sends a portion of the power supply light from port A to port D, in which the power supply light output from port D has power (1−a)·P. In some examples, the power supply light output from port D is not used.

Figure 28:
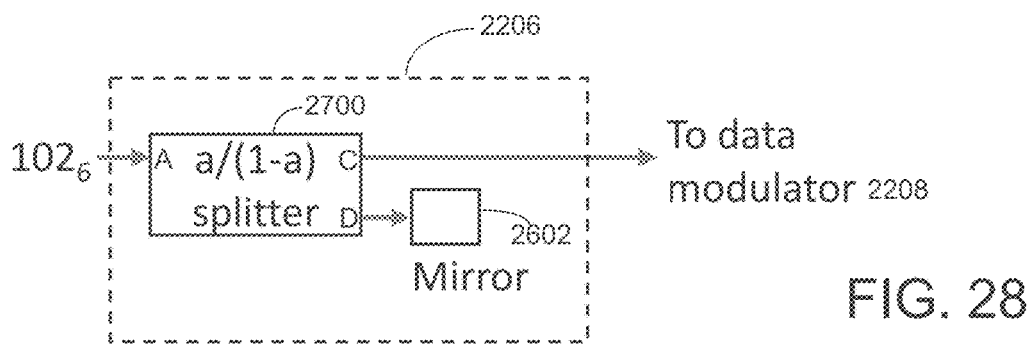
FIG. 28 is a diagram of an example of a partially reflecting device of a transponder module.

The following describes an example of the partially reflecting device 2206 of the transponder module 2102 in FIG. 22A. Referring to FIG. 28, in some implementations, the partially reflecting device 2206 includes an a/(1−a) optical splitter 2700 (that has ports A, C, and D) and a mirror 2602. The a/(1−a) optical splitter 2700 receives the power supply light 2202 having power P from the optical link $102_6$ at port A, sends a portion of the power supply light 2202 having power a·P from port A to port C and to the data modulator 2208, and sends the remaining portion of the power supply light 2202 having power (1−a)·P to the mirror 2602. The mirror 2602 reflects the power supply light 2202 back to port D, and the reflected power supply light is sent from port D to port A, and from port A to the optical link $102_6$.

The following describes examples in which data modulators are designed to have two output signals, the first output signal is used as the modulated data signal, and the second output signal is directed back to the optical power supply through the optical fiber for use in monitoring the condition of the optical fiber (e.g., whether the optical fiber is intact or broken).

Figure 29:
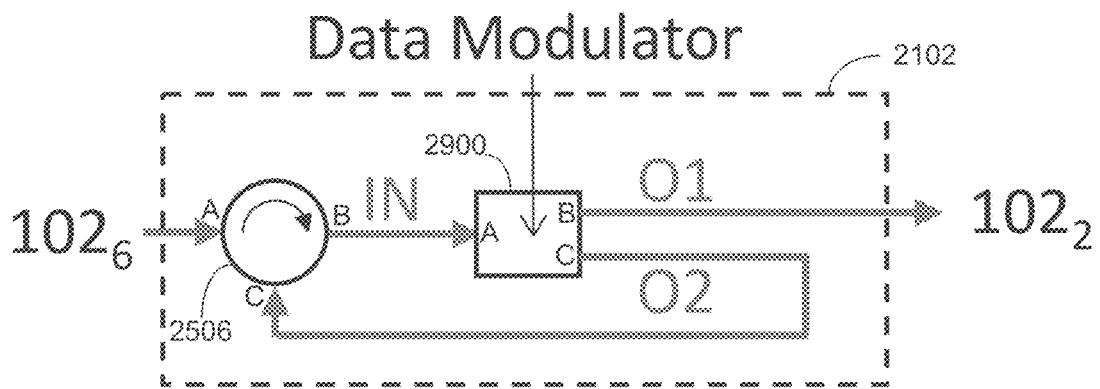
FIG. 29 is a diagram of an example of a transponder module.

Referring to FIG. 29, in some implementations, the transponder module 2102 includes an optical circulator 2506 (having ports A, B, and C) and a data modulator 2900. The data modulator 2900 has an input port (port A) and two output ports (ports B and C). The power supply light 2202 is transmitted from the optical link $102_6$ to port A of the optical circulator 2506, from port A to port B of the optical circulator 2506, and from port B of the optical circulator 2506 to port A of the data modulator 2900.

The data modulator 2900 modulates the power supply light 2202 according to electrical data and generates a first modulated output signal O1 at port B and a second modulated output signal O2 at port C. The first modulated output signal O1 is transmitted to the optical link $102_2$. The second modulated output signal O2 is transmitted to port C of the optical circulator 2506, from port C to port A of the optical circulator 2506, and from port A of the optical circulator 2506 back to the optical link $102_6$. The second modulated output signal O2 is detected by the monitor photodetector 2212 of the optical power supply 2112 to monitor the condition of the optical link $102_6$.

Figure 30:
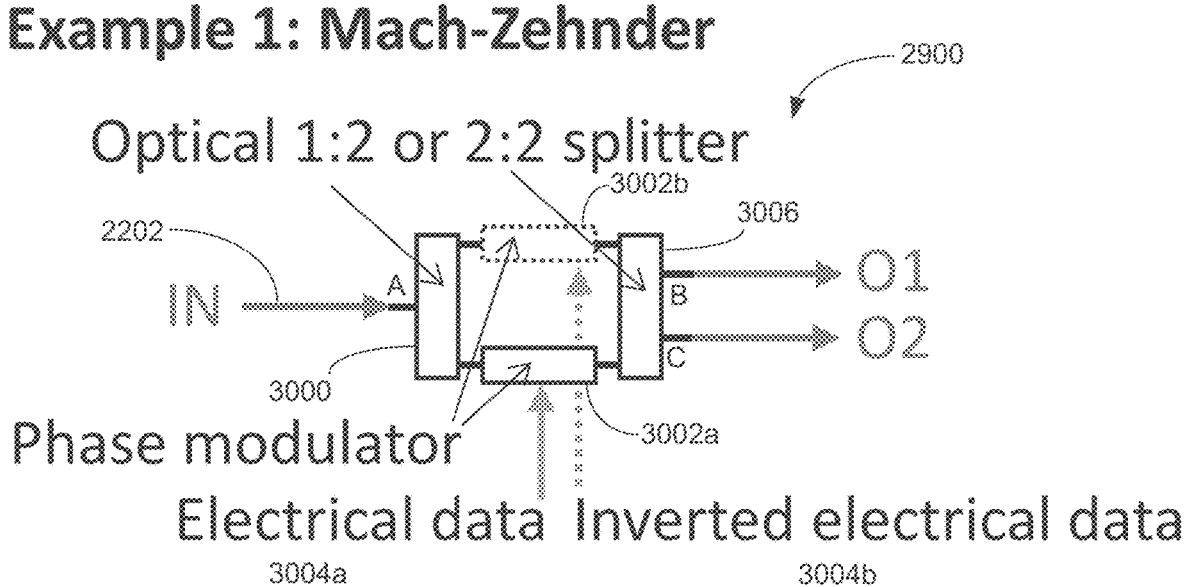
FIG. 30 is a diagram of an example of a data modulator of the transponder module of FIG. 29.

FIG. 30 is a diagram of an example of the data modulator 2900, which can be implemented using a configuration similar to a Mach-Zehnder interferometer. The data modulator 2900 includes an optical 1:2 splitter 3000 that receives at port A the power supply light 2202. The optical 1:2 splitter 3000 splits the power supply light 2202 and sends the two halves of the power supply light 2202 to two phase modulators 3002a and 3002b. The phase modulator 3002a modulates the power supply light according to electrical data 3004a, and the phase modulator 3002b modulates the power supply light according to inverted electrical data 3004b. The outputs of the phase modulators 3002a and 3002b are sent to an optical 2:2 splitter 3006, which splits the output signals from each of the phase modulators 3002a and 3002b. The output signals of the phase modulators 3002a and 3002b interfere at the optical 2:2 splitter to generate the first modulated output signal O1 at port B and the second modulated output signal O2 at port C of the data modulator 2900.

Figure 31:
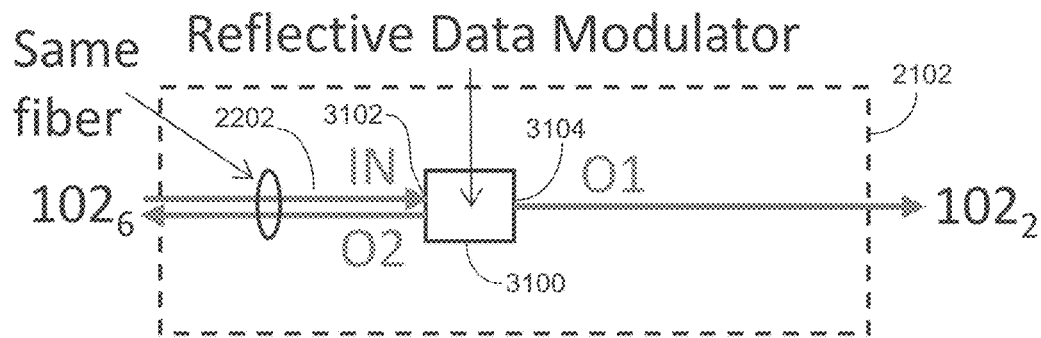
FIG. 31 is a diagram of an example of a transponder module.

Referring to FIG. 31, in some implementations, the transponder module 2102 includes a reflective data modulator 3100 that has a first port 3102 and a second port 3104. The data modulator 3100 receives the power supply light 2202 at the first port 3102 from the optical link $102_6$, and generates a first modulated output signal O1 that is output through the second port 3104 to the optical link $102_2$. The data modulator 3100 generates a second modulated output signal O2 that is output through the first port 3102 and sent through the optical link $102_6$ to the optical power supply 2112. The second modulated output signal O2 is detected by the monitor photodetector 2212 of the optical power supply 2112 to monitor the condition of the optical link $102_6$.

Figure 32:
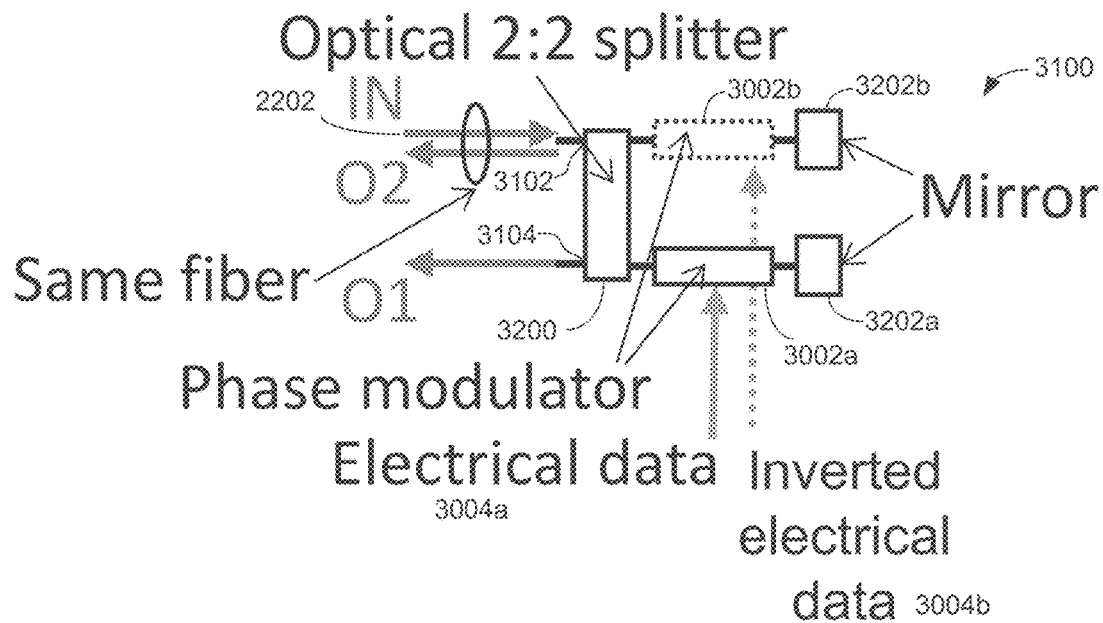
FIG. 32 is a diagram of an example of a reflective data modulator of the transponder module of FIG. 31.

FIG. 32 is a diagram of an example of the data modulator 3100, which can be implemented using a configuration similar to a reflective Mach-Zehnder interferometer. The data modulator 3100 includes an optical 2:2 splitter 3200 that receives, at the first port 3102, input power supply light 2202. The optical 2:2 splitter splits the power supply light 2202 and sends the two halves of the power supply light 2202 to two phase modulators 3002a and 3002b. The phase modulator 3002a modulates the power supply light according to electrical data 3004a, and the phase modulator 3002b modulates the power supply light according to inverted electrical data 3004b. The phase modulator 3002a generates a first signal that is sent to a first mirror 3202a, which reflects the first signal back to the phase modulator 3002a. The phase modulator 3002b generates a second signal that is sent to a second mirror 3202b, which reflects the second signal back to the phase modulator 3002b. The reflected first and second signals are further modulated by the phase modulators 3002a and 3002b to generate a first modulated signal and a second modulated signal, respectively. The phase modulators 3002a and 3002b send the first and second modulated signals to the optical 2:2 splitter 3200. The first and second modulated signals interfere at the optical 2:2 splitter 3200 to generate the first modulated output signal O1 at the second port 3104 and the second modulated output signal O2 at the first port 3102. The second modulated output signal O2 is sent back into the optical link $102_6$.

The following describes examples of processes of operating an optical power supply (e.g., 2112 of FIG. 21) to ensure safety of the operators. We first describe an example process for controlling the current provided to the light source (e.g., 2200 of FIG. 22A) to reduce or shut off the power supply light in case of failure of the power supply optical fiber. We then describe an example process for controlling a shutter (e.g., 2214 of FIGS. 22A and 22B) to reduce or shut off the power supply light in case of failure of the power supply optical fiber (e.g., 2104 of FIGS. 21 to 22B).

Figure 33:
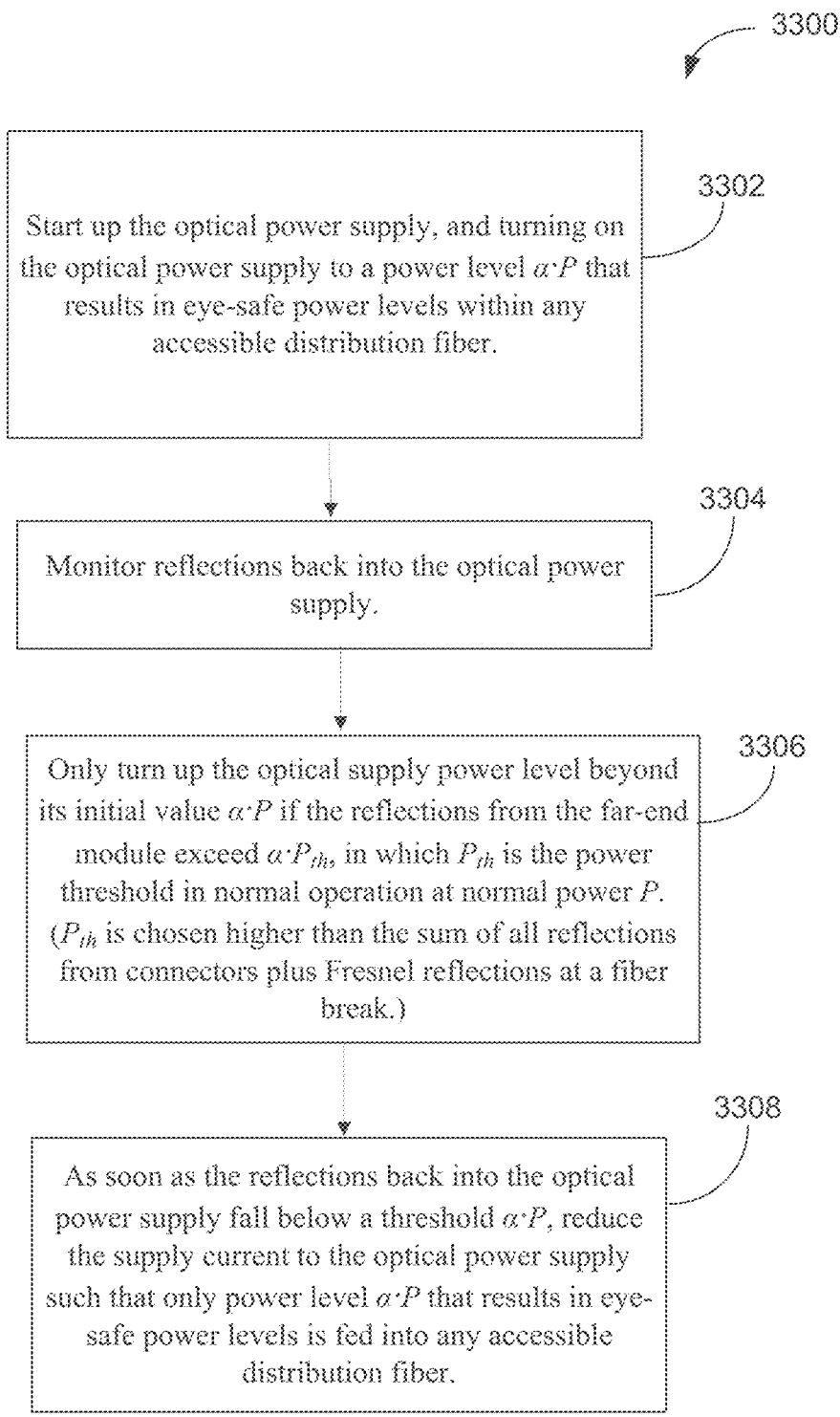
FIGS. 33 and 34 are flow diagrams of examples of processes for operating optical power supplies.

FIG. 33 is a flow diagram of an example of a process 3300 for operating an optical power supply by controlling the current provided to the light source to reduce or shut off the power supply light in case of failure of the power supply optical fiber. The process 3300 includes the following steps.

Step 3302: Start up the optical power supply, and turning on the optical power supply to a power level $\alpha \cdot P$ that results in eye-safe power levels within any accessible distribution fiber.

The optical power supply normally operates at power P. For example, the optical power supply can be the optical power supply 2112 of FIGS. 21 to 22B. For example, a can be in a range from 0.001 to 0.5.

Step 3304: Monitor reflections back into the optical power supply.

For example, the monitor photodetector 2212 and the controller 2224 of FIGS. 22A and 22B can be used to monitor the reflections back into the optical power supply. For example, the reflections can be the reflected monitor light 2108a1, 2108a2, 2108b1, 2108b2 of FIG. 21, the power supply light reflected by the partially reflecting device 2206 into the optical fiber 2104 of FIG. 22A, or the monitor light reflected by the selective reflector 2220 into the optical fiber 2104 of FIG. 22B. The reflections can be the reflected light sent from port C of the optical circulator 2506 to the monitor photodetector 2212 in FIGS. 25A to 25C. The reflections can be the reflected light sent from port C of the optical circulator 2514 to the monitor photodetector 2212a or the reflected light sent from port C of the optical circulator 2516 to the monitor photodetector 2212b of FIG. 25D. The reflections can be the monitor light reflected by the mirror 2602 of FIG. 26A, or the monitor light reflected by the thin film filter 2604 of FIG. 26B, The reflections can be the reflected power supply light sent from port C of the optical circulator 2506 to the monitor photodetector 2212 of FIG. 27A, the reflected power supply light sent from port B of the optical 50/50 splitter 2508 to the monitor photodetector 2212 of FIG. 27B, or the reflected power supply light sent from port B of the optical a/(1−a) splitter 2700 to the monitor photodetector 2212 of FIG. 27C. The reflections can be the power supply light reflected by the mirror 2602 back to the optical link $102_6$ of FIG. 28. The reflections can be the second modulated output signal O2 sent back to the optical link $102_6$ of FIGS. 29 and 31.

Step 3306: Only turn up the optical supply power level beyond its initial value αP if the reflections from the far-end module exceed $\alpha P_{th}$, in which $P_{th}$ is the power threshold in normal operation at normal power P. ($P_{th}$ is chosen higher than the sum of all reflections from connectors plus Fresnel reflections at a fiber break.)

Step 3308: As soon as the reflections back into the optical power supply fall below a threshold $P_{th}$, reduce the supply current to the optical power supply such that only power level α·P that results in eye-safe power levels is fed into any accessible distribution fiber.

For example, the controller 2224 can be used to reduce the supply current to the optical power supply.

Figure 34:
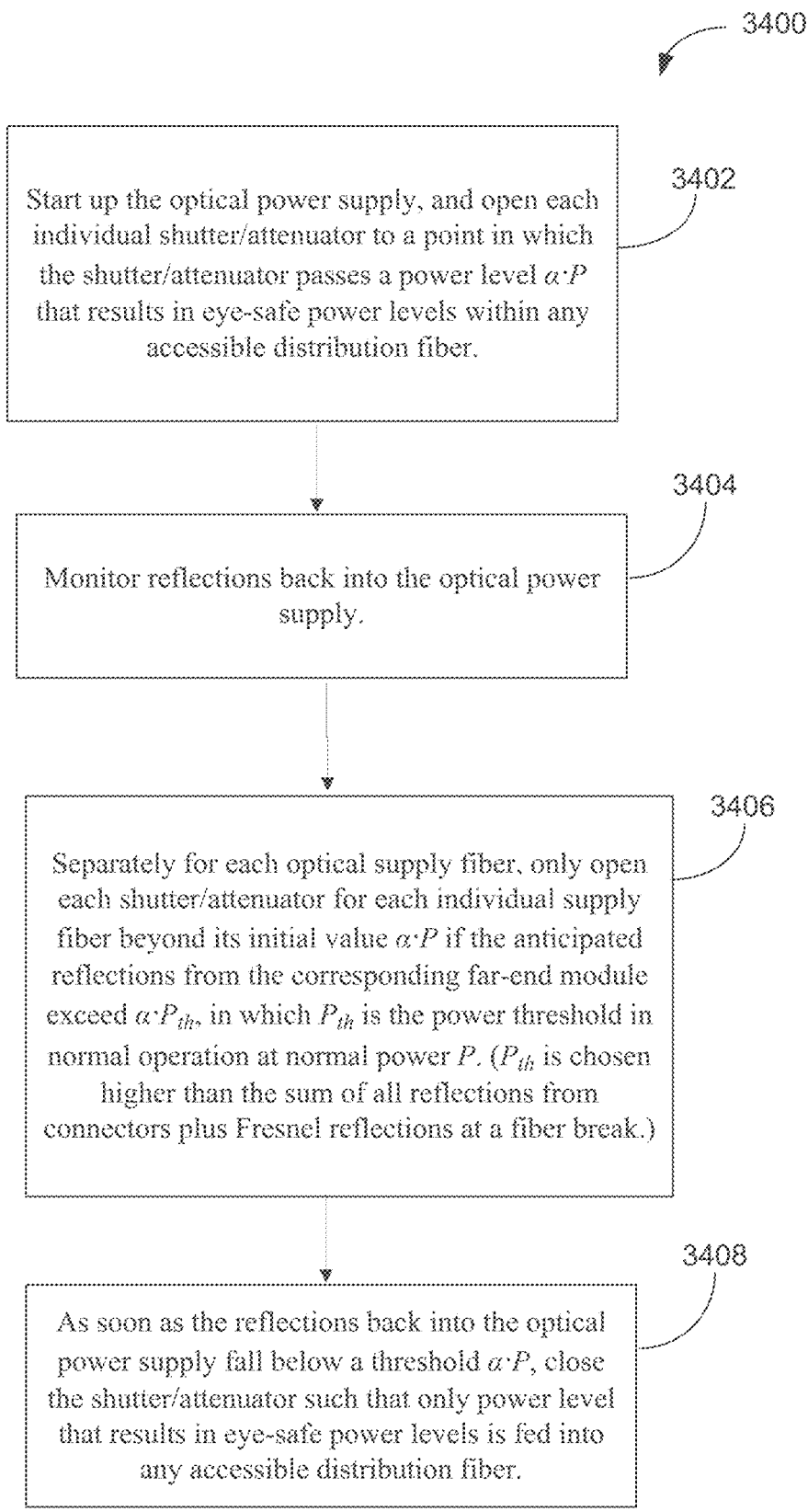

FIG. 34 is a flow diagram of an example of a process 3400 for operating an optical power supply by controlling a shutter or attenuator to reduce or shut off the power supply light provided to a power supply optical fiber in case of failure of the power supply optical fiber. An advantage of this configuration is that a common optical power supply can provide power supply light to multiple optical fibers, each optical fiber can be associated with a shutter. If a particular power supply optical fiber fails, only the shutter corresponding to the failed optical fiber needs to be activated to block the power supply light provided to the failed optical fiber. The optical power supply can continue to provide power supply light to the other power supply optical fibers that are intact.

The process 3400 includes the following steps. Step 3402: Start up the optical power supply, and open each individual shutter/attenuator to a point in which the shutter/attenuator passes a power level α·P that results in eye-safe power levels within any accessible distribution fiber.

The optical power supply normally operates at power P. For example, the optical power supply can be the optical power supply 2112 of FIGS. 21 to 22B. For example, a can be in a range from 0.001 to 0.5.

Step 3404: Monitor reflections back into the optical power supply.

For example, the monitor photodetector 2212 and the controller 2224 of FIGS. 22A and 22B can be used to monitor the reflections back into the optical power supply. For example, the reflections can be the reflected monitor light 2108a1, 2108a2, 2108b1, 2108b2 of FIG. 21, the power supply light reflected by the partially reflecting device 2206 into the optical fiber 2104 of FIG. 22A, or the monitor light reflected by the selective reflector 2220 into the optical fiber 2104 of FIG. 22B. The reflections can be the reflected light sent from port C of the optical circulator 2506 to the monitor photodetector 2212 in FIGS. 25A to 25C. The reflections can be the reflected light sent from port C of the optical circulator 2514 to the monitor photodetector 2212a or the reflected light sent from port C of the optical circulator 2516 to the monitor photodetector 2212b of FIG. 25D. The reflections can be the monitor light reflected by the mirror 2602 of FIG. 26A, or the monitor light reflected by the thin film filter 2604 of FIG. 26B, The reflections can be the reflected power supply light sent from port C of the optical circulator 2506 to the monitor photodetector 2212 of FIG. 27A, the reflected power supply light sent from port B of the optical 50/50 splitter 2508 to the monitor photodetector 2212 of FIG. 27B, or the reflected power supply light sent from port B of the optical a/(1−a) splitter 2700 to the monitor photodetector 2212 of FIG. 27C. The reflections can be the power supply light reflected by the mirror 2602 back to the optical link 102₆ of FIG. 28. The reflections can be the second modulated output signal O2 sent back to the optical link 102₆ of FIGS. 29 and 31.

Step 3406: Separately for each optical supply fiber, only open each shutter/attenuator for each individual supply fiber beyond its initial value α·P if the anticipated reflections from the corresponding far-end module exceed α·$P_{th}$, in which $P_{th}$ is the power threshold in normal operation at normal power P. ($P_{th}$ is chosen higher than the sum of all reflections from connectors plus Fresnel reflections at a fiber break.)

Step 3408: As soon as the reflections back into the optical power supply fall below a threshold $P_{th}$, close the shutter/attenuator such that only power level α·P that results in eye-safe power levels is fed into any accessible distribution fiber.

For example, the controller 2224 can be used to reduce the supply current to the optical power supply.

Figure 35:
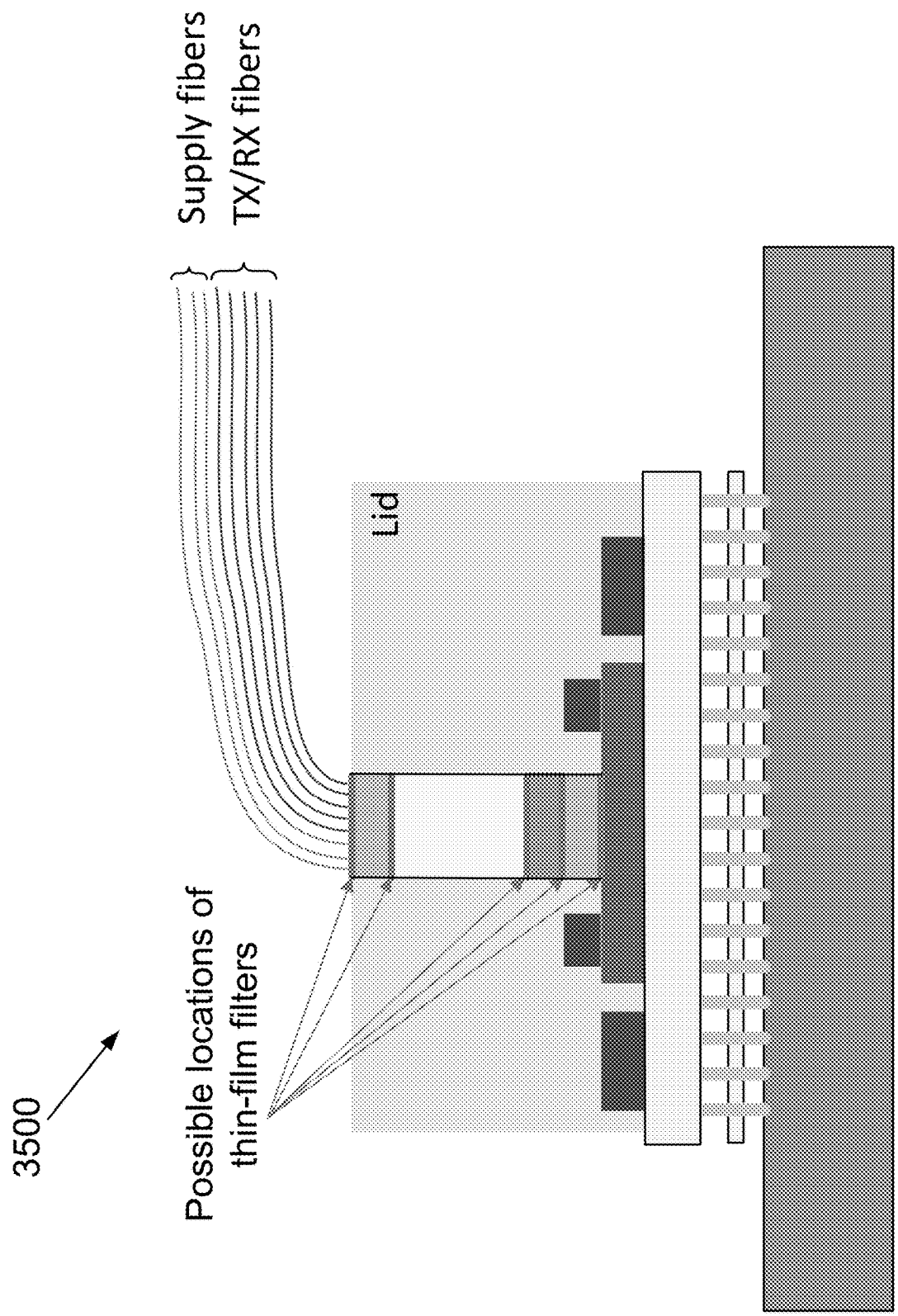
FIG. 35 is a diagram of an example of thin film filter selective reflector.

FIG. 35 is a diagram of an example module 3500 (e.g., a transponder module) that uses of a thin-film filter as a selective reflector. In this example, the selective reflector is within an enclosure that is not accessible to individuals (e.g., technicians) in normal operation (e.g., within the module lid) such that a link failure (e.g., a broken fiber) at a location accessible to individuals would always interrupt the respective high-reflectivity optical path.

Figure 36:
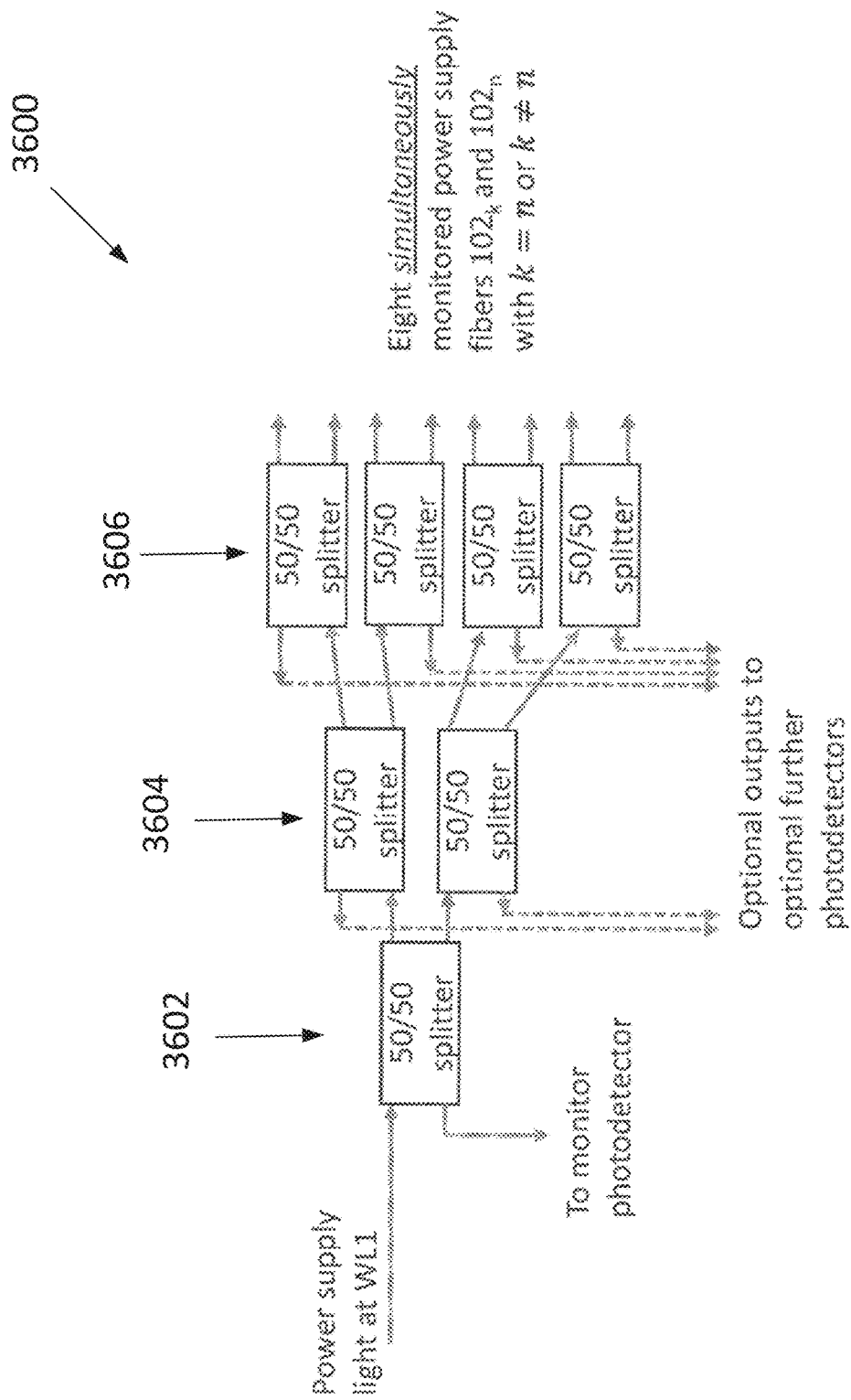
FIG. 36 is splitter network.

FIG. 36 graphically illustrates that optical splitting may be expanded in some implementations beyond a 1:2 split. For example, splitting operations may be performed to send light to eight optical links for providing eight simultaneously monitored power supply fibers $102_k$ to $102_n$, with k=n or k≠n. In the illustrated example (and with reference to FIG. 25C and FIG. 25D), a network of 50/50 splitters 3600 is presented that includes three splitter stages provide the eight-way split. In this example, a first splitter stage 3602 includes a single 50/50 splitter that creates two outputs. The first stage 3602 is followed by a second splitter stage 3604 (e.g., that includes two 50/50 splitters) and then followed by a third splitter stage 3606 (e.g., that includes four 50/50 splitters), which provides the eight optical links. In this example, the 50/50 splitter of the first stage 3602 provides a light signal to a monitor photodetector to detect the level of reflected power supply light. As mentioned above, the monitor photodetector can be provided to a controller to perform threshold detection. In this example, the 50/50 splitters of the second splitter stage 3604 and the third splitter stage 3606 can optionally output to optional further photodetectors to also monitor. While this example illustrates one implementation for an eight way split, other implementations may be realized to provide this functionality. Further, splitting beyond eight may be achieved using similar or different implementations.

Figure 37:
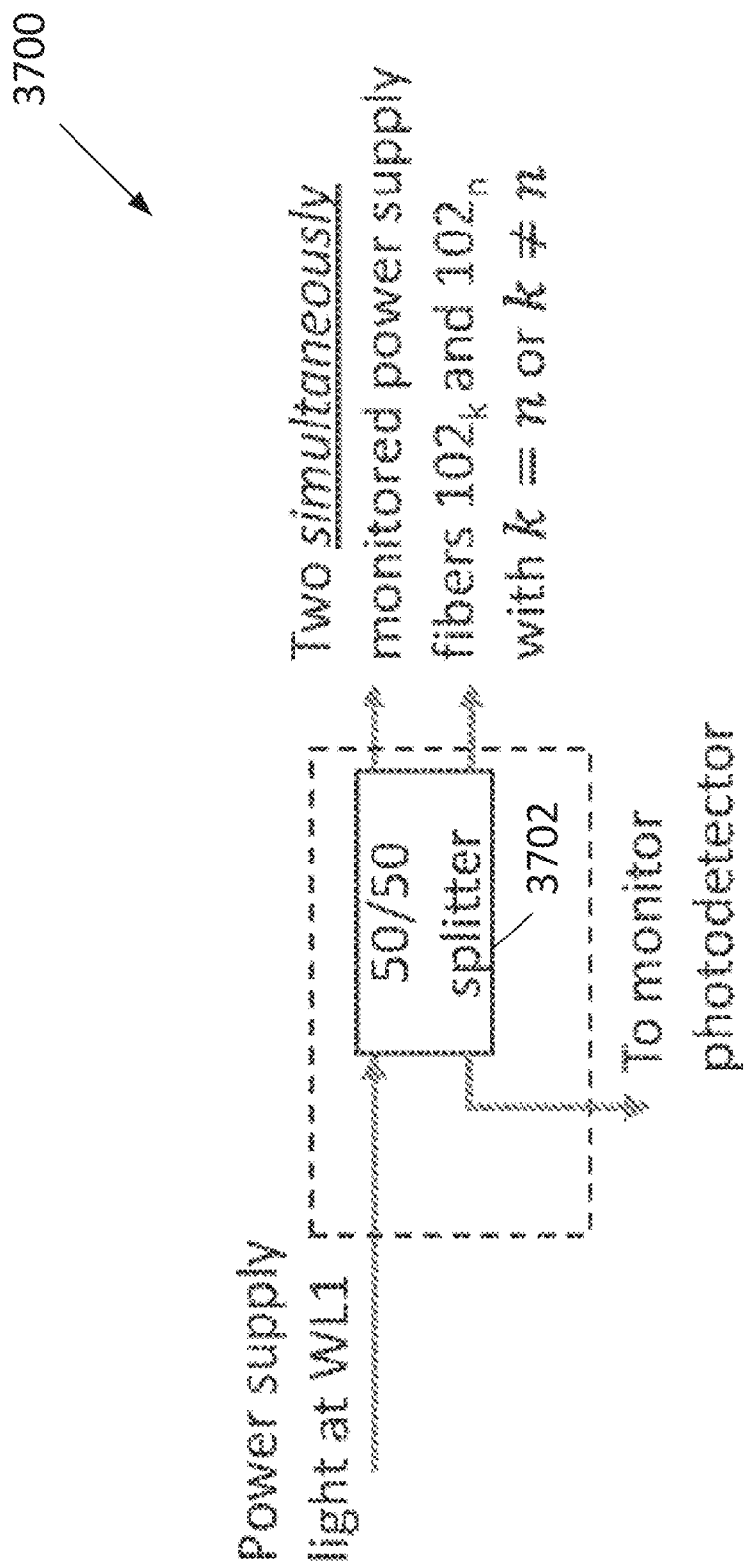
FIG. 37 is a coupling module.

FIG. 37 illustrates an example in which multiple thresholds may be utilized to monitor and detect reflected power supply light. In this example, module 3700 is shown and includes a 50/50 splitter 3702 (similar to the splitter 2508 shown in FIG. 25C). In this example, the splitter 3702 allows for two simultaneously monitored power supply fibers $102_k$ and $102_n$, with k=n or k≠n. Power supply light is split and provided to the fibers and reflected power comes from selective reflectors, for example, and is received at the splitter 3702. The selective reflectors can be implemented with different reflectivities for identifying which path yielded a particular reflectivity, or one or more different techniques may be utilized (e.g., via calibration such as a system calibration) to identify which path yielded a particular reflectivity. In this example, if only one reflection of the two reflections is detected, the detector can identify which link has failed (e.g., as determined from the light provided to a monitor photodetector). Various implementations may be realized in which multiple thresholds are utilized; for example, based on the light output by the splitter (e.g., splitter 3702, a network of splitters, etc.), different reflectivities may be provided to the monitor photodetector and used to identify one or more failed links.

Additional details of the fiber cables that can be used to transmit light from the optical power supplies to photonic integrated circuits that include modulators that can modulate the light, and fiber-to-photonic integrated circuit connects that can be used to couple the light from the fibers to the photonic integrated circuits, can be found in, e.g., U.S. patent application Ser. No. 16/816,171, filed on Mar. 11, 2020, and PCT application PCT/US2021/021953, filed on Mar. 11, 2021, U.S. patent application Ser. No. 16/822,103, filed on Mar. 18, 2020, PCT application PCT/US2021/022730, filed on Mar. 17, 2021, and PCT application PCT/US2021/027306, filed on Apr. 14, 2021. The entire contents of application Ser. No. 16/816,171, application PCT/US2021/021953, application Ser. No. 16/822,103, application PCT/US2021/022730, and application PCT/US2021/027306 are herein incorporated by reference. Additional details related to the photonic integrated circuits that include modulators that can modulate the light provided by the optical power supplies can be found in, e.g., U.S. provisional patent application 63/080,528, filed on Sep. 18, 2020, the entire content of which is herein incorporated by reference. Additional details for fiber connectors that can assist in the connection of optical fiber cables to the optical power supplies and the photonic integrated circuits can be found in, e.g., U.S. provisional patent application 63/088,914, filed on Oct. 7, 2020, the entire content of which is herein incorporated by reference.

According to an example embodiment disclosed above, e.g., in the summary section and/or in reference to any one or any combination of some or all of FIGS. 1-8, provided is an apparatus (e.g., 100, FIG. 1) for communicating optical signals modulated at a symbol rate (e.g., $R_S$), the apparatus comprising an optical power supply (e.g., 290, FIG. 2) that comprises: a light source (e.g., 200, FIG. 2) and an electronic controller (e.g., 230, FIG. 2) connected to the light source to cause the light source to generate a first light output having a first optical frequency (e.g., 212, FIGS. 2 and 3) and a second light output having a second optical frequency (e.g., 222, FIGS. 2 and 3) different from the first optical frequency, each of the first and second light outputs being steady during a time interval that is significantly longer (e.g., by a factor of 100) than one over the symbol rate; and a polarization combiner (e.g., 240, FIG. 2) connected to receive the first and second light outputs of the light source at different respective input ports thereof, the polarization combiner being configured to generate, at an output port thereof, an optical output in which first and second mutually orthogonal polarization components carry light of the first and second light outputs, respectively.

In some embodiments of the above apparatus, the electronic controller is configured to cause the first light output and the second light output to be mutually time/frequency orthogonal (e.g., as per Eqs. (3) and (4)).

In some embodiments of any of the above apparatus, a degree to which the first light output and the second light output are time/frequency orthogonal is greater than 0.8.

In some embodiments of any of the above apparatus, the degree is greater than 0.9.

In some embodiments of any of the above apparatus, the degree is greater than 0.99.

In some embodiments of any of the above apparatus, the first light output comprises a first continuous-wave optical field at the first optical frequency, and the second light output comprises a second continuous-wave optical field at the second optical frequency.

In some embodiments of any of the above apparatus, a difference between the first optical frequency and the second optical frequency is greater than five times the symbol rate (e.g., $\Delta f = |f_1 - f_2| > 5\, R_f$, 212, 222, FIG. 3D).

In some embodiments of any of the above apparatus, a difference between the first optical frequency and the second optical frequency is approximately an integer multiple of the symbol rate (i.e., $\Delta f \approx n\, R_f$, with n=2, 3, 4, . . . ).

In some embodiments of any of the above apparatus, the first light output comprises a first optical pulse train of a first period, and the second light output comprises a second optical pulse train of the first period.

In some embodiments of any of the above apparatus, pulses of the first and second optical pulse trains have a same intensity waveform (e.g., 212, 222, FIG. 3C).

In some embodiments of any of the above apparatus, pulses of the first and second optical pulse trains have different respective intensity waveforms.

In some embodiments of any of the above apparatus, the first and second optical pulse trains are phase-locked with respect to one another.

In some embodiments of any of the above apparatus, centers of pulses of the first optical pulse train are temporally aligned with centers of corresponding pulses of the second optical pulse train (e.g., $\Delta T \approx 0$, 212, 222, FIG. 3C).

In some embodiments of any of the above apparatus, centers of pulses of the first optical pulse train are temporally offset from centers of corresponding pulses of the second optical pulse train by a nonzero time shift (e.g., $\Delta T$, 212, 222, FIG. 3C).

In some embodiments of any of the above apparatus, the nonzero time shift is smaller than one half the first period (e.g., $\Delta T < T_f/2$, 212, 222, FIG. 3C).

In some embodiments of any of the above apparatus, the nonzero time shift is smaller than one quarter of the first period (e.g., $\Delta T < T_f/4$, 212, 222, FIG. 3C).

In some embodiments of any of the above apparatus, the difference between the first optical frequency and the second optical frequency is twice the pulse repetition rate (i.e., $\Delta f \approx 2\, R_f$, 212, 222, FIG. 3E).

In some embodiments of any of the above apparatus, the difference between the first optical frequency and the second optical frequency is three times the pulse repetition rate (i.e., $\Delta f \approx 3\, R_f$).

In some embodiments of any of the above apparatus (e.g., 212, 222, FIG. 3E; 516, 517, FIG. 6D) a spectrum of the first pulse train has two first optical frequency tones; and a spectrum of the second pulse train has two second optical frequency tones different from the two first optical frequency tones.

In some embodiments of any of the above apparatus, the first and second optical frequency tones are equidistantly spaced by an integer multiple of the symbol rate.

In some embodiments of any of the above apparatus, the integer multiple is two.

In some embodiments of any of the above apparatus, the electronic controller is further configured to imprint first control information on the first light output of the light source and second control information on the second light output of the light source.

In some embodiments of any of the above apparatus, the first control information is identical to the second control information.

In some embodiments of any of the above apparatus, the electronic controller imprints the first and second control information using one or more of: an intensity, a phase, a frequency, and a polarization of the first light output and the second light output.

In some embodiments of any of the above apparatus, the light source comprises a first CW laser oscillating at the first optical frequency (e.g., 410, FIG. 4A), and a second CW laser oscillating at the second optical frequency (e.g., 420, FIG. 4A).

In some embodiments of any of the above apparatus, the electronic controller is configured to control the first CW laser and the second CW laser (e.g., 430, FIG. 4A) to controllably set a frequency difference between the first and second optical frequencies.

In some embodiments of any of the above apparatus, the polarization combiner comprises one or more of: a polarization beam combiner, a polarization-maintaining optical power combiner, and a polarization-maintaining wavelength multiplexer.

In some embodiments of any of the above apparatus, the light source comprises a CW laser and an optical modulator optically connected to the CW laser, the optical modulator configured to generate a first modulation tone at the first optical frequency (e.g., 424, FIG. 4B; 417, FIG. 4C).

In some embodiments of any of the above apparatus, the electronic controller (e.g., 432, FIG. 4B; 433, FIG. 4C) is configured to control an optical frequency of the first modulation tone.

In some embodiments of any of the above apparatus, the optical modulator is further configured to generate a second modulation tone at the second optical frequency (e.g., 417, FIG. 4B).

In some embodiments of any of the above apparatus, the light source comprises an optical amplitude modulator configured to generate an optical pulse train (e.g., 417, 427, FIG. 4D; 417, FIG. 4E).

In some embodiments of any of the above apparatus, the light source comprises a pulsed laser configured to generate an optical pulse train (e.g., 410 and 417, 420 and 427, FIG. 4C).

In some embodiments of any of the above apparatus, the light source comprises an optical delay element configured to delay the first light output with respect to the second light output (e.g., 419, FIGS. 4D and 4E).

In some embodiments of any of the above apparatus, the optical power supply comprises an optical dispersion-compensating element (e.g., 470, FIGS. 4D and 4E).

In some embodiments of any of the above apparatus, the light source comprises a polarization-diversity in-phase/quadrature modulator (e.g., 417, FIG. 4F).

In some embodiments of any of the above apparatus (e.g., 212, 222, FIG. 3E): the polarization-diversity in-phase/quadrature modulator is configured to generate two tones in a first polarization and two tones in a second polarization orthogonal to the first polarization; wherein frequency spacing between the two tones in the first polarization and frequency spacing between the two tones in the second polarization are equal to one another; and wherein frequency spacing between a tone in the first polarization and a tone in the second polarization is an integer multiple of said equal frequency spacing.

In some embodiments of any of the above apparatus, the phase difference between the two tones in the first polarization is equal to the phase difference between the two tones in the second polarization.

In some embodiments of any of the above apparatus, the apparatus further comprises an optical transmit module (e.g., 504, FIG. 5; 600, FIG. 6) optically end-connected to the output port of the polarization combiner (e.g., 242, FIG. 2) via one or more sections of optical fiber (e.g., $102_6$, 543, FIG. 5), the transmit module comprising: a polarization splitter (e.g., 515, FIG. 5) having an input port thereof optically connected to an end of one of the sections of the optical fiber to receive light of the optical output; a first optical data modulator (e.g., $530_1$, FIG. 5) connected to a first output of the polarization splitter; and a second optical data modulator (e.g., $530_2$, FIG. 5) connected to a second output of the polarization splitter.

In some embodiments of any of the above apparatus, at least one of the first and second optical data modulators is configured to modulate received light at the symbol rate.

In some embodiments of any of the above apparatus, at least one of the one or more sections of the optical fiber is non-polarization-maintaining.

In some embodiments of any of the above apparatus, the optical fiber is at least one meter long.

In some embodiments of any of the above apparatus, the optical fiber is at least ten meters long.

According to another example embodiment disclosed above, e.g., in the summary section and/or in reference to any one or any combination of some or all of FIGS. 1-8, provided is an apparatus comprising an optical transmitter (e.g., 500, FIG. 5) that comprises: a passive polarization splitter (e.g., 515, FIG. 5) having an optical input port and first (e.g., 516, FIG. 5) and second (e.g., 517, FIG. 5) optical output ports, the optical input port being optically connected to receive an optical input signal having first and second polarization components (e.g., FIGS. 3A-3E), the first polarization component carrying light of a first optical frequency, the second polarization component carrying light of a second optical frequency different from the first optical frequency, the first and second polarization components being mutually orthogonal and jointly undergoing a state-of-polarization change during a time interval (e.g., intervals (A), (B), (C), FIGS. 7B-7D), the passive polarization splitter causing light of a first fixed polarization to be directed from the optical input port to the first optical output port and also causing light of a second fixed polarization to be directed from the optical input port to the second optical output port, the first and second fixed polarizations being orthogonal to one another, the state-of-polarization change causing respective spectral compositions of the lights directed to the first and second optical ports to change during said time interval (e.g., FIGS. 7B-7D); and a first optical modulator (e.g., $530_1$, FIG. 5) connected to the first optical output port and configured to modulate the light of the first fixed polarization received therefrom (e.g., 516, FIG. 5) in response to a first data signal (e.g., Data 1, FIG. 5).

In some embodiments of the above apparatus, the optical transmitter further comprises a second optical modulator (e.g., $530_2$, FIG. 5) connected to the second optical output port and configured to modulate the light of the second fixed polarization received therefrom (e.g., 517, FIG. 5) in response to a second data signal (e.g., Data 2, FIG. 5).

In some embodiments of any of the above apparatus, the first and second optical modulators are connected to transmit the respective modulated lights (e.g., on ports $532_1$ and $532_2$, FIG. 5) through different respective optical fibers.

In some embodiments of any of the above apparatus, at some times of said time interval (e.g., interval (A), FIGS. 7B-7D), the first optical modulator receives from the first output port the first optical frequency but not the second optical frequency; and at some other times of said time interval, the first optical modulator receives from the first output port the second optical frequency but not the first optical frequency.

In some embodiments of any of the above apparatus, at yet some other times of said time interval, the first optical modulator receives from the first output port a mix of the first and second optical frequencies (e.g., intervals (B), (C), FIGS. 7B-7D).

In some embodiments of any of the above apparatus, the optical input port is optically connected to receive the optical input signal from a proximate end of a section of optical fiber (e.g., 543, FIG. 5), the optical fiber including at least one section that is non-polarization-maintaining.

In some embodiments of any of the above apparatus, the state-of-polarization change is due to time-varying polarization rotation in said at least one section.

In some embodiments of any of the above apparatus, the time-varying polarization rotation is random.

In some embodiments of any of the above apparatus, the optical transmitter further comprises an optical power supply (e.g., 290, FIG. 5) optically connected to apply the optical input signal through the optical fiber to the passive polarization splitter.

In some embodiments of any of the above apparatus, the optical power supply comprises: a light source (e.g., 200, FIG. 2) and an electronic controller (e.g., 230, FIG. 2) connected to the light source to cause the light source to generate a first light output having the first optical frequency (e.g., 212, FIGS. 2 and 3) and a second light output having the second optical frequency (e.g., 222, FIGS. 2 and 3), each of the first and second light outputs being steady during said time interval; and a polarization combiner (e.g., 240, FIG. 2) connected to receive the first and second light outputs of the light source at different respective input ports thereof, the polarization combiner being configured to generate, at an output port thereof, an optical output that is coupled into the optical fiber to cause the optical input port of the polarization splitter to receive the optical input signal.

In some embodiments of any of the above apparatus, the first optical modulator is a polarization-sensitive device designed to modulate optical signals having the first fixed polarization.

In some embodiments of any of the above apparatus, the first optical modulator is unsuitable for modulating optical signals having the second fixed polarization.

In some embodiments of any of the above apparatus, the second optical modulator is a polarization-sensitive device designed to modulate optical signals having the second fixed polarization.

In some embodiments of any of the above apparatus, the second optical modulator is unsuitable for modulating optical signals having the first fixed polarization.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled or referred to as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following. (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus comprising:
    an optical power supply comprising:
        a power supply light source configured to generate power supply light;
        at least one optical input/output port;
        at least one photodetector;
        a coupling module configured to receive the power supply light from the power supply light source and output the power supply light through the optical input/output port, receive reflected light through the optical input/output port, and transmit the reflected light to the photodetector,
        wherein the photodetector is configured to detect the reflected light and generate a signal representing a level of the reflected light, and
        a controller that is configured to compare the level of the detected reflected light with a threshold value, and upon determining that the level of the detected reflected light is less than the threshold value, reduce or turn off the power supply light that is provided to the optical input/output port;
    wherein the controller is configured to control an optical shutter or attenuator to reduce or block the power supply light that is provided to the optical input/output port.

2. The apparatus of claim 1 in which the reflected light comprises a portion of the power supply light that is output from the optical input/output port and reflected back to the optical input/output port.

3. The apparatus of claim 1 in which the controller is configured to control the light source to reduce or turn off the power supply light generated by the light source upon determining that the level of the detected reflected light is less than the threshold value.

4. The apparatus of claim 1, comprising a transponder module that comprises a reflector and a data modulator, in which the reflector is configured to receive the power supply light, transmit a first portion of the power supply light to the data modulator, and reflect a second portion of the power supply light back to the optical power supply,
    wherein the data modulator is configured to modulate the first portion of the power supply light according to electrical data and generate a modulated optical signal.

5. The apparatus of claim 4, comprising an optical fiber optically coupled between the optical power supply and the transponder module, in which the reflector is configured to receive the power supply light from the optical fiber and reflect the second portion of the power supply light back to the optical power supply through the optical fiber.

6. The apparatus of claim 5 in which the optical fiber comprises a plurality of segments of optical fibers that are optically coupled by connectors, slices, and optical elements, and the threshold value is selected to be higher than a sum of all reflected light that is reflected back to the optical power supply by the connectors, splices, and optical elements and reflected light due to the Fresnel reflection from a broken optical fiber, when the power supply light source outputs the power supply light at a normal operation level.

7. The apparatus of claim 1, comprising the optical shutter or attenuator positioned between the power supply light source and the coupling module,
    wherein the controller is configured to control the optical shutter or attenuator to selectively operate in a first state that allows the power supply light to pass to the coupling module, or in a second state that blocks or reduces the power supply light that is provided to the coupling module.

8. The apparatus of claim 1, comprising a monitor light source that is configured to generate monitor light, in which the coupling module is configured to combine the power supply light and the monitor light to generate combined light, and provide the combined light to the optical input/output port, wherein the reflected light comprises reflected monitor light, and the coupling module is configured to direct the reflected monitor light to the photodetector.

9. The apparatus of claim 8 in which the coupling module comprises a wavelength multiplexer/demultiplexer that is configured to receive the power supply light and the monitor light, combine the power supply light and the monitor light to generate the combined light, and provide the combined light to the optical input/output port.

10. The apparatus of claim 9 in which the power supply light has a first set of one or more discrete wavelengths or wavelength ranges, the monitor light has a second set of one or more discrete wavelengths or wavelength ranges, and at least 10% of optical power in the power supply light and at least 10% of optical power in the monitor light are contained in disjoint frequency bands.

11. The apparatus of claim 10 in which at least 50% of optical power in the power supply light and at least 50% of optical power in the monitor light are contained in disjoint frequency bands.

12. The apparatus of claim 11 in which at least 90% of optical power in the power supply light and at least 90% of optical power in the monitor light are contained in disjoint frequency bands.

13. The apparatus of claim 9 in which the coupling module comprises an optical circulator that is positioned between the monitor light source and the wavelength multiplexer/demultiplexer, wherein the optical circulator comprises a first port, a second port, and a third port, the first port is optically coupled to the monitor light source, the second port is optically coupled to the wavelength multiplexer/demultiplexer, and the third port is optically coupled to the photodetector, the optical circulator is configured to receive the monitor light at the first port and output the monitor light at the second port, and the optical circulator is configured to receive the reflected light at the second port and output the reflected light at the third port.

14. The apparatus of claim 9 in which the coupling module comprises an optical circulator that is positioned between the monitor light source and the wavelength multiplexer/demultiplexer, wherein the optical circulator is configured to direct the monitor light from the monitor light source to the wavelength multiplexer/demultiplexer, and the optical circulator is configured to direct the reflected light to the photodetector.

15. The apparatus of claim 9 in which the coupling module comprises an optical circulator that is positioned between the wavelength multiplexer/demultiplexer and the optical input/output port, wherein the optical circulator comprises a first port, a second port, and a third port, the first port is optically coupled to the wavelength multiplexer/demultiplexer, the second port is optically coupled to the optical input/output port, and the third port is optically coupled to the photodetector, the optical circulator is configured to receive the combined light at the first port and output the combined light at the second port, and the optical circulator is configured to receive the reflected light at the second port and output the reflected light at the third port.

16. The apparatus of claim 9 in which the coupling module comprises an optical circulator that is positioned between the wavelength multiplexer/demultiplexer and the optical input/output port, wherein the optical circulator is configured to direct the light from the wavelength multiplexer/demultiplexer to the optical input/output port, and the optical circulator is configured to direct the reflected light to the photodetector.

17. The apparatus of claim 8 in which the coupling module comprises an optical splitter and an optical circulator, wherein the optical circulator is positioned between the monitor light source and the optical splitter, the optical circulator is configured to direct the monitor light from the monitor light source to the optical splitter, the optical splitter comprises a first port and a second port, the optical splitter is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter, the optical splitter is configured to split first reflected light from the first port of the optical splitter into a first portion and a second portion, split second reflected light from the second port of the optical splitter into a first portion and a second portion, send the first portion of the first reflected light and the first portion of the second reflected light to the optical circulator, and the optical circulator is configured to send the reflected light from the optical splitter to the photodetector.

18. The apparatus of claim 17 in which the optical power supply is configured to monitor conditions of a first optical fiber optically coupled to the first port of the optical splitter and a second optical fiber optically coupled to the second port of the optical splitter, and reduce or shut off the power supply light provided to the first and second optical fibers upon determining that the level of the reflected light detected by the photodetector is less than the threshold value.

19. The apparatus of claim 17 in which the coupling module comprises a narrow band optical filter positioned between the optical circulator and the photodetector, the narrow band optical filter is configured to allow a larger percentage of the monitor light to pass and a smaller percentage of the power supply light to pass.

20. The apparatus of claim 8 in which the coupling module comprises an optical splitter and an optical circulator, wherein the optical splitter comprises a first port and a second port, the optical splitter and the optical circulator are configured to provide a first portion of power supply light and a first portion of monitor light to the first port of the optical splitter, and provide a second portion of power supply light and a second portion of monitor light to the second port of the optical splitter, the optical splitter and the optical circulator are configured to provide at least a portion of reflected light received at the first port of the optical splitter and at least a portion of reflected light received at the second port of the optical splitter to the photodetector.

21. The apparatus of claim 8 in which the at least one optical input/output port comprises a first optical input/output port and a second optical input/output port,
the at least one photodetector comprises a first photodetector and a second photodetector,
the coupling module comprises an optical splitter, a first optical circulator, and a second optical circulator,
the optical splitter comprises a first output and a second output,
the first optical circulator is configured to direct light from the first output of the optical splitter to the first optical input/output port, and direct reflected light from the first optical input/output port to the first photodetector, and
the second optical circulator is configured to direct light from the second output of the optical splitter to the second optical input/output port, and direct reflected light from the second optical input/output port to the second photodetector.

22. The apparatus of claim 21 in which the first optical circulator is positioned between the first output of the optical splitter and the first optical input/output port,
the second optical circulator is positioned between the second output of the optical splitter and the second optical input/output port,
the first optical circulator comprises a first port, a second port, and a third port, the first port is optically coupled to the first output of the optical splitter, the second port is optically coupled to the first optical input/output port, and the third port is optically coupled to the first photodetector, and
the second optical circulator comprises a first port, a second port, and a third port, the first port is optically coupled to the second output of the optical splitter, the second port is optically coupled to the second optical input/output port, and the third port is optically coupled to the second photodetector.

23. The apparatus of claim 22 in which the optical splitter is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter,
the first optical circulator is configured to receive the first portion of the power supply light and the first portion of the monitor light at the first port, and output the first portion of the power supply light and the first portion of the monitor light at the second port,
the second optical circulator is configured to receive the second portion of the power supply light and the second portion of the monitor light at the first port, and output the second portion of the power supply light and the second portion of the monitor light at the second port,
the first optical circulator is configured to receive, at the second port, reflected light from the first input/output port, and output the reflected light at the third port, and
the second optical circulator is configured to receive, at the second port, reflected light from the second input/output port, and output the reflected light at the third port.

24. The apparatus of claim 8 in which the coupling module is configured to provide the combined light to two or more optical fibers, receive reflected monitor light from the two or more optical fibers, and transmit the reflected monitor light from each optical fiber to a corresponding photodetector,
wherein reflected monitor light from different optical fibers are detected by different photodetectors to enable each optical fiber to be monitored individually.

25. The apparatus of claim 8, comprising a transponder module that comprises a selective reflector and a data modulator, in which the selective reflector is configured to receive the combined light, transmit the power supply light to the data modulator, and reflect the monitor light back to the optical power supply,
wherein the data modulator is configured to modulate the power supply light according to electrical data and generate a modulated optical signal.

26. The apparatus of claim 25, comprising an optical fiber optically coupled between the optical power supply and the transponder module, in which the selective reflector is configured to receive the combined light from the optical fiber and reflect the monitor light back to the optical power supply through the optical fiber.

27. The apparatus of claim 1 in which the coupling module comprises an optical circulator having a first port, a second port, and a third port,
the optical circulator is configured to receive the power supply light at the first port and transmit the power supply light from the second port to the optical input/output port, and
the optical circulator is configured to receive reflected power supply light at the second port and transmit the reflected power supply light from the third port to the photodetector.

28. The apparatus of claim 1 in which the coupling module comprises an optical splitter having a first port, a second port, a third port, and a fourth port,
the optical splitter is configured to receive the power supply light at the first port, transmit a first portion of the power supply light out of the third port, transmit a second portion of the power supply light out of the fourth port, receive first reflected power supply light at the third port, receive second reflected power supply light at the fourth port, and transmit a portion of the first reflected power supply light and a portion of the second reflected power supply light out of the second port to the photodetector.

29. The apparatus of claim 28 in which the optical splitter comprises an optical 50/50 splitter.

30. The apparatus of claim 1 in which the coupling module comprises an optical splitter having a first port, a second port, and a third port,
the optical splitter is configured to receive the power supply light at the first port, transmit a first portion of the power supply light out of the third port, receive first reflected power supply light at the third port, and transmit a portion of the first reflected power supply light out of the second port to the photodetector.

31. The apparatus of claim 30 in which the optical splitter comprises an optical a/(1−a) splitter, $0<a<1$, and $a \neq 0.5$.

32. The apparatus of claim 31 in which the optical splitter transmits power supply light having a power $a \cdot P$ out of the third port, receives reflected power supply light having a power $P_R$ at the third port, and transmits a portion of the reflected power supply light having a power $(1-a) \cdot P_R$ out of the second port to the photodetector.

33. The apparatus of claim 1, comprising a transponder module configured to receive the power supply light, with or without monitor light, from the optical power supply through a first optical fiber, in which the transponder module comprises a data modulator and mechanism for reflecting a portion of the power supply light or the monitor light received from the first optical fiber, either modulated or not modulated, back to the first optical fiber, wherein the data modulator is configured to modulate at least a portion of the power supply light based on electrical data to generate a modulated optical signal.

34. The apparatus of claim 1 in which the power supply light comprises continuous-wave light.

35. The apparatus of claim 1 in which the power supply light comprises one or more trains of periodic optical pulses.

36. The apparatus of claim 1 in which the power supply light comprises one or more trains of non-periodic optical pulses.

37. The apparatus of claim 1 in which the power supply light comprises a sequence of optical frame templates.

38. An apparatus comprising:

a transponder module configured to receive combined light comprising power supply light and monitor light from a first optical fiber, at least 10% of optical power in the power supply light and at least 10% of optical power in the monitor light are contained in disjoint frequency bands, wherein the transponder module comprises a selective reflector and a data modulator, the selective reflector is configured to receive the combined light from the first optical fiber, transmit the power supply light to the data modulator, and reflect the monitor light back to the first optical fiber, and the data modulator is configured to modulate the power supply light based on electrical data to generate a modulated optical signal.

39. The apparatus of claim 38 in which the selective reflector comprises a wavelength selective multiplexer/demultiplexer and a mirror, the wavelength selective multiplexer/demultiplexer comprises a first port, a second port, and a third port, the first port is configured to receive the combined light from the first optical fiber, the second port is configured to output the power supply light to the data modulator, and the third port is configured to output the monitor light to the mirror and receive reflected monitor light from the mirror, and the wavelength selective multiplexer/demultiplexer is configured to transmit the reflected monitor light back to the first optical fiber.

40. The apparatus of claim 38 in which the selective reflector comprises a thin film filter configured to receive the combined light from the first optical fiber, transmit the power supply light to the data modulator, and reflect the monitor light back to the first optical fiber.

41. An apparatus comprising:

a transponder module configured to receive power supply light, with or without additional monitor light, from a first optical fiber, in which the transponder module comprises a data modulator and a reflecting/redirecting module, wherein the reflecting/redirecting module is configured to reflect or redirect a first portion of the light received from the first optical fiber, either with or without modulation, back to the first optical fiber, the first portion of the light having a power level greater than a power level of reflected light caused by a breakage in the first optical fiber, wherein the data modulator is configured to modulate at least a portion of the power supply light based on electrical data to generate a modulated optical signal.

42. The apparatus of claim 41 in which the reflecting/redirecting module is configured to receive the power supply light with the additional monitor light, and reflect or redirect at least a portion of the monitor light back to the first optical fiber.

43. An apparatus comprising:

an optical power supply comprising:

a power supply light source configured to generate power supply light;

at least one optical input/output port;

at least one photodetector;

a coupling module configured to receive the power supply light from the power supply light source and output the power supply light through the optical input/output port, receive reflected light through the optical input/output port, and transmit the reflected light to the photodetector, wherein the photodetector is configured to detect the reflected light and generate a signal representing a level of the reflected light;

a controller that is configured to compare the level of the detected reflected light with a threshold value, and upon determining that the level of the detected reflected light is less than the threshold value, reduce or turn off the power supply light that is provided to the optical input/output port; and a monitor light source that is configured to generate monitor light, in which the coupling module is configured to combine the power supply light and the monitor light to generate combined light, and provide the combined light to the optical input/output port, wherein the reflected light comprises reflected monitor light, and the coupling module is configured to direct the reflected monitor light to the photodetector;

wherein the coupling module comprises a wavelength multiplexer/demultiplexer that is configured to receive the power supply light and the monitor light, combine the power supply light and the monitor light to generate the combined light, and provide the combined light to the optical input/output port;

wherein the coupling module comprises an optical circulator that is positioned between the wavelength multiplexer/demultiplexer and the optical input/output port;

wherein the optical circulator comprises a first port, a second port, and a third port, the first port is optically coupled to the wavelength multiplexer/demultiplexer, the second port is optically coupled to the optical input/output port, and the third port is optically coupled to the photodetector, the optical circulator is configured to receive the combined light at the first port and output the combined light at the second port, and the optical circulator is configured to receive the reflected light at the second port and output the reflected light at the third port.

44. An apparatus comprising:

an optical power supply comprising:

a power supply light source configured to generate power supply light;

at least one optical input/output port;

at least one photodetector;

a coupling module configured to receive the power supply light from the power supply light source and output the power supply light through the optical input/output port, receive reflected light through the optical input/output port, and transmit the reflected light to the photodetector, wherein the photodetector is configured to detect the reflected light and generate a signal representing a level of the reflected light;

a controller that is configured to compare the level of the detected reflected light with a threshold value, and upon determining that the level of the detected reflected light is less than the threshold value, reduce or turn off the power supply light that is provided to the optical input/output port; and a monitor light source that is configured to generate monitor light, in which the coupling module is configured to combine the power supply light and the monitor light to generate combined light, and provide the combined light to the optical input/output port, wherein the reflected light comprises reflected monitor light, and the coupling module is configured to direct the reflected monitor light to the photodetector;

wherein the coupling module comprises a wavelength multiplexer/demultiplexer that is configured to receive the power supply light and the monitor light, combine the power supply light and the monitor light to generate the combined light, and provide the combined light to the optical input/output port;

wherein the coupling module comprises an optical circulator that is positioned between the wavelength multiplexer/demultiplexer and the optical input/output port;

wherein the optical circulator is configured to direct the light from the wavelength multiplexer/demultiplexer to the optical input/output port, and the optical circulator is configured to direct the reflected light to the photodetector.

45. An apparatus comprising:

an optical power supply comprising:

a power supply light source configured to generate power supply light;

at least one optical input/output port;

at least one photodetector;

a coupling module configured to receive the power supply light from the power supply light source and output the power supply light through the optical input/output port, receive reflected light through the optical input/output port, and transmit the reflected light to the photodetector, wherein the photodetector is configured to detect the reflected light and generate a signal representing a level of the reflected light;

a controller that is configured to compare the level of the detected reflected light with a threshold value, and upon determining that the level of the detected reflected light is less than the threshold value, reduce or turn off the power supply light that is provided to the optical input/output port; and a monitor light source that is configured to generate monitor light, in which the coupling module is configured to combine the power supply light and the monitor light to generate combined light, and provide the combined light to the optical input/output port, wherein the reflected light comprises reflected monitor light, and the coupling module is configured to direct the reflected monitor light to the photodetector;

wherein the coupling module comprises an optical splitter and an optical circulator, wherein the optical circulator is positioned between the monitor light source and the optical splitter, the optical circulator is configured to direct the monitor light from the monitor light source to the optical splitter, the optical splitter comprises a first port and a second port, the optical splitter is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter, the optical splitter is configured to split first reflected light from the first port of the optical splitter into a first portion and a second portion, split second reflected light from the second port of the optical splitter into a first portion and a second portion, send the first portion of the first reflected light and the first portion of the second reflected light to the optical circulator, and the optical circulator is configured to send the reflected light from the optical splitter to the photodetector.

46. The apparatus of claim 45 wherein the optical power supply is configured to monitor conditions of a first optical fiber optically coupled to the first port of the optical splitter and a second optical fiber optically coupled to the second port of the optical splitter, and reduce or shut off the power supply light provided to the first and second optical fibers upon determining that the level of the reflected light detected by the photodetector is less than the threshold value.

47. The apparatus of claim 45 wherein the coupling module comprises a narrow band optical filter positioned between the optical circulator and the photodetector, the narrow band optical filter is configured to allow a larger percentage of the monitor light to pass and a smaller percentage of the power supply light to pass.

48. An apparatus comprising:

an optical power supply comprising:

a power supply light source configured to generate power supply light;

at least one optical input/output port;

at least one photodetector;

a coupling module configured to receive the power supply light from the power supply light source and output the power supply light through the optical input/output port, receive reflected light through the optical input/output port, and transmit the reflected light to the photodetector, wherein the photodetector is configured to detect the reflected light and generate a signal representing a level of the reflected light;

a controller that is configured to compare the level of the detected reflected light with a threshold value, and upon determining that the level of the detected reflected light is less than the threshold value, reduce or turn off the power supply light that is provided to the optical input/output port; and a monitor light source that is configured to generate monitor light, in which the coupling module is configured to combine the power supply light and the monitor light to generate combined light, and provide the combined light to the optical input/output port, wherein the reflected light comprises reflected monitor light, and the coupling module is configured to direct the reflected monitor light to the photodetector;

wherein the coupling module comprises an optical splitter and an optical circulator, wherein the optical splitter comprises a first port and a second port, the optical splitter and the optical circulator are configured to provide a first portion of power supply light and a first portion of monitor light to the first port of the optical splitter, and provide a second portion of power supply light and a second portion of monitor light to the second port of the optical splitter, the optical splitter and the optical circulator are configured to provide at least a portion of reflected light received at the first port of the optical splitter and at least a portion of reflected light received at the second port of the optical splitter to the photodetector.

49. An apparatus comprising:

an optical power supply comprising:
  a power supply light source configured to generate power supply light;
  at least one optical input/output port;
  at least one photodetector;
  a coupling module configured to receive the power supply light from the power supply light source and output the power supply light through the optical input/output port, receive reflected light through the optical input/output port, and transmit the reflected light to the photodetector,
  wherein the photodetector is configured to detect the reflected light and generate a signal representing a level of the reflected light;
  a controller that is configured to compare the level of the detected reflected light with a threshold value, and upon determining that the level of the detected reflected light is less than the threshold value, reduce or turn off the power supply light that is provided to the optical input/output port; and
  a monitor light source that is configured to generate monitor light, in which the coupling module is configured to combine the power supply light and the monitor light to generate combined light, and provide the combined light to the optical input/output port,
  wherein the reflected light comprises reflected monitor light, and the coupling module is configured to direct the reflected monitor light to the photodetector;
  wherein the at least one optical input/output port comprises a first optical input/output port and a second optical input/output port,
  the at least one photodetector comprises a first photodetector and a second photodetector,
  the coupling module comprises an optical splitter, a first optical circulator, and a second optical circulator,
  the optical splitter comprises a first output and a second output,
  the first optical circulator is configured to direct light from the first output of the optical splitter to the first optical input/output port, and direct reflected light from the first optical input/output port to the first photodetector,
  the second optical circulator is configured to direct light from the second output of the optical splitter to the second optical input/output port, and direct reflected light from the second optical input/output port to the second photodetector;
  wherein the first optical circulator is positioned between the first output of the optical splitter and the first optical input/output port,
  the second optical circulator is positioned between the second output of the optical splitter and the second optical input/output port,
  the first optical circulator comprises a first port, a second port, and a third port, the first port is optically coupled to the first output of the optical splitter, the second port is optically coupled to the first optical input/output port, and the third port is optically coupled to the first photodetector, and
  the second optical circulator comprises a first port, a second port, and a third port, the first port is optically coupled to the second output of the optical splitter, the second port is optically coupled to the second optical input/output port, and the third port is optically coupled to the second photodetector.

50. The apparatus of claim 49 wherein the optical splitter is configured to split the power supply light into a first portion and a second portion, split the monitor light into a first portion and a second portion, send the first portion of the power supply light and the first portion of the monitor light to the first port of the optical splitter, and send the second portion of the power supply light and the second portion of the monitor light to the second port of the optical splitter, the first optical circulator is configured to receive the first portion of the power supply light and the first portion of the monitor light at the first port, and output the first portion of the power supply light and the first portion of the monitor light at the second port, the second optical circulator is configured to receive the second portion of the power supply light and the second portion of the monitor light at the first port, and output the second portion of the power supply light and the second portion of the monitor light at the second port, the first optical circulator is configured to receive, at the second port, reflected light from the first input/output port, and output the reflected light at the third port, and the second optical circulator is configured to receive, at the second port, reflected light from the second input/output port, and output the reflected light at the third port.

51. An apparatus comprising:

an optical power supply comprising:
  a power supply light source configured to generate power supply light;
  at least one optical input/output port;
  at least one photodetector;
  a coupling module configured to receive the power supply light from the power supply light source and output the power supply light through the optical input/output port, receive reflected light through the optical input/output port, and transmit the reflected light to the photodetector,
  wherein the photodetector is configured to detect the reflected light and generate a signal representing a level of the reflected light;

a controller that is configured to compare the level of the detected reflected light with a threshold value, and upon determining that the level of the detected reflected light is less than the threshold value, reduce or turn off the power supply light that is provided to the optical input/output port;

a monitor light source that is configured to generate monitor light, wherein the coupling module is configured to combine the power supply light and the monitor light to generate combined light, and provide the combined light to the optical input/output port;

wherein the reflected light comprises reflected monitor light, and the coupling module is configured to direct the reflected monitor light to the photodetector; and a transponder module that comprises a selective reflector and a data modulator, wherein the selective reflector is configured to receive the combined light, transmit the power supply light to the data modulator, and reflect the monitor light back to the optical power supply, wherein the data modulator is configured to modulate the power supply light according to electrical data and generate a modulated optical signal.

52. The apparatus of claim 51, comprising an optical fiber optically coupled between the optical power supply and the transponder module, in which the selective reflector is configured to receive the combined light from the optical fiber and reflect the monitor light back to the optical power supply through the optical fiber.

53. An apparatus comprising:
an optical power supply comprising:
  a power supply light source configured to generate power supply light;
  at least one optical input/output port;
  at least one photodetector;
  a coupling module configured to receive the power supply light from the power supply light source and output the power supply light through the optical input/output port, receive reflected light through the optical input/output port, and transmit the reflected light to the photodetector,
  wherein the photodetector is configured to detect the reflected light and generate a signal representing a level of the reflected light, and
  a controller that is configured to compare the level of the detected reflected light with a threshold value, and upon determining that the level of the detected reflected light is less than the threshold value, reduce or turn off the power supply light that is provided to the optical input/output port; and
a transponder module configured to receive the power supply light, with or without monitor light, from the optical power supply through a first optical fiber, wherein the transponder module comprises a data modulator and mechanism for reflecting a portion of the power supply light or the monitor light received from the first optical fiber, either modulated or not modulated, back to the first optical fiber,
wherein the data modulator is configured to modulate at least a portion of the power supply light based on electrical data to generate a modulated optical signal.

* * * * *